US008241737B2

(12) United States Patent
Iwata et al.

(10) Patent No.: US 8,241,737 B2
(45) Date of Patent: Aug. 14, 2012

(54) OPTICAL MULTILAYER BODY, POLARIZATION PLATE USING SAME, AND IMAGE DISPLAY

(75) Inventors: Yukimitsu Iwata, Aioi (JP); Koichi Mikami, Okayama (JP); Yoshihiro Nishimura, Okayama (JP); Takashi Kodama, Okayama (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 13/230,961

(22) Filed: Sep. 13, 2011

(65) Prior Publication Data
US 2012/0002397 A1    Jan. 5, 2012

Related U.S. Application Data

(63) Continuation of application No. 11/884,319, filed as application No. PCT/JP2006/303057 on Feb. 21, 2006.

(30) Foreign Application Priority Data

Feb. 21, 2005 (JP) .................. 2005-044231
Mar. 29, 2005 (JP) .................. 2005-095831
Mar. 30, 2005 (JP) .................. 2005-099269
Mar. 30, 2005 (JP) .................. 2005-099351

(51) Int. Cl.
*G09F 13/04* (2006.01)
*G02B 5/02* (2006.01)
*G02B 5/30* (2006.01)

(52) U.S. Cl. .................. 428/220; 362/97.1; 359/488.01; 359/599

(58) Field of Classification Search .................. 428/220; 362/97.1; 359/488.01, 599
See application file for complete search history.

(56) References Cited

U.S. PATENT DOCUMENTS 6,696,140 B2  2/2004  Suzuki
6,731,363 B2  5/2004  Nakamura et al.
(Continued)

FOREIGN PATENT DOCUMENTS

JP    64-019301    1/1989
(Continued)

OTHER PUBLICATIONS

Machine_English_Translation_JP_09193333_A; Tomizawa; Glare Protecting Film; Jul. 29, 1997; whole document.*

(Continued)

*Primary Examiner* — David R Sample
*Assistant Examiner* — Tahseen N Khan
(74) *Attorney, Agent, or Firm* — Burr & Brown

(57) ABSTRACT

An optical laminate is provided which has anti-dazzling properties and can realize excellent glare preventive properties and black reproducibility (gradation rendering of black at low brightness). The optical laminate includes a light transparent base material and an anti-dazzling layer or a light diffusion layer provided on the light transparent base material, wherein the outermost surface of the anti-dazzling layer or light diffusion layer has a concavoconvex surface. The anti-dazzling layer satisfies the requirements that Sm is not less than 100 μm and not more than 600 μm, θa is not less than 0.1 degree and not more than 1.2 degrees, and Rz is more than 0.2 μm and not more than 1 μm, wherein Sm represents the average spacing of concavoconvexes in the anti-dazzling layer, θa represents the average inclination angle of the concavoconvexes, and Rz represents the average roughness of the concavoconvexes.

17 Claims, 5 Drawing Sheets

U.S. PATENT DOCUMENTS

| | | | |
|---|---|---|---|
| 7,033,638 B2 | 4/2006 | Suzuki | |
| 7,128,428 B2 | 10/2006 | Takahashi et al. | |
| 7,542,207 B2 | 6/2009 | Matsunaga | |
| 2002/0122257 A1* | 9/2002 | Suga et al. | 359/580 |
| 2003/0116270 A1 | 6/2003 | Hawa et al. | |
| 2003/0118750 A1 | 6/2003 | Bourdelais et al. | |
| 2003/0176156 A1* | 9/2003 | Braunschweig et al. | 451/526 |
| 2004/0240070 A1* | 12/2004 | Suzuki et al. | 359/599 |
| 2005/0030444 A1 | 2/2005 | Fujiwara et al. | |
| 2005/0053729 A1 | 3/2005 | Bourdelais et al. | |
| 2005/0063066 A1* | 3/2005 | Namioka et al. | 359/613 |
| 2006/0093793 A1* | 5/2006 | Miyakawa et al. | 428/172 |
| 2006/0159902 A1 | 7/2006 | Suzuki | |
| 2007/0026167 A1 | 2/2007 | Bourdelais et al. | |
| 2007/0053055 A1* | 3/2007 | Mikami et al. | 359/359 |

FOREIGN PATENT DOCUMENTS

| | | | |
|---|---|---|---|
| JP | 02-067129 A | | 3/1990 |
| JP | 03-251451 A | | 11/1991 |
| JP | 09-193333 A1 | | 7/1997 |
| JP | 09193333 A | * | 7/1997 |
| JP | 10-054901 | | 2/1998 |
| JP | 11-281818 | | 10/1999 |
| JP | 2000-206317 A1 | | 7/2000 |
| JP | 2000-215720 | | 8/2000 |
| JP | 2000-338310 | | 12/2000 |
| JP | 2000-352607 A | | 12/2000 |
| JP | 2001-233611 | | 8/2001 |
| JP | 2002-189106 | | 7/2002 |
| JP | 2002-189107 | | 7/2002 |
| JP | 2002-202402 | | 7/2002 |
| JP | 2002-260424 A | | 9/2002 |
| JP | 2002-267814 | | 9/2002 |
| JP | 2002-275391 | | 9/2002 |
| JP | 2002-277602 | | 9/2002 |
| JP | 2002-311421 A1 | | 10/2002 |
| JP | 2003-004903 | | 1/2003 |
| JP | 2003-098346 A | | 4/2003 |
| JP | 2003-195016 A1 | | 7/2003 |
| JP | 2003-248110 | | 9/2003 |
| JP | 2004-046258 A | | 2/2004 |
| JP | 2004-050607 A1 | | 2/2004 |
| JP | 2004-061853 A1 | | 2/2004 |
| JP | 2004-126495 | | 4/2004 |
| JP | 2004-271642 | | 9/2004 |
| JP | 2004-271735 | | 9/2004 |
| JP | 2004-306328 | | 11/2004 |
| JP | 2004-322566 A1 | | 11/2004 |
| JP | 2004-341070 A1 | | 12/2004 |
| JP | 2005-010509 A | | 1/2005 |
| JP | 2005-024885 A1 | | 1/2005 |
| JP | 2005-043572 A | | 2/2005 |
| JP | 2005-195819 A | | 7/2005 |
| TW | 351728 | | 2/1999 |
| TW | 200407568 | | 5/2004 |
| WO | 95/31737 | | 11/1995 |
| WO | WO 2004/070436 A | | 8/2004 |
| WO | WO 2004113971 A1 | * | 12/2004 |
| WO | WO 2005033752 A1 | * | 4/2005 |

OTHER PUBLICATIONS

Korean Office Action, Korean Application No. 10-2007-7021631, dated Jan. 31, 2012 (8 pages).

Korean Office Action, Korean Application No. 10-2007-7021523, dated Feb. 29, 2012 (9 pages).

Japanese Office Action, Japanese Patent Application No. 2007-503784, dated Apr. 3, 2012 (10 pages).

Japanese Office Action, Japanese Patent Application No. 2007-503785, dated Apr. 3, 2012 (11 pages).

Japanese Office Action, Japanese Patent Application No. 2007-503786, dated Apr. 3, 2012 (16 pages).

Japanese Office Action, Japanese Patent Application No. 2007-503787, dated Apr. 3, 2012 (7 pages).

Japanese Office Action, Japanese Patent Application No. 2007-503788, dated Apr. 3, 2012 (7 pages).

* cited by examiner

OPTICAL MULTILAYER BODY, POLARIZATION PLATE USING SAME, AND IMAGE DISPLAY

CROSS-REFERENCE TO RELATED APPLICATIONS

This application is a continuation of U.S. patent application Ser. No. 11/884,319, filed Feb. 25, 2008, and is based upon and claims the benefit of priority from the prior Japanese Patent Applications No. 44231/2005, No. 99269/2005, No. 95831/2005, and No. 99351/2005 under the Paris Convention, and, thus, the entire contents thereof are incorporated herein by reference.

FIELD OF INVENTION

The present invention provides an optical laminate for use in displays such as CRTs and liquid crystal panels.

BACKGROUND OF THE INVENTION

The prevention of lowered contrast and lowered visibility caused by external light reflection or image reflection is required of image display devices, for example, cathode-ray tube display devices (CRTs), plasma displays (PDPs), electroluminescent displays (ELDs), or liquid crystal displays (LCDs). Accordingly, it is common practice to provide a reflection preventive laminate on the outermost surface of an image display device from the viewpoint of reducing image reflection or reflectance using the principle of light scattering or the principle of optical interference.

In image display devices, for example, liquid crystal displays, the use of an anti-dazzling laminate as one of antireflection laminates has hitherto been known for realizing regulating optical properties to realize excellent image displays. The anti-dazzling laminate is utilized for preventing a lowering in visibility as a result of external light reflection or image reflection within image display devices. The anti-dazzling laminate is produced as having on its surface an anti-dazzling layer containing various particles, or an anti-dazzling layer having a concavoconvex shape formed by embossing (Japanese Patent Laid-Open No. 341070/2004).

In recent years, a demand for a higher level of definition of panel resolution has led to a higher level of fineness of the concavoconcex shape of the anti-dazzling layer. Accordingly, a concavoconvex shape having a broad and large curve has been regarded as unsuitable for meeting a demand for higher definition in the anti-dazzling laminate having the above construction and thus have not been adopted. On the other hand, when increasing the fineness of the concavoconvex shape involved in higher definition of panel resolution can meet a demand for higher definition of the panel resolution. Regarding this technique, however, it has often been pointed out that, for example, external light is reflected from the display surface resulting in such a phenomenon that, for example, the image display surface is seen white (whitening), or lowered contrast. When the anti-dazzling laminate is used on the image display surface of notebook computers and the like, a certain level of satisfactory optical properties can be provided. When the light transmitted through the backside of backlight within a display is transmitted through the concavoconvex shape face of the anti-dazzling laminate formed on the outermost surface of the panel, the concavoconvex shape functions as fine lenses which disturb the displayed pixels and the like, that is, "glare" is likely to occur. This unfavorable phenomenon makes it difficult to attain the effect of the anti-dazzling laminate per se. In particular, the occurrence of the "glare" increases with increasing the definition of the panel resolution, and, thus, effectively preventing this unfavorable phenomenon has been desired.

In order to eliminate this "glare," for example, a method has been adopted in which surface concavoconvexes are densely provided to enhance the sharpness and, at the same time, scattering particles different from the resin for anti-dazzling layer formation in refractive index are added to impart internal scattering effect to the anti-dazzling laminate. All of proposed methods could satisfactorily solve the problem of the "glare," but on the other hand, they sometimes lowered the visibility of the whole image. On the other hand, in the anti-dazzling laminate, the method for reducing the "glare" in high-definition panels has been regarded as a main cause of an unfavorable phenomenon, for example, a deterioration in contrast such as clouding caused by surface whitening, internal scattering effect or the like. That is, it has been regarded that "glare prevention" and "contrast improvement" are in the relationship of tradeoff, and simultaneously meeting both the requirements is difficult. In the above methods, for example, black color reproduction including glossy black feeling (wet glossy black color) in on-screen display, contrast and the like have sometimes been poor. That is, gradation rendering of black in a light room, particularly a black color gradation difference in low gradation, cannot be regarded without difficulties resulting in lowered sensitivity. Specifically, black and gray colors are only recognized as a blurred and identical color-tone black color. In particular, it can be said that an anti-dazzling laminate having better anti-glare properties has a significantly lowered level of visibility.

Accordingly, at the present time, the development of an optical laminate, which can effectively prevent the glare of an image surface and can realize good black color reproduction, especially glossy black color feeling, has been desired. In particular, an optical laminate, which can be used in liquid crystal displays (LCDs) as well as in other applications such as cathode ray tube display devices (CRTs), plasma displays (PDPs), fluorescent display tubes, and field emission-type displays.

SUMMARY OF THE INVENTION

First Aspect of Invention

At the time of the present invention, the present inventors have found that it is possible to provide an optical laminate which, while imparting anti-dazzling properties, can realize the so-called glossy black feeling by improving the anti-glare property and the contrast, especially by improving black color reproduction. The first aspect of the present invention has been made based on such finding. Accordingly, the first aspect of the present invention provides an optical laminate which can realize an anti-dazzling function and an excellent anti-glare property and, at the same time, can realize image display having a high level of visibility.

Thus, according to a first aspect of the present invention, there is provided an optical laminate comprising: a light transparent base material; and an anti-dazzling layer provided on the light transparent base material, wherein the anti-dazzling layer satisfies the following requirements:

Sm is not less than 100 μm and not more than 600 μm,

θa is not less than 0.1 degree and not more than 1.2 degrees, and

Rz is more than 0.2 μm and not more than 1 μm, wherein Sm represents the average spacing of concavoconvexes (or profile irregularities) in the anti-dazzling layer, μm;

θa represents the average inclination angle of the concavoconvexes (or profile irregularities) degree; and Rz represents the average roughness of the concavoconvexes (or profile irregularities), μm.

The optical laminate according to the present invention can realize excellent anti-dazzling properties and black color reproduction having glossy black feeling, can realize a high level of sharpness and excellent anti-glare property, contrast, and letter blurring preventive property, and can be used in various displays. In particular, according to the optical laminate of the present invention, black color gradation rendering (glossy black color reproduction), which could not have been realized by the conventional anti-dazzling laminate without difficulties, can be significantly improved. More specifically, it is possible to provide an optical laminate which, in an image in movie display, can render gradation substantially comparable with a conventional display comprising a clear hard coat layer free from any concavoconvex shape and an antireflection layer provided on the clear hard coat layer and, at the same time, can realize a good sharpness of the contour of letters and can prevent scintillation. In a preferred embodiment of the present invention, the provision of an optional layer such as a slip layer or a low-refractive index layer on the anti-dazzling layer means that the surface of the concavoconvex shape constituting the anti-dazzling layer is sealed by the optional layer, and, thus, a large and smooth desired concavoconvex shape can be realized. Further, various functions such as antistatic property, refractive index regulation, and contamination prevention can be imparted to the optical laminate. When an optional layer such as a slip layer or a low-refractive index layer is provided on the anti-dazzling layer, the surface concavoconvex shape of the optional layer such as the surface modifying layer or the low-refractive index layer conforms to the optical property values of the surface concavoconvex shape of the anti-dazzling layer according to the present invention. That is, in the optical laminate according to the present invention, the concavoconvex shape of the outermost surface conforms to the optical property values of the surface concavoconvex shape of the anti-dazzling layer specified in the present invention.

Second Aspect of Present Invention

At the time of the present invention, the present inventors have found that it is possible to provide an optical laminate which, while imparting anti-dazzling properties, can realize the so-called glossy black feeling by improving the anti-glare property and the contrast, especially improving black color reproduction, and can realize improved optical properties of the outermost surface. The second aspect of the present invention has been made based on such finding.

Accordingly, the second aspect of the present invention provides an optical laminate which can realize an anti-dazzling function and an excellent anti-glare property and, at the same time, can realize image display having a high level of visibility.

Thus, according to the second aspect of the present invention, there is provided an optical laminate comprising: a light transparent base material; and an anti-dazzling layer and a surface modifying layer provided in that order on the light transparent base material, wherein the outermost surface of the anti-dazzling layer has a concavoconvex surface, and the anti-dazzling layer satisfies the following requirements:

Sm is not less than 100 μm and not more than 600 μm,

θa is not less than 0.1 degree and not more than 1.2 degrees, and

Rz is more than 0.2 μm and not more than 1 μm, wherein Sm represents the average spacing of concavoconvexes (or profile irregularities) in the anti-dazzling layer; θa represents the average inclination angle of the concavoconvexes (or profile irregularities); and Rz represents the average roughness of the concavoconvexes (or profile irregularities).

According to the optical laminate in the second aspect of the present invention, since a surface modifying layer is provided on the anti-dazzling layer, the surface of the concavoconvex shape of the anti-dazzling layer can be smoothened, and, at the same time, various optical functions such as antistatic property, refractive index regulation and contamination prevention can be imparted to the optical laminate. Consequently, the same effect as the first aspect of the present invention can be attained. More specifically, the provision of a surface modifying layer (if necessary, an optional layer such as a low-refractive index layer) on the anti-dazzling layer means that the surface of the concavoconvex shape constituting the anti-dazzling layer is sealed by the surface modifying layer, and, thus, a large and smooth desired concavoconvex shape can be realized. Further, various functions such as antistatic property, refractive index regulation, and contamination prevention can be imparted to the optical laminate. When the surface modifying layer and, if necessary, an optional layer such as a low-refractive index layer are provided on the anti-dazzling layer, the surface concavoconvex shape of the optional layer such as the surface modifying layer or the low-refractive index layer conforms to the optical property values of the surface concavoconvex shape of the anti-dazzling layer according to the present invention. That is, in the optical laminate according to the second aspect of the present invention, the concavoconvex shape of the outermost surface conforms to the optical property values of the surface concavoconvex shape of the anti-dazzling layer specified in the present invention.

Third Aspect of Invention

At the time of the present invention, the present inventors have found that it is possible to provide an optical laminate which, while imparting anti-dazzling properties, can realize the so-called glossy black feeling by improving the anti-glare property and the contrast, especially by improving black color reproduction. The third aspect of the present invention has been made based on such finding.

Accordingly, the third aspect of the present invention provides an optical laminate which can realize an anti-dazzling function and an excellent anti-glare property and, at the same time, can realize image display having a high level of visibility.

Thus, according to the third aspect of the present invention, there is provided an optical laminate comprising: a light transparent base material; and a light diffusion layer provided on the light transparent base material, wherein the outermost surface of the light diffusion layer has a concavoconvex surface, and the light diffusion layer satisfies the following requirements:

Sm is not less than 100 μm and not more than 600 μm,

θa is not less than 0.1 degree and not more than 1.2 degrees, and

Rz is more than 0.2 μm and not more than 1 μm, wherein Sm represents the average spacing of concavoconvexes (or profile irregularities) in the light diffusion layer; θa represents the average inclination angle of the concavoconvexes (or profile irregularities); and Rz represents the average roughness of the concavoconvexes (or profile irregularities).

The optical laminate according to the third aspect of the present invention, in general, even a light diffusion layer (a diffusion film) used on the backlight side of the image display device, as with the anti-dazzling layer used on the unit side of the image display device, the same effect as in the first aspect of the present invention can be attained. As a result, the same effect as in the first aspect of the present invention can be attained. Further, in a preferred embodiment of the present invention, the provision of a surface modifying layer (if necessary, an additionally provided optional layer such as a low-refractive index layer) on the light diffusion layer means that the surface of the concavoconvex shape constituting the light diffusion layer is sealed by the surface modifying layer and the like, and, thus, a large and smooth desired concavoconvex shape can be realized. Further, various functions such as antistatic property, refractive index regulation, and contamination prevention can be imparted to the optical laminate. When the surface modifying layer and, if necessary, an optional layer such as a low-refractive index layer are provided on the light diffusion layer, the surface concavoconvex shape of the optional layer such as the surface modifying layer or the low-refractive index layer conforms to the optical property values of the surface concavoconvex shape of the anti-dazzling layer according to the present invention. That is, in the optical laminate according to the second aspect of the present invention, the concavoconvex shape of the outermost surface conforms to the optical property values of the surface concavoconvex shape of the light diffusion layer specified in the present invention.

DETAILED DESCRIPTION OF THE INVENTION

Definitions

Figure 1:
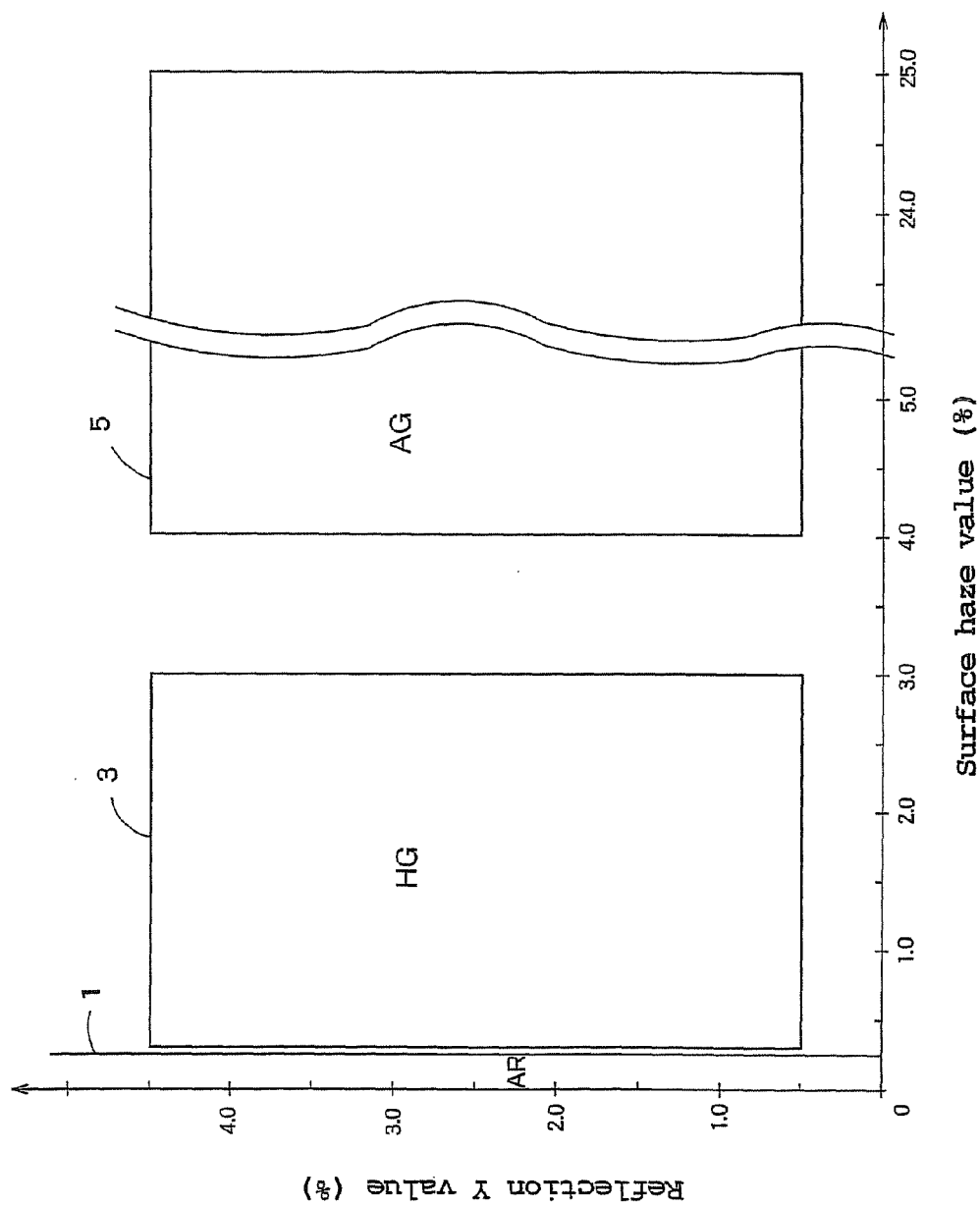
FIG. 1 is a diagram showing the relationship between reflection Y value and surface haze value in an optical laminate.

Terms used in the present specification and working examples will be defined as follows.

1) Ten-point Average Roughness (Rz)

The average roughness is measured by measuring the surface shape as a two-dimensional or three-dimensional profile. In fact, the measurement in this case is carried out under a scanning probe microscope or an atomic force microscope. It is generally difficult to objectively compare curves per se, and, hence, various roughness indexes are calculated based on the profile curve data. Accordingly, in the present invention, the ten-point average roughness (Rz) is calculated using the above measurement results and is expressed in terms of the sum of the average value of absolute values of the values of the highest five deviations and the average value of absolute values of the values of the lowest five deviations among the values of deviations determined from the average values.

2) Average Spacing of profile irregularities (concavoconvexes) Sm (μm) and average inclination angle θa. The anti-dazzling layer constituting the optical laminate according to the present invention has a concavoconvex shape. Sm (μm) represents the average spacing of profile irregularities (concavoconvexes) of the anti-dazzling layer, and θa (degree) represents the average inclination angle of the concavoconvex part. Sm (μm) and θa (degree) may be defined as described in an instruction manual (revised on Jul. 20, 1995) of a surface roughness measuring device (model: SE-3400, manufactured by Kosaka Laboratory Ltd.). θa (degree) represents the angle mode, and, when the inclination is Δa in terms of aspect ratio, θa (degree) is determined by θa (degree) $\tan^{-1}\Delta a-\tan^{-1}$ (sum of the values of difference between the lowest part and the highest part in each concavoconvex (corresponding to the height of each convex part)/reference length). The "reference length" is the same as in the following measuring conditions 1.

When the parameters (Sm, θa, and Rz) representing the surface roughness of the optical laminate according to the present invention may be measure, for example, with the above surface roughness measuring device under the following measurement conditions. This measuring method is favorable in the present invention.

Measuring Conditions

1) Tracer in surface roughness detector:

Model/SE2555N (standard 2 μm), manufactured by Kosaka Laboratory Ltd. (radius of curvature in tip 2 μm/apex angle: 90 degrees/material: diamond)

2) Measuring conditions for surface roughness measuring device:

Reference length (cut-off value of roughness curve λc): 2.5 mm

Evaluation length (reference length (cut-off value λc)×5): 12.5 mm

Feed speed of tracer: 0.5 mm/sec

ψ≡Rz/Sm

The ratio ψ between the average roughness Rz of concavoconvexes and the average spacing Sm of concavoconvexes is defined by ψ≡Rz/Sm. The ratio between the average roughness Rz of concavoconvexes and the average spacing Sm of concavoconvexes can be used as an index for indicating the gradient of the inclination of the concavoconvexes. The ratio ψ between the average roughness Rz of concavoconvexes and the average spacing Sm of concavoconvexes is defined by ψ≡Rz/Sm. The ratio between the average roughness Rz of concavoconvexes and the average spacing Sm of concavoconvexes can be used as an index for indicating the tilt angle of the inclination of the concavoconvexes.

3) Reflection Y Value

The reflection Y value is a value indicating a luminous reflectance determined by measuring 5-degree regular reflectance in a wavelength range of 380 to 780 nm with a spectrophotometer MPC 3100 manufactured by Shimadzu Seisakusho Ltd. and then converting the reflectance values to lightness which can be perceived by the human eye with a software (incorporated in MPC 3100). The 5-degree regular reflectance is measured in such a state that, in order to prevent the backside reflection of the film as the optical laminate, a black tape (manufactured by Teraoka Seisakusho Co., Ltd.) is applied to the side remote from the film face to be measured.

4) Haze Value, Total Light Transmittance, 60-degree Gloss, and Transmission Sharpness The haze value may be measured according to JIS K-7136. A reflection-transmittance meter HR-100 (Murakami Color Research Laboratory) may be mentioned as an instrument used for the measurement. The total light transmittance of the anti-dazzling laminate may be measured with the same measuring device as in the haze value according to JIS K 7361. The haze and total light transmittance are measured in such a state that the coated face is directed to a light source. The 60-degree gloss can be measured with a precision gloss meter (GM-26D, manufactured by Murakami Color Research Laboratory) according to JIS Z8741. The 60-degree gloss is measured in such a state that, in order to eliminate the influence of backside reflection of a sample, a double face adhesive tape (manufactured by Teraoka Seisakusho Co., Ltd.) is applied to the backside of a sample and a black lid of the measuring device. The transmission sharpness is expressed in terms of the total of numerical values obtained by measurement with four types of optical combs (0.125 mm, 0.5 mm, 1 mm, and 2 mm) with an image clarity measuring device (stock number; "ICM-1DP", manufactured by Suga Test Instruments Co., Ltd.) according to JIS K 7105.

5) Definition of Surface Haze

The term "surface haze" as used herein is determined as follows. A pentaerythritol triacrylate or other resin (including resin components such as monomers or oligomers) is diluted with toluene or the like to a solid content of 60%, and the diluted solution is coated with a wire bar onto concavoconvexes of the anti-dazzling layer to a thickness on a dry film basis of 8 μm, whereby the surface concavoconvexes of the anti-dazzling layer are rendered smooth. In this case, when the recoating agent is likely to be repelled and less likely to wet the anti-dazzling layer due to the presence of a leveling agent in the composition for anti-dazzling layer formation, a method may be adopted in which the anti-dazzling film is previously rendered hydrophilic by saponification. The saponification is carried out by immersing the anti-dazzling film in a 2 mol/liter NaOH (or KOH) solution (55° C.) for 3 min, washing the film with water, completely removing water droplets with a Kimwipe, and then drying the film in an oven (50° C.) for one min. The film having a flattened surface does not have any haze derived from surface concavoconvexes but has only an internal haze. This haze can be determined as an internal haze. The value obtained by subtracting the internal haze from the original film haze (overall haze) is determined as a haze (a surface haze) attributable only to surface concavoconvexes.

6) Thickness of Anti-dazzling Layer

The thickness of the anti-dazzling layer refers to a part extended from the interface, between the base material on its display surface side and the outermost surface of the anti-dazzling concavoconvex in contact with the air. In the part extended from the base material surface to the outermost surface, the anti-dazzling layer has either a single layer or a multilayer structure comprising a surface modifying layer and other optical function layers stacked onto the anti-dazzling layer.

Method for Measuring Layer Thickness

The cross section of the optical laminate was subjected to transmission observation under a confocal laser microscope (LeicaTCS-NT, manufactured by Leica: magnification "100 to 300 times) to determine whether or not the interface was present, and the results were evaluated according to the following criteria. Specifically, in order to provide a halation-free sharp image, a wet objective lens was used in a cofocal laser microscope, and about 2 ml of an oil having a refractive index of 1.518 was placed on an optical laminate, followed by observation to determine the presence or absence of the interface. The oil was used to allow the air layer between the objective lens and the optical laminate to disappear.

Measurement Procedure

1: The average thickness of the layer was measured by observation under a laser microscope.

2: The measurement was carried out under the following conditions.

3: For one image plane, the layer thickness from the base material to the maximum profile peak (convex) part was measured for one point, and the layer thickness from the base material to the minimum valley (concave) part was measured for one point. That is, the layer thickness was measured for two points in total for one image plane. This measurement was carried out for five image planes, that is, 10 points in total, and the average value was determined.

7) Pencil hardness

The pencil hardness can be measured according to JIS K 5400. A pencil hardness testing machine manufactured by Toyo Seiki Seisaku Sho, Ltd may be mentioned as an instrument for use in the measurement. The term "pencil hardness of optical laminate" as used herein is a pencil hardness of the film in the optical laminate formed on the transparent base material as measured by a pencil hardness test according to JIS K 5400. The pencil hardness test is a test for determining the hardness of pencils which did not cause any abnormal appearance such as scratch one or more times in five pencil hardness tests. For example, in five tests, using a pencil of 3H, when any abnormal appearance does not occur, the pencil hardness of the optical laminate is at least 3H.

8) Contact Angle

The contact angle may be determined by measuring the contact angle of the optical laminate with pure water using CA-X manufactured by Kyowa Interface Science Co., Ltd.

9) Adhesion of Coating Film

The adhesion of the coating film was measured according to JIS K 5600. 100 cross-cuts of 1 mm size were provided in the optical laminate, the peel test was carried out five times using Cello-Tape for industrial use manufactured by Nichiban Co., Ltd. (Cello-Tape being a registered trademark of Nichiban Co., Ltd; the same shall apply hereinafter). When the percentage remaining square parts is 100%, the coating film adhesion was regarded as good, while the percentage remaining square parts is less than 100%, the coating film adhesion was regarded as poor.

First Aspect of Invention

Optical Laminate

The optical laminate according to the present invention simultaneously has anti-dazzling properties and excellent black color reproduction and contrast. In the present invention, the optical laminate is referred to as a half glare optical laminate (HG). HG has both properties of a conventional anti-glare optical laminate (AG) having excellent anti-dazzling properties and properties of an optical laminate (AR) comprising a clear hard coat (glare) layer provided with a low-refractive index layer and having excellent black color reproduction and contrast. Specifically, the provision of a surface modifying layer considered as one of methods for half glare optical laminate (HG) formation on the anti-glare optical laminate (AG) renders the concavoconvex shape of the anti-dazzling layer smooth, and, further, imparting a surface roughness parameter similar to the antiglare (AG) can realize the production of an anti-dazzling laminate having a very glossy black feeling while imparting satisfactory anti-dazzling properties. Accordingly, the details of the optical laminate (HG) according to the present invention will be described while comparing the conventional AR and AG.

FIG. 1 is a diagram showing the relationship between the surface haze value (%) and the reflection Y value (%) in the optical laminate. In FIG. 1, the conventional AR belongs to an area in which the surface haze value is less than about 0.3%, specifically an area on the left side from the ruled line indicated by a reference numeral 1. On the other hand, the conventional AG belongs to an area where the surface haze value is approximately 4.0% to 25.0% (generally not less than 10.0%) and the reflection Y value is approximately 1.0 to 4.5, specifically an area surrounded by a reference numeral 5 (generally a right side area in the area surrounded by the reference numeral 5). On the other hand, the optical laminate (HG) according to the present invention belongs to an area where the surface haze value is approximately not less than 0.2% and not more than 3.5% (preferably not more than 3.0) and the reflection Y value is approximately not less than 0.5 and not more than 4.5, specifically an area surrounded by a reference numeral 3.

Figure 2:
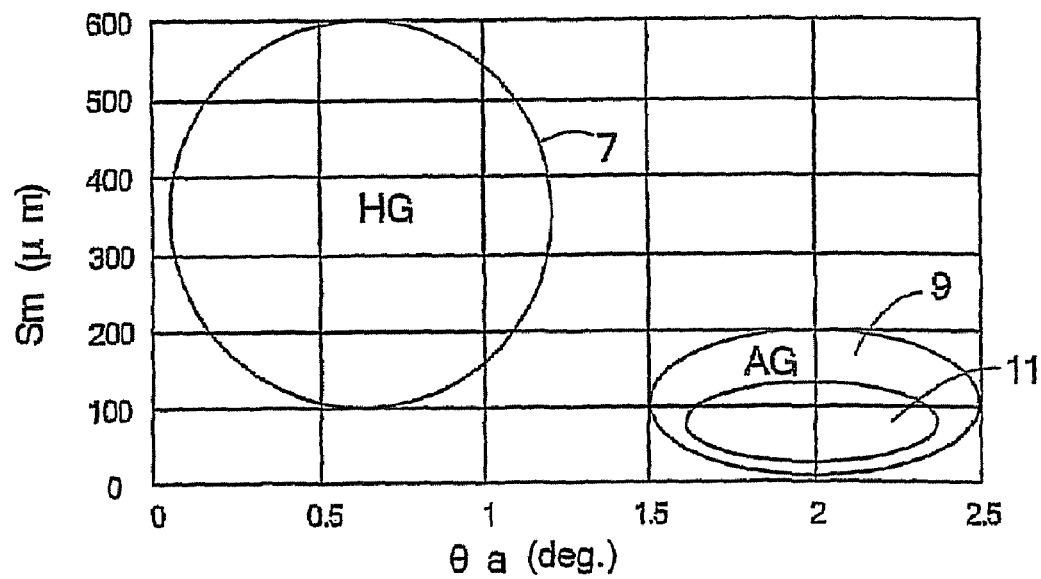
FIG. 2 is a diagram showing the relationship between θa and Sm in an optical laminate.

FIG. 2 is a diagram showing the relationship between the average inclination angle θa (in degree) in the concavoconvexes part of the anti-dazzling layer in the optical laminate and the average spacing Sm (μm) of the concavoconvexes. As can be seen from FIG. 2, in the conventional AG, specifically, AG having a θa value of not less than 1.5 degrees and not more than 2.5 degrees and an Sm value of approximately more than 30 μm and not more than 200 μm (an area indicated by a reference numeral 9), that is, one falling within the area indicated by a reference numeral 11, has been regarded as a preferred AG. On the other hand, in the optical laminate (HG) according to the present invention, the θa value is more than 0.1 degree and not more than 1.2 degrees. Preferably, the lower limit of the θa value is 0.3 degree, and the upper limit of the θa value is 0.6 degree. The Sm value is approximately not less than 100 μm and not more than 600 μm. Preferably, the lower limit of the Sm value is 120 μm, and the upper limit of the Sm value is 400 μm. Specifically, an optical laminate falling within an area indicated by a reference numeral 7 is utilized. The Rz value of the optical laminate according to the present invention is more than 0.2 μm (preferably not less than 0.35 μm) and not more than 1.2 μm (not more than 1 μm, preferably not more than 0.9 μm).

Layer Construction

Figure 3:
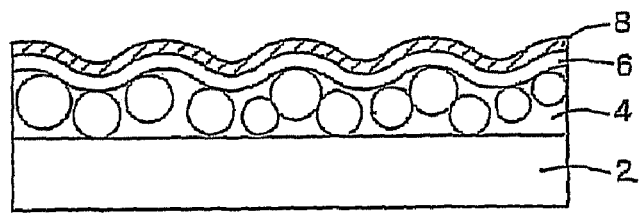
FIG. 3 is a schematic cross-sectional view of an optical laminate according to the present intervention.

The optical laminate (HG) according to the present invention will be described with reference to FIG. 3. FIG. 3 is a cross-sectional view of the optical laminate according to the present invention. An anti-dazzling layer 4 is provided on the upper surface of a light transparent base material 2, and the anti-dazzling layer 4 comprises a resin and fine particles. In a more preferred embodiment of the present invention, a slip layer 6 is provided on the upper part of the anti-dazzling layer 4. In an optical laminate in a preferred embodiment of the present invention, a low-refractive index layer 8 having a lower refractive index than the anti-dazzling layer 4 or slip layer 6 is provided on the surface of the slip layer 6.

1. Anti-dazzling Layer

In the present invention, an anti-dazzling layer is provided on a light transparent base material. In the present invention, a previously formed anti-dazzling layer may be formed on the surface of the optical laminate. Additional methods for forming the anti-dazzling layer on the surface of the optical laminate include 1) a method in which an anti-dazzling layer having a concavoconvex shape is formed using a composition for an anti-dazzling layer comprising fine particles added to a resin, 2) a method in which an anti-dazzling layer having a concavoconvex shape is formed using a composition for an anti-dazzling layer containing only a resin or the like without the addition of fine particles, and 3) a method in which an anti-dazzling layer is formed by using treatment for forming a concavoconvex shape. In the present invention, when an anti-dazzling layer is previously formed, the anti-dazzling layer may be one formed by any one of the above methods 1) to 3). The thickness of the anti-dazzling layer is not less than 0.5 μm and not more than 27 (preferably not more than 12 μm). Preferably, the lower limit of the thickness of the anti-dazzling layer is 1 μm, and the upper limit of the anti-dazzling layer is 23 μm (preferably 7 μm).

When the anti-dazzling layer is formed by applying the composition for an anti-dazzling layer, the composition for an anti-dazzling layer can be cured to a gel fraction of not less than 30% and not more than 80%. Preferably, the lower limit of the gel fraction is 35%, more preferably 40%. Preferably, the upper limit of the gel fraction is 70%, more preferably 60%.

1) Fine Particles in Anti-Dazzling Layer Formed Using Composition for Anti-dazzling Layer Comprising Fine Particles Added to Resin The fine particles may be in a spherical, for example, truly spherical or elliptical form, preferably in a truly spherical form. In the present invention, the average particle diameter R (μm) of the fine particles is not less than 1.0 μm and not more than 20 μm. Preferably, the upper limit is 15.0 μm, and the lower limit is 3.5 μm.

In the present invention, not less than 80% (preferably not less than 90%) of the whole fine particles is accounted for by fine particles having an average particle diameter distribution of R±1.0 (preferably 0.3) μm. When the average particle diameter distribution of the fine particles falls within the above-defined range, the evenness of the concavoconvex shape of the anti-dazzling laminate can be rendered good and, at the same time, scintillation and the like can be effectively prevented. Further, the anti-dazzling layer may further comprise, in addition to the fine particles, second fine particles or third fine particles or a combination of a plurality of types of fine particles different from the fine particles in average particle diameter. For example, for small fine particles of which the average particle diameter R (μm) is approximately the lower limit value, i.e., about 3.5 μm, a concavoconvex layer can be efficiently formed using fine particles having a grain size distribution with the average particle diameter being 3.5 μm rather than monodisperse fine particles.

(Aggregation-type) Fine Particles

In a preferred embodiment of the present invention, the anti-dazzling layer comprises first fine particles and second fine particles different from the first fine particles in average particle diameter. Further, in a preferred embodiment of the present invention, the use of aggregation-type fine particles among the fine particles is preferred. The aggregation-type fine particles may be identical fine particles, or alternatively may be a plurality of types of fine particles, the plurality of types being different from each other in average particle diameter. In a preferred embodiment of the present invention, the aggregation-type fine particles comprise first fine particles and second fine particles different from the first fine particles in average particle diameter. Further, in a more preferred embodiment of the present invention, the second fine particle as such or the aggregation part as such does not exhibit anti-dazzling properties in the anti-dazzling layer.

In the present invention, preferably, the fine particles satisfy the following formula (I):

$$0.25R \text{ (preferably } 0.50) \leq r \leq 1.0R \text{ (preferably } 0.70) \qquad (I)$$

wherein R represents the average particle diameter of the fine particles, μm; and r represents the average particle diameter of the second fine particles, μm.

When the r value is not less than 0.25R, the dispersion of the coating liquid is easy and, consequently, the particles are not aggregated. In the step of drying after coating, a uniform concavoconvex shape can be formed without undergoing an influence of wind during floating. Further, when r is not more than 0.85R, advantageously, the function of the fine particles can be clearly distinguished from the function of the first fine particles.

In another embodiment of the present invention, preferably, the total weight ratio per unit area among the resin, (first) fine particles, and second fine particles satisfies requirements represented by formulae (II) and (III):

$$0.08 \leq (M_1 + M_2)/M \leq 0.36 \quad \text{(II)}$$

$$0 \leq M_2 \leq 4.0 M_1 \quad \text{(III)}$$

wherein $M_1$ represents the total weight of the (first) fine particles per unit area; $M_2$ represents the total weight of the second fine particles per unit area; and M represents the total weight of the resin per unit area.

In another preferred embodiment of the present invention, preferably, a requirement represented by formula (IV) is satisfied:

$$\Delta n = |n_1 - n_3| < 0.15 \text{ and/or } \Delta n = |n_2 - n_3| < 0.18 \quad \text{(IV)}$$

wherein $n_1$, $n_2$, and $n_3$ represent the refractive indexes of the (first) fine particles, the second fine particles, and the resin, respectively.

Fine particles (second fine particles) may be of inorganic type and organic type and are preferably formed of an organic material. The fine particles exhibit anti-dazzling properties and are preferably transparent. Specific examples of such fine particles include plastic beads, and transparent plastic beads are more preferred. Specific examples of plastic beads include styrene beads (refractive index 1.59), melamine beads (refractive index 1.57), acryl beads (refractive index 1.49), acryl-styrene beads (refractive index 1.54), polycarbonate beads, and polyethylene beads. In a preferred embodiment of the present invention, the plastic bead has a hydrophobic group on its surface, and, for example, styrene beads are preferred.

Resin

The anti-dazzling layer according to the present invention may be formed from a (curing-type) resin. In the present invention, the "resin" is a concept including resin components such as monomers and oligomers. The curing-type resin is preferably transparent, and specific examples thereof are classified into ionizing radiation curing resins which are curable upon exposure to ultraviolet light or electron beams, mixtures of ionizing radiation curing resins with solvent drying resins, or heat curing resins. Preferred are ionizing radiation curing resins.

Specific examples of ionizing radiation curing resins include those containing an acrylate-type functional group, for example, oligomers or prepolymers and reactive diluents, for example, relatively low-molecular weight polyester resins, polyether resins, acrylic resins, epoxy resins, urethane resins, alkyd resins, spiroacetal resins, polybutadiene resins, and polythiol polyene resins and (meth)acrylates of polyfunctional compounds such as polyhydric alcohols. Specific examples thereof include monofunctional monomers such as ethyl(meth)acrylate, ethylhexyl(meth)acrylate, styrene, methyl styrene, and N-vinylpyrrolidone, and polyfunctional monomers, for example, polymethylolpropane tri(meth) acrylate, hexanediol (meth)acrylate, tripropylene glycol di(meth)acrylate, diethylene glycol di(meth)acrylate, pentaerythritol tri(meth)acrylate, dipentaerythritol hexa(meth) acrylate, 1,6-hexanediol di(meth)acrylate, and neopentyl glycol di(meth)acrylate.

When ionizing radiation curing resins are used as an ultraviolet curing resin, preferably, a photopolymerization initiator is used. Specific examples of photopolymerization initiators include acetophenones, benzophenones, Michler's benzoyl benzoate, α-amyloxime ester, tetramethyl thiuram monosulfide, and thioxanthones. Preferably, photosensitizers are mixed in the system. Specific examples of photosensitizers include n-butylamine, triethylamine, and poly-n-butylphosphine.

The solvent drying-type resin used as a mixture with the ionizing radiation curing resin is mainly a thermoplastic resin. Commonly exemplified thermoplastic resins are usable. Coating defects of the coated face can be effectively prevented by adding the solvent drying-type resin. Specific examples of thermoplastic resins include styrene resins, (meth)acrylic resins, vinyl acetate resins, vinyl ether resins, halogen-containing resins, alicyclic olefin resins, polycarbonate resins, polyester resins, polyamide resins, cellulose derivatives, silicone resins, and rubbers or elastomers. The resin is generally noncrystalline and, at the same time, is soluble in an organic solvent (particularly a common solvent which can dissolve a plurality of polymers and curable compounds). Particularly preferred are resins having good moldability or film forming properties, transparency, and weathering resistance, for example, styrene resins, (meth)acrylic resins, alicyclic olefin resins, polyester resins, cellulose derivatives (for example, cellulose esters).

In a preferred embodiment of the present invention, when the light transparent base material is formed of a cellulosic resin such as triacetylcellulose "TAC," examples of preferred thermoplastic resins include cellulosic resins, for example, nitrocellulose, acetylcellulose, cellulose acetate propionate, and ethylhydroxyethylcellulose. When the cellulosic resin is used, the adhesion between the light transparent base material and the antistatic layer (if any) and transparency can be improved. In addition to the above-described cellulose derivatives such as acetylcellulose, nitrocellulose, acetylbutylcellulose, ethylcellulose, and methylcellulose, vinyl resins such as vinyl acetate and its copolymers, vinyl chloride and its copolymers, and vinylidene chloride and its copolymers, acetal resins such as polyvinylformal and polyvinylbutyral, acrylic resins such as acrylic resin and its copolymers and methacrylic resin and its copolymers, polystyrene resins, polyamide resins, and polycarbonate resins.

Specific examples of heat curing resin include phenolic resins, urea resins, diallyl phthalate resins, melamine resins, guanamine resins, unsaturated polyester resins, polyurethane resins, epoxy resins, aminoalkyd resins, melamine-urea cocondensed resins, silicone resins, and polysiloxane resins. When the heat curing resin is used, if necessary, for example, curing agents such as crosslinking agents and polymerization initiators, polymerization accelerators, solvents, and viscosity modifiers may be further added.

Formation of Anti-dazzling Layer

The anti-dazzling layer may be formed by mixing fine particles or aggregation-type fine particles (preferably first fine particles and second fine particles) and the resin with a proper solvent to give a liquid composition and coating the liquid composition onto a light transparent base material. Suitable solvents used in this case include alcohols such as isopropyl alcohol, methanol, and ethanol; ketones such as methyl ethyl ketone (MEK), methyl isobutyl ketone (MIBK), and cyclohexanone; esters such as methyl acetate, ethyl acetate, and butyl acetate; halogenated hydrocarbons; aromatic hydrocarbons such as toluene and xylene; or their mixtures.

In a preferred embodiment of the present invention, preferably, a fluoro- or silicone-type or other leveling agent is added to the above liquid composition. The liquid composition to which the leveling agent has been added, can effectively prevent the inhibition of curing by oxygen to the surface of the coating film during coating or drying and, at the same time, impart scratch resistant effect. Preferably, the leveling agent is utilized in film-shaped light transparent base materials (for example, triacetylcellulose) which should be resistant to heat.

Methods usable for coating the liquid composition onto the light transparent base material include coating methods such as roll coating, Mayer bar coating, and gravure coating. After coating of the liquid composition, the coating is dried and cured by ultraviolet irradiation. Examples of ultraviolet sources include light sources, for example, ultra-high-pressure mercury lamps, high-pressure mercury lamps, low-pressure mercury lamps, carbon arc lamps, black light fluorescent lamps, and metal halide lamps. Regarding the wavelength of the ultraviolet light, a wavelength range of 190 to 380 nm may be used. Specific examples of electron beam sources include various electron beam accelerators, for example, Cockcroft-Walton accelerators, van de Graaff accelerators, resonance transformer accelerators, insulated core transformer accelerators, linear accelerators, Dynamitron accelerators, and high-frequency accelerators. The resin is cured, and the fine particles in the resin are fixed to form a desired concavoconvex shape on the outermost surface of the anti-dazzling layer.

2) Anti-dazzling Layer Formed Using Composition for Anti-Dazzling Layer, Free from Fine Particles and Containing Resin and the Like The anti-dazzling layer may be formed by mixing at least one polymer with at least one curable resin precursor in a proper solvent to prepare a composition for an anti-dazzling layer and applying the composition onto a light transparent base material.

Polymer

The polymer may be a plurality of polymers which can be phase separated by a spinodal decomposition, for example, a cellulose derivative and a styrenic resin, an (meth)acrylic resin, an alicyclic olefin resin, a polycarbonate resin, a polyester resin or the like, or a combination thereof. The curable resin precursor may be compatible with at least one polymer in the plurality of polymers. At least one of the plurality of polymers may have a functional group involved in a curing reaction of the curable resin precursor, for example, a polymerizable group such as an (meth)acryloyl group. In general, a thermoplastic resin is used as the polymer component.

Specific examples of thermoplastic resins include styrenic resins, (meth)acrylic resins, organic acid vinyl ester resins, vinyl ether resins, halogen-containing resins, olefin resins (including alicyclic olefin resins), polycarbonate resins, polyester resins, polyamide resins; thermoplastic polyurethane resins, polysulfone resins (for example, polyethersulfone and polysulfone), polyphenylene ether resins (for example, polymers of 2,6-xylenol), cellulose derivatives (for example, cellulose esters, cellulose carbamates, and cellulose ethers), silicone resins (for example, polydimethylsiloxane and polymethylphenylsiloxane), and rubbers or elastomers (for example, diene rubbers such as polybutadiene and polyisoprene, styrene-butadiene copolymers, acrylonitrile-butadiene copolymers, acrylic rubbers, urethane rubbers, and silicone rubbers). They may be used either solely or in a combination of two or more.

Specific examples of styrenic resins include homopolymers or copolymers of styrenic monomers (for example, polystyrenes, styrene-α-methylstyrene copolymers, and styrene-vinyltoluene copolymers) and copolymers of styrenic monomers with other polymerizable monomers (for example, (meth)acrylic monomers, maleic anhydride, maleimide monomers, or dienes). Styrenic copolymers include, for example, styrene-acrylonitrile copolymers (AS resins), copolymers of styrene with (meth)acrylic monomers (for example, styrene-methyl methacrylate copolymers, styrene-methyl methacrylate-(meth)acrylic ester copolymers, or styrene-methyl methacrylate-(meth)acrylic acid copolymers), and styrene-maleic anhydride copolymers. Preferred styrenic resins include copolymers of polystyrene or styrene with (meth)acrylic monomers (for example, copolymers composed mainly of styrene and methyl methacrylate, for example, styrene-methyl methacrylate copolymers), AS resins, and styrene-butadiene copolymers.

For example, homopolymers or copolymers of (meth)acrylic monomers and copolymers of (meth)acrylic monomers with copolymerizable monomers may be mentioned as the (meth)acrylic resin. Specific examples of (meth)acrylic monomers include (meth)acrylic acid; $C_{1-10}$ alkyl(meth)acrylates such as methyl (meth)acrylate, ethyl(meth)acrylate, butyl(meth)acrylate, t-butyl (meth)acrylate, isobutyl(meth)acrylate, hexyl(meth)acrylate, octyl (meth)acrylate, and 2-ethylhexyl(meth)acrylate; aryl (meth)acrylates such as phenyl(meth)acrylate; hydroxyalkyl (meth)acrylate such as hydroxyethyl(meth)acrylate and hydroxypropyl(meth)acrylate; glycidyl(meth)acrylate; N,N-dialkylaminoalkyl(meth)acrylate; (meth)acrylonitrile; and (meth)acrylates containing an alicyclic hydrocarbon group, such as tricyclodecane. Specific examples of copolymerizable monomers include the above styrenic monomers, vinyl ester monomers, maleic anhydride, maleic acid, and fumaric acid. These monomers may be used either solely or in a combination of two or more.

Specific examples of (meth)acrylic resins include poly (meth)acrylic esters such as polymethyl methacrylate, methyl methacrylate-(meth)acrylic acid copolymers, methyl methacrylate-(meth)acrylic ester copolymers, methyl methacrylate-acrylic ester-(meth)acrylic acid copolymers, and (meth)acrylic ester-styrene copolymers (for example, MS resins). Specific examples of preferred (meth)acrylic resins include poly-$C_{1-6}$ alkyl(meth)acrylates such as polymethyl(meth)acrylate. In particular, methyl methacrylate resins composed mainly of methyl methacrylate (approximately 50 to 100% by weight, preferably 70 to 100% by weight) may be mentioned.

Specific examples of organic acid vinyl ester resins include homopolymers or copolymers of vinyl ester monomers (for example, polyvinyl acetate and polyvinyl propionate), copolymers of vinyl ester monomers with copolymerizable monomers (for example, ethylene-vinyl acetate copolymers, vinyl acetate-vinyl chloride copolymers, and vinyl acetate-(meth)acrylic ester copolymers), or their derivatives. Specific examples of vinyl ester resin derivatives include polyvinyl alcohol, ethylene-vinyl alcohol copolymers, and polyvinylacetal resins.

Specific examples of vinyl ether resins include homopolymers or copolymers of vinyl $C_{1-10}$ alkyl ethers such as vinyl methyl ether, vinyl ethyl ether, vinyl propyl ether, or vinyl t-butyl ether, copolymers of vinyl $C_{1-10}$ alkyl ethers with copolymerizable monomers (for example, vinyl alkyl ether-maleic anhydride copolymers). Specific examples of halogen-containing resins include polyvinyl chloride, polyfluorinated vinylidenes, vinyl chloride-vinyl acetate copolymers, vinyl chloride-(meth)acrylic ester copolymers, and vinylidene chloride-(meth)acrylic ester copolymers.

Specific examples of olefinic resins include homopolymers of olefins such as polyethylene and polypropylene, and copolymers such as ethylene-vinyl acetate copolymers, ethylene-vinyl alcohol copolymers, ethylene-(meth)acrylic acid copolymers, and ethylene-(meth)acrylic ester copolymers. Specific examples of alicyclic olefin resins include homopolymers or copolymers of cyclic olefins (for example, norbornene, dicyclopentadiene) (for example, polymers containing an alicyclic hydrocarbon group such as tricyclodecane which is sterically rigid), and copolymers of the above cyclic olefins with copolymerizable monomers (for example, ethylene-norbornene copolymers and propylene-norbornene copolymers). Specific examples of alicyclic olefin resins include those which are available, for example, under the tradenames "ARTON" and "ZEONEX."

Specific examples of polycarbonate resins include aromatic polycarbonates based on bisphenols (for example, bisphenol A), and aliphatic polycarbonates such as diethylene glycol bisallyl carbonates.

Specific examples of polyester resins include aromatic polyesters using aromatic dicarboxylic acids such as terephthalic acid, for example, homopolyesters, for example, poly-$C_{2-4}$-alkylene terephthalates and poly-$C_{2-4}$-alkylene naphthalates including polyethylene terephthalate and polybutylene terephthalate, and copolyesters comprising as a main component (for example, not less than 50% by weight) $C_{2-4}$ alkylene arylate units ($C_{2-4}$ alkylene terephthalate and/or $C_{2-4}$ alkylene naphthalate units). Specific examples of copolyesters include copolyesters in which, in the constituent units of poly-$C_{2-4}$-alkylene arylate, a part of $C_{2-4}$ alkylene glycol has been replaced, for example, with a polyoxy-$C_{2-4}$-alkylene glycol, a $C_{6-10}$ alkylene glycol, an alicyclic diol (for example, cyclohexanedimethanol or hydrogenated bisphenol A), an aromatic ring-containing diol (for example, 9,9-bis(4-(2-hydroxyethoxy)phenyl)fluorene having a fluorenone side chain, bisphenol A, or a bisphenol A-alkylene oxide adduct), and copolyesters in which a part of aromatic dicarboxylic acid has been replaced with an aliphatic $C_{6-12}$ dicarboxylic acid, for example, an asymmetric aromatic dicarboxylic acid such as phthalic acid or isophthalic acid, or adipic acid. Specific examples of polyester resins include polyarylate resins, aliphatic polyesters using aliphatic dicarboxylic acids such as adipic acid, and homopolymers and copolymers of lactones such as s-caprolactone. Preferred polyester resins are generally noncrystalline polyester resins such as noncrystalline copolyesters (for example, $C_{2-4}$ alkylene arylate copolyesters).

Specific examples of polyamide resins include aliphatic polyamides such as nylon 46, nylon 6, nylon 66, nylon 610, nylon 612, nylon 11, and nylon 12, and polyamides produced from dicarboxylic acids (for example, terephthalic acid, isophthalic acid, or adipic acid) and diamines (for example, hexamethylenediamine or metaxylylenediamine). Specific examples of polyamide resins include homopolymers or copolymers of lactams such as ε-caprolactam. The polyamide resins may be either homopolyamides or copolyamides.

Specific examples of cellulose esters among the cellulose derivatives include, for example, aliphatic organic acid esters, for example, cellulose acetates such as cellulose diacetate and cellulose triacetate; and $C_{1-6}$ organic acid esters such as cellulose propionate, cellulose butyrate, cellulose acetate propionate, and cellulose acetate butyrate. Further examples thereof include aromatic organic acid esters ($C_{7-12}$ aromatic carboxylic esters such as cellulose phthalate and cellulose benzoate) and inorganic acid esters, for example, cellulose phosphate and cellulose sulphate. Mixed acid esters such as acetic acid-nitric acid cellulose ester may also be used. Specific examples of cellulose derivatives include cellulose carbamates (for example, cellulose phenylcarbamate) and further include cellulose ethers, for example, cyanoethylcellulose; hydroxy-$C_{2-4}$-alkylcelluloses such as hydroxyethylcellulose and hydroxypropylcellulose; $C_{1-6}$ alkylcelluloses such as methylcellulose and ethylcellulose; and carboxymethylcellulose or its salt, benzylcellulose, and acetylalkylcellulose.

Specific examples of preferred thermoplastic resins include styrenic resins, (meth)acrylic resins, vinyl acetate resins, vinyl ether resins, halogen-containing resins, alicyclic olefin resins, polycarbonate resins, polyester resins, polyamide resins, cellulose derivatives, silicone resins, rubbers or elastomers. Resins, which are usually noncrystalline and soluble in organic solvents (particularly common solvents which can dissolve a plurality of polymers or curable compounds). Particularly preferred are, for example, resins having a high level of moldability or film formability, transparency and weathering resistance, for example, styrenic resins, (meth)acrylic resins, alicyclic olefin resins, polyester resins, and cellulose derivatives (for example, cellulose esters).

Polymers containing a functional group involved in a curing reaction (or a functional group reactive with a curable compound) are also usable as the polymer component. The polymers may contain a functional group in the main chain or side chain. The functional group may be introduced into the main chain, for example, by copolymerization or co-condensation. In general, however, the functional group is introduced into the side chain. Specific examples of such functional groups include condensable groups and reactive groups (for example, hydroxyl group, acid anhydride group, carboxyl group, amino group or imino group, epoxy group, glycidyl group, and isocyanate group), polymerizable groups (for example, $C_{2-6}$ alkenyl groups such as vinyl, propenyl, isopropenyl, butenyl and allyl groups, $C_{2-6}$ alkynyl groups such as ethynyl, propynyl, and butynyl groups, and $C_{2-6}$ alkenylidene groups such as vinylidene), or groups containing these polymerizable groups (for example, (meth)acryloyl group). Among these functional groups, polymerizable groups are preferred.

The polymerizable group may be introduced into the side chain, for example, by reacting a thermoplastic resin containing a functional group such as a reactive group or a condensable group with a polymerizable compound containing a group reactive with the functional group.

Examples of such functional group-containing thermoplastic resins include thermoplastic resins containing a carboxyl group or its acid anhydride group (for example, (meth)acrylic resins, polyester resins, and polyamide resins), hydroxyl group-containing thermoplastic resins (for example, (meth)acrylic resins, polyurethane resins, cellulose derivatives, and polyamide resins), amino group-containing thermoplastic resins (for example, polyamide resins), epoxy group-containing thermoplastic resins (for example, epoxy group-containing (meth)acrylic resins and polyester resins). Resins comprising the above functional group introduced into thermoplastic resins such as styrenic resins, olefinic resins, or alicyclic olefinic resins by copolymerization or graft polymerization are also possible.

Regarding the polymerizable compound, thermoplastic resins containing a carboxyl or its acid anhydride group include polymerizable compounds containing epoxy, hydroxyl, amino, or isocyanate groups. Hydroxyl group-containing thermoplastic resins include polymerizable compounds containing carboxyl groups or acid anhydride groups thereof or isocyanate groups. Amino group-containing thermoplastic resins include polymerizable compounds containing carboxyl groups or acid anhydride groups thereof, epoxy groups, and isocyanate groups. Epoxy group-containing thermoplastic resins include polymerizable compounds containing carboxyl groups or acid anhydride groups thereof or amino groups.

Among the above polymerizable compounds, epoxy group-containing polymerizable compounds include, for example, epoxycyclo-$C_{5-8}$-alkenyl(meth)acrylates such as epoxycyclohexenyl (meth)acrylate, glycidyl(meth)acrylate, and allyl glycidyl ether. Hydroxyl group-containing compounds include, for example, hydroxy-$C_{1-4}$-alkyl(meth)acrylates such as hydroxypropyl (meth)acrylate, and $C_{2-6}$ alkylene glycol (meth)acrylates such as ethylene glycol mono (meth)acrylate. Amino group-containing polymerizable compounds include, for example, amino-$C_{1-4}$-alkyl (meth) acrylates such as aminoethyl(meth)acrylate, $C_{3-6}$ alkenylamines such as allylamine, and aminostyrenes such as 4-aminostyrene and diaminostyrene. Isocyanate group-containing polymerizable compounds include, for example, (poly)urethane (meth)acrylate and vinyl isocyanate. Polymerizable compounds containing carboxyl groups or acid anhydride groups thereof include, for example, unsaturated carboxylic acids or anhydrides thereof such as (meth)acrylic acid and maleic anhydride.

A combination of a thermoplastic resin containing a carboxyl group or its acid anhydride group with an epoxy group-containing compound, particularly a combination of an (meth)acrylic resin (for example, an (meth)acrylic acid-(meth)acrylic ester copolymer) with an epoxy group-containing (meth)acrylate (for example, epoxycycloalkenyl(meth) acrylate or glycidyl (meth)acrylate) may be mantioned as a representative example of the polymerizable compound. Specific examples thereof include polymers comprising a polymerizable unsaturated group introduced into a part of carboxyl groups in an (meth)acrylic resin, for example, an (meth)acrylic polymer produced by reacting a part of carboxyl groups in an (meth)acrylic acid-(meth)acrylic ester copolymer with an epoxy group in 3,4-epoxycyclohexenylmethyl acrylate to introduce a photopolymerizable unsaturated group into the side chain (CYCLOMER P, manufactured by Daicel Chemical Industries, Ltd.).

The amount of the functional group (particularly polymerizable group) involved in a curing reaction with the thermoplastic resin introduced is approximately 0.001 to 10 moles, preferably 0.01 to 5 moles, more preferably 0.02 to 3 moles based on 1 kg of the thermoplastic resin.

These polymers may be used in a suitable combination. Specifically, the polymer may comprise a plurality of polymers. The plurality of polymers may be phase separated by liquid phase spinodal decomposition. The plurality of polymers may be incompatible with each other. When the plurality of polymers are used in combination, the combination of a first resin with a second resin is not particularly limited. For example, a plurality of suitable polymers incompatible with each other at a temperature around a processing temperature, for example, two suitable polymers incompatible with each other may be used. For example, when the first resin is a styrenic resin (for example, polystyrene or a styrene-acrylonitrile copolymer), examples of second resins usable herein include cellulose derivatives (for example, cellulose esters such as cellulose acetate propionate), (meth)acrylic resins (for example, polymethyl methacrylate), alicyclic olefinic resins (for example, polymers using norbornene as a monomer), polycarbonate resins, and polyester resins (for example, the above poly-$C_{2-4}$-alkylene arylate copolyesters). On the other hand, for example, when the first polymer is a cellulose derivative (for example, a cellulose ester such as cellulose acetate propionate), examples of second polymers usable herein include styrenic resins (for example, polystyrene or styrene-acrylonitrile copolymer), (meth)acrylic resins, alicyclic olefinic resins (for example, polymers using norbornene as a monomer), polycarbonate resins, and polyester resins (for example, the above poly-$C_{2-4}$-alkylene arylate copolyester). In the combination of the plurality of resins, at least cellulose esters (for example, cellulose $C_{2-4}$ alkyl carboxylic esters such as cellulose diacetate, cellulose triacetate, cellulose acetate propionate, or cellulose acetate butyrate) may be used.

The phase separated structure produced by the spinodal decomposition is finally cured by the application of an actinic radiation (for example, ultraviolet light or electron beam), heat or the like to form a cured resin. By virtue of this, the scratch resistance can be imparted to the anti-dazzling layer, and the durability can be improved.

From the viewpoint of scratch resistance after curing, preferably, at least one polymer in the plurality of polymers, for example, one of mutually incompatible polymers (when the first and second resins are used in combination, particularly both the polymers) is a polymer having on its side chain a functional group reactive with a curable resin precursor.

The weight ratio between the first polymer and the second polymer may be selected, for example, from a range of first polymer/second polymer=approximately 1/99 to 99/1, preferably 5/95 to 95/5, more preferably 10/90 to 90/10 and is generally approximately 20/80 to 80/20, particularly 30/70 to 70/30.

Regarding the polymer for phase separated structure formation, in addition to the above two incompatible polymers, the above thermoplastic resins or other polymers may be incorporated.

The glass transition temperature of the polymer may be selected, for example, from a range of approximately −100° C. to 250° C., preferably −50° C. to 230° C., more preferably 0 to 200° C. (for example, approximately 50 to 180° C.). A glass transition temperature of 50° C. or above (for example, approximately 70 to 200° C.), preferably 100° C. or above (for example, approximately 100 to 170° C.), is advantageous from the viewpoint of the surface hardness. The weight average molecular weight of the polymer may be selected, for example, from a range of approximately not more than 1,000,000, preferably 1,000 to 500,000.

Curable Resin Precursor

The curable resin precursor is a compound containing a functional group which can be reacted upon exposure, for example, to heat or an actinic radiation (for example, ultraviolet light or electron beams), and various curable compounds, which can be cured or crosslinked upon exposure to heat, an actinic radiation or the like to form a resin (particularly a cured or crosslinked resin), can be used. Examples of such resin precursors include heat curing compounds or resins [low-molecular weight compounds containing epoxy groups, polymerizable groups, isocyanate groups, alkoxysilyl groups, or silanol groups (for example, epoxy resins, unsaturated polyester resins, urethane resins, or silicone resins)], and photocuring compounds curable upon exposure to an actinic radiation (for example, ultraviolet light) (for example, ultraviolet light curing compounds such as photocuring monomers and oligomers). The photocuring compound may be, for example, an EB (electron beam) curing compound. Photocuring compounds such as photocuring monomers, oligomers, photocuring resins which may have a low-molecular weight, are sometimes referred to simply as "photocuring resin."

Photocuring compounds include, for example, monomers and oligomers (or resins, particularly low-molecular weight resins). Monomers include, for example, monofunctional monomers [(meth)acrylic monomers such as (meth)acrylic esters, vinyl monomers such as vinylpyrrolidone, crosslinked ring-type hydrocarbon group-containing (meth)acrylates such as isobornyl (meth)acrylate or adamantyl(meth)acrylate)], polyfunctional monomers containing at least two polymerizable unsaturated bonds [for example, alkylene glycol di(meth)acrylates such as ethylene glycol di(meth)acrylate, propylene glycol di(meth)acrylate, butanediol di(meth)acrylate, neopentyl glycol di(meth)acrylate, and hexanediol di(meth)acrylate; (poly)oxyalkylene glycol di(meth)acrylates such as diethylene glycol di(meth)acrylate, dipropylene glycol di(meth)acrylate, and polyoxytetramethylene glycol di(meth)acrylate; crosslinked ring-type hydrocarbon group-containing di(meth)acrylates such as tricyclodecane dimethanol di(meth)acrylate and adamantane di(meth)acrylate; and polyfunctional monomers containing about three to six polymerizable unsaturated bonds such as trimethylolpropane tri (meth)acrylate, trimethylolethane tri(meth)acrylate, pentaerythritol tri(meth)acrylate, pentaerythritol tetra(meth) acrylate, and dipentaerythritol penta(meth)acrylate].

Oligomers or resins include (meth)acrylate or epoxy (meth)acrylate of bisphenol A-alkylene oxide adducts (for example, bisphenol A-type epoxy(meth)acrylate and novolak-type epoxy (meth)acrylate), polyester (meth)acrylates (for example, aliphatic polyester-type (meth)acrylate and aromatic polyester-type (meth)acrylate), (poly)urethane (meth)acrylate (for example, polyester-type urethane (meth) acrylate, polyether-type urethane (meth)acrylate), and silicone (meth)acrylate. These photocuring compounds are usable either solely or in a combination of two or more.

Preferred curable resin precursors include photocuring compounds curable in a short time, for example, ultraviolet light curing compounds (for example, monomers, oligomers and resins which may have a low-molecular weight), and EB curing compounds. Resin precursors which are particularly advantageous from the practical viewpoint are ultraviolet curing resins. From the viewpoint of improving resistance such as scratch resistance, preferably, the photocuring resin is a compound having in its molecule two or more (preferably approximately 2 to 6, more preferably 2 to 4) polymerizable unsaturated bonds. The molecular weight of the curable resin precursor is approximately not more than 5000, preferably not more than 2000, more preferably not more than 1000, from the viewpoint of compatibility with the polymer.

The curable resin precursor may contain a curing agent depending upon the type of the curable resin precursor. For example, in the case of heat curing resins, curing agents such as amines or polycarboxylic acids may be contained, and, in the case of photocuring resins, photopolymerization initiators may be contained. Examples of photopolymerization initiators include commonly used components, for example, acetophenones or propiophenones, benzyls, benzoins, benzophenones, thioxanthones, and acylphosphine oxides. The content of the curing agent such as a photocuring agent is approximately 0.1 to 20 parts by weight, preferably 0.5 to 10 parts by weight, more preferably 1 to 8 parts by weight (particularly 1 to 5 parts by weight), based on 100 parts by weight of the curable resin precursor and may be approximately 3 to 8 parts by weight.

The curable resin precursor may contain a curing accelerator. For example, the photocuring resin may contain photocuring accelerators, for example, tertiary amines (for example, dialkylaminobenzoic esters) and phosphine photopolymerization accelerators.

Specific Combination of Polymer with Curable Resin Precursor

At least two components in at least one polymer and at least one curable resin precursor may be used in a combination of materials which are mutually phase separated at a temperature around the processing temperature. Examples of such combinations include (a) a combination of a plurality of polymers which are mutually incompatible and phase separated, (b) a combination of a polymer and a curable resin precursor which are mutually incompatible and phase separated, and (c) a combination of a plurality of curable resin precursors which are mutually incompatible and phase separated. Among these combinations, (a) a combination of a plurality of polymers and (b) a combination of a polymer with a curable resin precursor are generally preferred, and particularly (a) a combination of a plurality of polymers is preferred. When the compatibility of both the materials to be phase separated is low, both the materials are effectively phase separated in the course of drying for evaporating the solvent and the function as an anti-dazzling layer can be improved.

The thermoplastic resin and the curable resin precursor (or curing-type resin) are generally incompatible with each other. When the polymer and the curable resin precursor are incompatible with each other and phase separated, a plurality of polymers may be used as the polymer. When a plurality of polymers are used, meeting the requirement that at least one polymer is incompatible with the resin precursor (or curing-type resin) suffices for contemplated results, and the other polymer(s) may be compatible with the resin precursor.

A combination of two mutually incompatible thermoplastic resins with a curing compound (particularly a monomer or oligomer containing a plurality of curable functional groups) may be adopted. From the viewpoint of scratch resistance after curing, one polymer (particularly both polymers) in the incompatible thermoplastic resins may be a thermoplastic resin containing a functional group involved in the curing reaction (a functional group involved in curing of the curable resin precursor).

When a combination of a plurality of mutually incompatible polymers is adopted for phase separation, the curable resin precursor to be used in combination with the plurality of mutually incompatible polymers is compatible with at least one polymer in the plurality of incompatible polymers at a temperature around the processing temperature. Specifically, for example, when the plurality of mutually incompatible polymers are constituted by the first resin and the second resin, the curable resin precursor may be one which is compatible with at least one of the first resin and the second resin, preferably is compatible with both the polymer components. When the curable resin precursor is compatible with both the polymer components, phase separation occurs into at least two phases, i.e., a mixture composed mainly of a first resin and a curable resin precursor and a mixture composed mainly of a second resin and a curable resin precursor.

When the compatibility of a plurality of selected polymers is low, the polymers are effectively phase separated from each other in the course of drying for evaporating the solvent and the function as an anti-dazzling layer is improved. The phase separability of the plurality of polymers can be simply determined by a method in which a homogeneous solution is prepared using a good solvent for both the components and the solvent is gradually evaporated to visually inspect whether or not the residual solid matter is opaque in the course of drying.

In general, the polymer and the cured or crosslinked resin produced by curing of the resin precursor are different from each other in refractive index. Further, the plurality of polymers (first and second resins) are also different from each other in refractive index. The difference in refractive index between the polymer and the cured or crosslinked resin, and the difference in refractive index between the plurality of polymers (first and second resins) may be, for example, approximately 0.001 to 0.2, preferably 0.05 to 0.15.

The weight ratio between the polymer and the curable resin precursor is not particularly limited and may be selected from a range of polymer/curable resin precursor=approximately 5/95 to 95/5, and, from the viewpoint of surface hardness, is preferably polymer/curable resin precursor=approximately 5/95 to 60/40, more preferably 10/90 to 50/50, particularly preferably 10/90 to 40/60.

Solvent

The solvent may be selected and used according to the type and solubility of the polymer and curable resin precursor. A solvent capable of homogeneously dissolving at least the solid matter (a plurality of polymers and curable resin precursor, a reaction initiator, and other additives) suffices for contemplated results and may be used in wet spinodal decomposition. Examples of such solvents include ketones (for example, acetone, methyl ethyl ketone, methyl isobutyl ketone, and cyclohexanone), ethers (for example, dioxane and tetrahydrofuran), aliphatic hydrocarbons (for example, hexane), alicyclic hydrocarbons (for example, cyclohexane), aromatic hydrocarbons (for example, toluene and xylene), halogenated hydrocarbons (for example, dichloromethane and dichloroethane), esters (for example, methyl acetate, ethyl acetate and butyl acetate), water, alcohols (for example, ethanol, isopropanol, butanol, and cyclohexanol), cellosolves (for example, methylcellosolve and ethylcellosolve), cellosolve acetates, sulfoxides (for example, dimethylsulfoxide), and amides (for example, dimethylformamide and dimethylacetamide). A mixture solvents composed of two or more of these solvents may be used.

The concentration of the solute (polymer and curable resin precursor, reaction initiator, and other additives) in the composition for an anti-dazzling layer may be selected from such a range that causes phase separation and such a range that castability, coatability and the like are not deteriorated. The solute concentration is, for example, approximately 1 to 80% by weight, preferably 5 to 60% by weight, more preferably 15 to 40% by weight (particularly 20 to 40% by weight).

Method for Anti-dazzling Layer Formation

The anti-dazzling layer may be formed using a composition for an anti-dazzling layer, comprising at least one polymer and at least one curable resin precursor. The use of a composition for an anti-dazzling layer prepared by mixing at least one polymer and at least one curable resin precursor with a suitable solvent is advantageous in that at least an anti-dazzling layer can be formed by forming a phase separated structure by spinodal decomposition from a liquid phase and curing the curable resin precursor.

The spinodal decomposition from the liquid phase can be carried out by evaporating the solvent. The combination of materials which can form a phase separated structure may be, for example, a combination of a plurality of polymers, a combination of a polymer and a curable resin precursor, or a combination of a plurality of curable resin precursors. In this method, an anti-dazzling layer may also be formed by subjecting a composition comprising a thermoplastic resin, a photocuring compound (for example, a photopolymerizable monomer or oligomer), a photopolymerization initiator, and a solvent capable of dissolving the thermoplastic resin and photocurable compound (a common solvent) to spinodal decomposition to form a phase separated structure and exposing the product to light. Alternatively, the anti-dazzling layer may be formed by subjecting a composition comprising a thermoplastic resin, a resin incompatible with the thermoplastic resin and containing a photocurable group, a photocuring compound, a photopolymerization initiator, and a solvent capable of dissolving the resin and the photocuring compound to spinodal decomposition to form a phase separated structure, and applying light to the assembly. In these methods, at least one anti-dazzling layer may be formed on a light transparent base material.

Specific Formation Method

The anti-dazzling layer may be formed by a process comprising the steps of: mixing at least one polymer and at least one curable resin precursor using a proper solvent to prepare a composition for an anti-dazzling layer, applying the composition for an anti-dazzling layer onto a light transparent base material and then subjecting the coating to spinodal decomposition involving the evaporation of the solvent to form a phase separated structure; and curing the curable resin precursor to form at least an anti-dazzling layer. The phase separation step generally comprises the step of coating or casting a mixed liquid containing a polymer and a curable resin precursor and a solvent (particularly a liquid composition such as a homogeneous solution) onto the surface of a light transparent base material and the step of evaporating the solvent from the coating layer or casting layer to form a phase separated structure having a regular or periodical average phase-to-phase distance. The anti-dazzling layer can be formed by curing the curable resin precursor.

In a preferred embodiment of the present invention, the mixed liquid may be a composition for an anti-dazzling layer, comprising a thermoplastic resin, a photocuring compound, a photopolymerization initiator, and a solvent capable of dissolving the thermoplastic resin and photocuring compound. The anti-dazzling layer is formed by applying light to photocurable components in the phase separated structure formed by the spinodal decomposition to cure the photocurable compounds. In another preferred embodiment of the present invention, the mixed liquid may be a composition for an anti-dazzling layer, comprising a plurality of mutually incompatible polymers, a photocuring compound, a photopolymerization initiator, and a solvent. In this case, the anti-dazzling layer is formed by applying light to photocurable components in the phase separated structure formed by the spinodal decomposition to cure the photocurable compounds.

The spinodal decomposition involving the evaporation of the solvent can impart regularity or periodicity to the average distance between domains in the phase separated structure. The phase separated structure formed by the spinodal decomposition can be immediately fixed by curing the curable resin precursor. The curable resin precursor can be cured, for example, by heating or light irradiation or a combination of these methods according to the type of the curable resin precursor. The heating temperature can be selected, for example, from a suitable temperature range, for example, from a range of approximately 50 to 150° C., so far as the phase separated structure is present, and may be selected from the same temperature range as in the phase separation step.

The anti-dazzling layer constituting a part of the optical laminate is formed by forming a phase separated structure in the anti-dazzling layer by spinodal decomposition (wet spinodal decomposition) from a liquid phase. Specifically, a composition for an anti-dazzling layer according to the present invention, comprising a polymer, a curable resin precursor, and a solvent is provided. The solvent is evaporated or removed from the composition for an anti-dazzling layer in its liquid phase (or a homogeneous solution or coating layer thereof) by drying or the like. In the course of drying or the like, an increase in concentration causes phase separation by spinodal decomposition to form a phase separated structure having a relatively regular phase-to-phase distance. More specifically, the wet spinodal decomposition is generally carried out by coating a composition for an anti-dazzling layer (preferably a homogeneous solution) comprising at least one polymer, at least one curable resin precursor, and a solvent onto a support and evaporating the solvent from the coating layer.

In the present invention, in the spinodal decomposition, as the phase separation proceeds, a co-continuous phase structure is formed. As the phase separation further proceeds, the continuous phase is rendered discontinuous by the surface tension of the phase per se to form a liquid droplet phase structure (a sea-island structure of spherical, truly spherical, disk-like, elliptical or other independent phases). Accordingly, depending upon the degree of the phase separation, a structure intermediate between a co-continuous structure and a liquid droplet phase structure (a phase structure in the course of transfer from the co-continuous phase to the liquid droplet phase) can also be formed. The phase separated structure of the anti-dazzling layer according to the present invention may be a see-island structure (a liquid droplet phase structure or a phase structure in which one of the phases is independent or isolated), a co-continuous phase structure (or a network structure), or an intermediate structure in which a co-continuous phase structure and a liquid droplet phase structure exist together. By virtue of the phase separated structure, after the removal of the solvent by drying, fine concavoconvexes can be formed on the surface of the anti-dazzling layer.

In the phase separated structure, concavoconvexes are formed on the surface of the anti-dazzling layer, and, from the viewpoint of enhancing the surface hardness, a liquid droplet phase structure having at least island domains is advantageous. When the phase separated structure composed of the polymer and the precursor (or curable resin) is a see-island structure, the polymer component may constitutes a see phase. From the viewpoint of the surface hardness, however, the polymer component preferably constitutes island domains. The formation of island domains leads to the formation of a concavoconvex shape having desired optical characteristics on the surface of the anti-dazzling layer after drying.

The average distance between domains in the phase separated structure is generally substantially regular or periodical. For example, the average phase-to-phase distance of domains may be, for example, approximately 1 to 70 µm (for example, 1 to 40 µm), preferably 2 to 50 µm (for example, 3 to 30 µm), more preferably 5 to 20 µm (for example, 10 to 20 µm).

3) Anti-dazzling Layer Formed by Treatment for Imparting Concavoconvex Shape 3-1) The anti-dazzling layer according to the present invention may also be an anti-dazzling layer having concavoconvexes formed by forming an anti-dazzling layer and then subjecting the surface of the anti-dazzling layer to embossing treatment for imparting concavoconvexes. For example, a construction may be adopted in which an anti-dazzling layer is provided on a light transparent base material and concavoconvexes are provided on the surface of the anti-dazzling layer. In a preferred embodiment of the present invention, the formation of concavoconvexes on the surface of the anti-dazzling layer is carried out by embossing treatment using a mold having a concavoconvex shape which is reverse to the concavoconvex shape in the anti-dazzling layer. Molds having a reverse concavoconvex shape include emboss plates and emboss rolls. These details may be the same as those in 3-2) which will be described later.

3-2) The anti-dazzling layer may be an anti-dazzling layer having a desired concavoconvex shape formed by adopting a combination of a light transparent base material, a mold having a surface with a concavoconvex shape which is reverse to the concavoconvex shape to be formed on the surface of the anti-dazzling layer, and a composition for an anti-dazzling layer, more specifically by applying a composition for an anti-dazzling layer either as such in combination with a light transparent base material or in the form of a layer stacked on a light transparent base material onto a mold having a surface with a concavoconvex shape which is reverse to the concavoconvex shape to be formed on the surface of the anti-dazzling layer. In this formation method, an optical laminate comprising an anti-dazzling layer having a desired concavoconvex shape can be advantageously produced without the need to incorporate fine particles. The optical laminate can be produced by providing a mold having a surface with a concavoconvex shape which is reverse to the desired concavoconvex shape to be formed on the surface of the anti-dazzling layer, applying a composition for an anti-dazzling layer having a high level of curability onto a light transparent base material either before embossing with the mold or simultaneously with embossing with the mold, curing the coating to integrate the formed anti-dazzling layer having a concavoconvex shape with the light transparent base material. In the present invention, a method may be adopted in which a composition for an anti-dazzling layer is first applied followed by embossing with a mold having a concavoconvex mold shape. Alternatively, a method may also be adopted in which a composition for an anti-dazzling layer is supplied to the interface of a light transparent base material and a mold having a concavoconvex shape to allow the composition for an anti-dazzling layer to be interposed between the mold having a concavoconvex shape and the light transparent base material and to the formation of the concavoconvex shape and the formation of the anti-dazzling layer simultaneously. In a preferred embodiment of the present invention, in addition to the emboss roller, a flat emboss plate may also be used.

The mold surface having a concavoconvex shape formed, for example, in an emboss roller or a flat emboss plate may be formed by various methods, specifically by a sandblasting method or a bead shot method. The anti-dazzling layer formed using an emboss plate (an emboss roller) formed by the sandblast method has such a shape that a number of concaves (on the other hand, downward convexed cross section) are distributed on the upper side. On the other hand, the anti-dazzling layer formed using an emboss plate (an emboss roller) formed by the bead shot method has such a shape that a number of convexes (on the other hand, upward convexed cross section) are distributed on the upper side.

When the average roughness of concavoconvexes formed on the surface of the anti-dazzling layer is identical, the anti-dazzling layer in which a number of convexes are distributed on its upper side is regarded as causing a lower level of reflection of a lighting equipment in a room or the like as compared with the anti-dazzling layer in which a number of concaves are distributed on its upper side. Accordingly, in a preferred embodiment of the present invention, the concavoconvex shape of the anti-dazzling layer is formed by utilizing a concavoconvex mold having a shape identical to the concavoconvex shape of the anti-dazzling layer by a bead shot method. The concavoconvex shape formed by this concavoconvex mold is such that the proportion of the upward convex cross-sectional shape part is larger than that of the downward convex cross-sectional shape part. In another preferred embodiment of the present invention, the concavoconvex shape of the anti-dazzling layer is formed by utilizing a concavoconvex mold having a shape, which is reverse to the concavoconvex shape of the anti-dazzling layer, formed by the bead shot method. The concavoconvex shape formed by this concavoconvex mold is such that the proportion of the downward convex cross-sectional shape (that is, concave) part is larger than that of the upward convex cross-sectional shape (that is, convex) part.

Mold materials for forming the concavoconvex mold face usable herein include metals, plastics, woods, or composites thereof. Example of preferred mold materials in the present invention are chromium as a metal from the viewpoints of strength and abrasion resistance upon repeated use, and are iron emboss plates (emboss rollers) having a surface plated with chromium, for example, from the viewpoints of cost effectiveness.

Specific examples of particles (beads) sprayed in the formation of the concavoconvex mold by the sandblast or bead shot method include inorganic particles such as metal particles, silica, alumina, or glass. The particle diameter of these particles is preferably about 100 μm to 300 μm. In spraying these particles against the mold material, a method may be adopted in which these particles, together with a high speed gas, are sprayed. In this case, a proper liquid, for example, water or the like may be used in combination with the particles. In the present invention, preferably, the concavoconvex mold having a concavoconvex shape is plated with chromium or the like to improve the durability during use of the mold and is preferred from the viewpoints of film hardening and corrosion prevention.

2. Slip Layer

In the present invention, a slip layer may be formed to regulate the concavoconvex surface of the anti-dazzling layer. In this case, the slip layer is integrated the anti-dazzling layer to exhibit an anti-dazzling function. Accordingly, in the formation of the slip layer, optical property values such as Sm, θa, and Rz as surface concavoconvex shape values fall within the scope of the present invention. Further, when the slip layer is applied onto the anti-dazzling layer, the surface concavoconvex shape of the slip layer is of course identical to the optical property values of the surface concavoconvex shape of the anti-dazzling layer in the present invention. The above matter can be understood from the following detailed description on the slip layer and working examples.

In the slip layer, fine concavoconvexes present along the concavoconvex shape on the scale of one-tenth or less of the concavo-convex scale (profile peak height of concavoconvexes and spacing between profile peaks) in the surface roughness in the concavoconvex shape of the anti-dazzling layer can be sealed for smoothing to form smooth concavoconvexes, or the spacing between profile peaks of the concavoconvexes and peak profile height, and the frequency (number) of the profile peaks can be regulated. The slip layer can be formed, for example, for imparting antistatic properties, refractive index regulation, hardness enhancement, and contamination preventive properties. The thickness (on a cured state bases) of the slip layer is not less than 0.5 μm and not more than 20 μm (preferably not more than 12 μm). Preferably, the lower limit of the thickness of the slip layer is 3 μm, and the upper limit of the thickness of the slip layer is 8 μm.

Resin

The resin (including resin components such as monomers or oligomers) is preferably transparent, and specific examples thereof include three types of resins, i.e., ionizing radiation curing resins which are resins curable upon exposure to ultraviolet light or electron beams, mixtures of ionizing radiation curing resins with solvent drying-type resins, and heat curing resins. Preferred are ionizing radiation curing resins.

Specific examples of ionizing radiation curing resins include those containing acrylic functional groups, for example, relatively low-molecular weight polyester resins, polyether resins, acryl resins, epoxy resins, urethane resins, alkyd resins, spiroacetal resins, polybutadiene resins, polythiol polyene resins, and oligomers or prepolymers and reactive diluents of (meth)acrylates and the like of polyfunctional compounds such as polyhydric alcohols. Specific examples thereof include monofunctional monomers such as ethyl (meth)acrylate, ethylhexyl(meth)acrylate, styrene, methylstyrene, and N-vinylpyrrolidone, and polyfunctional monomers, for example, polymethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

When the ionizing radiation curing resin is an ultraviolet curing resin, the use of a photopolymerization initiator is preferred. Specific examples of photopolymerization initiators include acetophenones, benzophenones, Michler's benzoyl benzoate, α-amyloxime esters, and thioxanthones. Further, the use of a photosensitizer as a mixture with the photopolymerization initiator is preferred. Specific examples of photosensitizers include n-butylamine, triethylamine, and poly-n-butylphosphine.

When the ionizing radiation curing resin is an ultraviolet curing resin, a photopolymerization initiator or a photopolymerization accelerator may be added. In the case of radical polymerizable unsaturated group-containing resin systems, examples of photopolymerization initiators usable herein include acetophenones, benzophenones, thioxanthones, benzoins, and benzoin methyl ethers. They may be used either solely or as a mixture of two or more. On the other hand, in the case of cation polymerizable functional group-containing resin systems, examples of photopolymerization initiators usable herein include aromatic diazonium salts, aromatic sulfonium salts, aromatic iodonium salts, metallocene compounds, and benzoinsulfonic esters. They may be used either solely or as a mixture of two or more. The amount of the photopolymerization initiator added is 0.1 to 10 parts by weight based on 100 parts by weight of the ionizing radiation curing composition.

Thermoplastic resins may mainly be mentioned as the solvent drying-type resin used as a mixture with the ionizing radiation curing resins. The addition of the solvent drying-type resin can effectively prevent a coating film defect of the coated face. The thermoplastic resin may be those commonly exemplified in the art. Specific examples of preferred thermoplastic resins include, for example, styrene resins, (meth)acrylic resins, vinyl acetate resins, vinyl ether resins, halogen-containing resins, alicyclic olefin resins, polycarbonate resins, polyester resins, polyamide resins, cellulose derivatives, silicone resins, and rubbers or elastomers. The resin used is generally noncrystalline and is soluble in organic solvents (particularly common solvents which can dissolve a plurality of polymers or curing compounds). Particularly preferred are resins having a high level of moldability or film forming properties, transparency and weathering properties, for example, styrene resins, (meth)acrylic resins, alicyclic olefin resins, polyester resins, and cellulose derivatives (for example, cellulose esters).

In a preferred embodiment of the present invention, when the material for the light transparent base material is a cellulosic resin such as TAC, specific examples of preferred thermoplastic resins include cellulosic resins, for example, nitrocellulose, acetylcellulose, cellulose acetate propionate, and ethylhydroxyethylcellulose.

Specific example of heat curing resins include phenolic resins, urea resins, diallyl phthalate resins, melanin resins, guanamine resins, unsaturated polyester resins, polyurethane resins, epoxy resins, aminoalkyd resins, melamine-urea cocondensed resins, silicone resins, and polysiloxane resins. When the heat curing resin is used, if necessary, curing agents such as crosslinking agents and polymerization initiators, polymerization accelerators, solvents, viscosity modifiers and the like may be further added.

Polymerization Initiator

In the formation of a slip layer, photopolymerization initiators may be used. Specific examples thereof include 1-hydroxy-cyclohexyl-phenyl-ketone. This compound is commercially available, and examples of commercially available products include Irgacure 184 (tradename, manufactured by Ciba Specialty Chemicals, K.K.).

Antistatic Agent (Electroconductive Agent)

In the present invention, preferably the slip layer contains an antistatic agent. In this case, the slip layer often refers to as a surface modifying layer.

Specific examples of antistatic agents include cationic group-containing various cationic compounds such as quaternary ammonium salts, pyridinium salts, primary, secondary and tertiary amino groups, anionic group-containing anionic compounds such as sulfonic acid bases, sulfuric ester bases, phosphoric ester bases, and phosphonic acid bases, amphoteric compounds such as amino acid and aminosulfuric ester compounds, nonionic compounds such as amino alcohol, glycerin and polyethylene glycol compounds, organometallic compounds such as alkoxides of tin and titanium, and metal chelate compounds such as their acetylacetonate salts.

Further, compounds produced by increasing the molecular weight of the above compounds may also be mentioned. Further, polymerizable compounds, for example, monomers or oligomers, which contain a tertiary amino group, a quaternary ammonium group, or a metallic chelate moiety and are polymerizable upon exposure to ionizing radiations, or organometal compounds such as functional group-containing coupling agents may also be used as the antistatic agent.

Further, electroconductive ultrafine particles may be mentioned as the antistatic agent. Specific examples of electroconductive ultrafine particles include ultrafine particles of metal oxides. Such metal oxides include ZnO (refractive index 1.90; the numerical values within the parentheses being refractive index), $CeO_2$ (1.95), $Sb_2O_2$ (1.71), $SnO_2$ (1.997), indium tin oxide often abbreviated to "ITO" (1.95), $In_2O_3$ (2.00), $Al_2O_3$ (1.63), antimony-doped tin oxide (abbreviated to "ATO," 2.0), and aluminum-doped zinc oxide (abbreviated to "AZO," 2.0). The term "fine particles" refers to fine particles having a size of not more than 1 micrometer, that is, fine particles of submicron size, preferably fine particles having an average particle diameter of 0.1 nm to 0.1

Electroconductive polymers may be mentioned as the antistatic agent, and specific examples thereof include aliphatic conjugated polyacetylenes, aromatic conjugated poly(paraphenylenes), heterocyclic conjugated polypyrroles, polythiophenes, heteroatom-containing conjugated polyanilines, and mixture-type conjugated poly(phenylenevinylenes). Additional examples of electroconductive polymers include double-chain conjugated systems which are conjugated systems having a plurality of conjugated chains in the molecule thereof, and electroconductive composites which are polymers prepared by grafting or block-copolymerizing the above conjugated polymer chain onto a saturated polymer.

In a preferred embodiment of the present invention, the addition amount ratio of the resin to the antistatic agent contained in the slip layer is not less than 5 and not more than 25. Preferably, the upper limit of the addition amount ratio is 20, and the lower limit of the addition amount ratio is 5. The black brightness and total light transmittance can be regulated so as to fall within the numerical value range specified in the present invention by regulating the addition amount of the antistatic agent so as to fall within the above-defined numerical value range.

Solvent

A composition for an antistatic layer comprising the above components mixed with the solvent is utilized for slip layer formation. Specific examples of solvents usable herein include alcohols such as isopropyl alcohol, methanol, and ethanol; ketones such as methyl ethyl ketone, methyl isobutyl ketone, and cyclohexanone; esters such as methyl acetate, ethyl acetate, and butyl acetate; halogenated hydrocarbons; aromatic hydrocarbons such as toluene and xylene; or mixture thereof. Preferred are ketones and esters.

Formation of Slip Layer

The slip layer may be formed by mixing the above resin (including resin components such as monomers and oligomers), the solvent, and optional components together to prepare a composition and coating the composition onto the anti-dazzling layer. In a preferred embodiment of the present invention, fluoro or silicone leveling agents are added to the above liquid composition. The liquid composition to which the leveling agent has been added can improve the coated face, can effectively prevent curing inhibition by oxygen on the coating film surface during coating or drying and can impart scratch resistant effect.

Composition coating methods include roll coating, Mayer's bar coating, and gravure coating. After the coating of the liquid composition, the coating is dried and is cured by ultraviolet irradiation. Specific examples of ultraviolet light sources include ultrahigh pressure mercury lamps, high pressure mercury lamps, low pressure mercury lamps, carbon arc lamps, black light fluorescent lamps, and metal halide lamps. A wavelength region of 190 to 380 nm may be used as wavelengths of the ultraviolet light. Specific examples of electron beam sources include various electron beam accelerators, such as Cockcroft-Walton accelerators, van de Graaff accelerators, resonance transformers, insulated core transformers, linear, dynamitron, and high-frequency electron accelerators.

3. Low-refractive Index Layer

In a preferred embodiment of the present invention, the formation of a low-refractive index layer on the surface of the anti-dazzling layer or slip layer is preferred. The low-refractive index layer is provided on the surface of the anti-dazzling layer or slip layer. The low-refractive index layer has a refractive index which is lower than that of the anti-dazzling layer or slip layer. As described above, in the optical laminate according to the present invention provided with the low-refractive index layer, the concavoconvex shape of the outermost surface of the optical laminate of course conforms to the optical property values of the concavoconvex shape of the surface of the anti-dazzling layer according to the present invention. In a preferred embodiment of the present invention, the anti-dazzling layer has a refractive index of not less than 1.5, and the low-refractive index layer has a refractive index of less than 1.5, preferably not more than 1.45.

Specific examples of low-refractive index agents include silicone-containing vinylidene fluoride copolymers, and an example thereof is a resin composition comprising 100 parts by weight of a fluorine-containing copolymer and 80 to 150 parts by weight of an ethylenically unsaturated group-containing polymerizable compound. The fluorine-containing copolymer has a fluorine content of 60 to 70% by weight and is produced by copolymerizing a monomer composition comprising 30 to 90% by weight of vinylidene fluoride and 5 to 50% by weight of hexafluoropropylene.

A copolymer produced by copolymerizing a monomer composition containing vinylidene fluoride and hexafluoropropylene may be mentioned as the fluorine-containing copolymer. Regarding the proportion of each component in the monomer composition, the content of vinylidene fluoride is 30 to 90% by weight, preferably 40 to 80% by weight, particularly preferably 40 to 70% by weight, and the content of hexafluoropropylene is 5 to 50% by weight, preferably 10 to 50% by weight, particularly preferably 15 to 45% by weight. The monomer composition may further comprise 0 to 40% by weight, preferably 0 to 35% by weight, particularly preferably 10 to 30% by weight, of tetrafluoroethylene.

The monomer composition for producing the fluorine-containing copolymer may if necessary contain other comonomer component(s), for example, in an amount of not more than 20% by weight, preferably not more than 10% by weight. Specific examples of such comonomer components include fluorine atom-containing polymerizable monomers such as fluoroethylene, trifluoroethylene, chlorotrifluoroethylene, 1,2-dichloro-1,2-difluoroethylene, 2-bromo-3,3,3-trifluoroethylene, 3-bromo-3,3-difluoropropylene, 3,3,3-trifluoropropylene, 1,1,2-trichloro-3,3,3-trifluoropropylene, and α-trifluoromethacrylic acid.

The content of fluorine in the fluorine-containing copolymer produced from the monomer composition is preferably 60 to 70% by weight, more preferably 62 to 70% by weight, particularly preferably 64 to 68% by weight. When the fluorine content is in the above-defined range, the fluorine-containing copolymer has good solubility in solvents which will be described later. The incorporation of the fluorine-containing copolymer as a component can realize the formation of a thin film having excellent adhesion, a high level of transparency, a low refractive index, and excellent mechanical strength.

The molecular weight of the fluorine-containing copolymer is preferably 5,000 to 200,000, particularly preferably 10,000 to 100,000, in terms of number average molecular weight as determined using polystyrene as a standard. When the fluorine-containing copolymer having this molecular weight is used, the fluororesin composition has suitable viscosity and thus reliably has suitable coatability.

The refractive index of the fluorine-containing copolymer per se is preferably not more than 1.45, more preferably not more than 1.42, still more preferably not more than 1.40. When the refractive index is in the above defined range, the formed thin film has good antireflection effect.

Formation of Low-refractive Index Layer

A coating film may be formed by exposing the fluorine-containing copolymer and the resin to an actinic radiation if necessary in the presence of a photopolymerization initiator for polymerization, or by heating the fluorine-containing copolymer and the resin in the presence of a thermal polymerization initiator for polymerization. The resin used may be the same as that described above in connection with the anti-dazzling layer.

The addition amount of the resin is 30 to 150 parts by weight, preferably 35 to 100 parts by weight, more preferably 40 to 70 parts by weight, based on 100 parts by weight of the fluorine-containing copolymer. The content of fluorine based on the total amount of the polymer forming component comprising the fluorine-containing copolymer and the resin is 30 to 55% by weight, preferably 35 to 50% by weight.

When the addition amount or the fluorine content is in the above-defined range, the low-refractive index layer has good adhesion to the base material and has a low refractive index, whereby good antireflection effect can be attained.

In forming the low-refractive index layer, preferably, a proper solvent is if necessary used to prepare a resin composition having a viscosity in the range of 0.5 to 5 cps (25° C.), preferably 0.7 to 3 cps (25° C.), which can provide good coatability. This can realize an antireflection film, which can prevent the reflection of visible light well, and the formation of an even and uniform thin coating film, and, at the same time, can form a low-refractive index layer having particularly excellent adhesion to the base material.

The resin can be cured in the same manner as described above in connection with the anti-dazzling layer. When heating means is utilized for curing treatment, preferably, a thermal polymerization initiator which, upon heating, generates, for example, radicals to initiate the polymerization of the polymerizable compound, is added to the fluororesin composition.

The film thickness (nm) $d_A$ of the low-refractive index layer preferably satisfies formula (V):

$$d_A = m\lambda/(4n_A) \quad (V)$$

wherein
  $n_A$ represents the refractive index of the low-refractive index layer;
  m represents a positive odd number, preferably 1;
  λ represents a wavelength, preferably a wavelength value in the range of 480 to 580 nm.

Further, in the present invention, from the viewpoint of a lowering in reflectance, the low-refractive index layer preferably satisfies numerical formula (VI):

$$120 < n_A d_A < 145 \quad (VI)$$

In a preferred embodiment of the present invention, the utilization of "void-containing fine particles" as a low-refractive index agent is preferred. "Void-containing fine particles" can lower the refractive index while maintaining the layer strength of the surface modifying layer. In the present invention, the term "void-containing fine particle" refers to a fine particle which has a structure comprising air filled into the inside of the fine particle and/or an air-containing porous structure and has such a property that the refractive index is lowered in reverse proportion to the proportion of air which occupies the fine particle as compared with the refractive index of the original fine particle. Further, such a fine particle which can form a nanoporous structure in at least a part of the inside and/or surface of the coating film by utilizing the form, structure, aggregated state, and dispersed state of the fine particle within the coating film, is also embraced in the present invention. In the low-refractive index layer using this fine particle, the refractive index can be regulated to 1.30 to 1.45.

Specific examples of preferred void-containing inorganic fine particles are silica fine particles prepared by a technique disclosed in Japanese Patent Laid-Open No. 233611/2001. The void-containing silica fine particles can easily produced. Further, the hardness of the void-containing fine particles is high. Therefore, when a surface modifying layer is formed by using a mixture of the void-containing silica fine particles with a binder, the layer has improved strength and, at the same time, the refractive index can be regulated to a range of approximately 1.20 to 1.45. Hollow polymer fine particles produced by using a technique disclosed in Japanese Patent Laid-Open No. 80503/2002 are a specific example of preferred void-containing organic fine particles.

Fine particles which can form a nanoporous structure in at least a part of the inside and/or surface of the coating film include, in addition to the above silica fine particles, sustained release materials, which have been produced for increasing the specific surface area and adsorb various chemical substances on a packing column and the porous part of the surface, porous fine particles used for catalyst fixation purposes, or dispersions or aggregates of hollow fine particles to be incorporated in heat insulating materials or low-dielectric materials. Specific examples of such fine particles include commercially available products, for example, aggregates of porous silica fine particles selected from tradename Nipsil and tradename Nipgel manufactured by Nippon Silica Industrial Co., Ltd. and colloidal silica UP series (tradename), manufactured by Nissan Chemical Industries Ltd., having such a structure that silica fine particles have been connected to one another in a chain form, and fine particles in a preferred particle diameter range specified in the present invention may be selected from the above fine particles.

The average particle diameter of the "void-containing fine particles" is not less than 5 nm and not more than 300 nm. Preferably, the lower limit of the average particle diameter is 8 nm, and the upper limit of the average particle diameter is 100 nm. More preferably, the lower limit of the average particle diameter is 10 nm, and the upper limit of the average particle diameter is 80 nm. When the average diameter of the fine particles is in the above-defined range, excellent transparency can be imparted to the surface modifying layer.

4. Optional Layer

In another embodiment of the present invention, an antistatic layer (an electroconductive layer) may be formed as an optional layer between layers of the optical laminate (HG) according to the present invention.

Specific examples of methods for antistatic layer formation include a method in which a vapor deposited film is formed by vapor depositing or sputtering, for example, an electroconductive metal or an electroconductive metal oxide onto the upper surface of each layer in the optical laminate, or a method in which a coating film is formed by coating a resin composition comprising electroconductive fine particles dispersed in a resin.

Antistatic Agent

Antistatic agents usable when the antistatic layer is formed of a vapor deposited film, include electroconductive metals or electroconductive metal oxides, for example, antimony-doped indium-tin oxide (hereinafter referred to as "ATO") and indium-tin oxide (hereinafter referred to as "ITO"). The thickness of the vapor deposited film as the antistatic layer is not less than 10 nm and not more than 200 nm. Preferably, the upper limit of the thickness is 100 nm, and the lower limit of the thickness is 50 nm.

The antistatic layer may be formed using a coating liquid containing an antistatic agent. The antistatic agent may be the same as that described above in connection with the slip layer.

Curing Resin

In the present invention, when a coating film is formed using electroconductive fine particles, a curing resin is preferably used. The curing resin may be the same as described above in connection with the formation of the anti-dazzling layer.

Formation of Antistatic Layer

A coating film as the antistatic layer is formed by coating a coating liquid comprising electroconductive fine particles incorporated in a curing resin, for example, by roll coating, Mayer bar coating, or gravure coating. After coating, the coating is dried and cured by ultraviolet light irradiation.

When the curing resin is an ionizing radiation curing resin, the coating of the ionizing radiation curing resin composition as the coating liquid is cured by electron beam or ultraviolet light irradiation. In the case of electron beam curing, for example, an electron beam having an energy of 100 KeV to 300 KeV is used. In the case of ultraviolet curing, for example, ultraviolet light emitted form light sources, for example, ultra-high-pressure mercury lamps, high-pressure mercury lamps, low-pressure mercury lamps, carbon arc lamps, xenon arc lamps, and metal halide lamps.

5. Light Transparent Base Material

The light transparent base material is preferably smooth and possesses excellent heat resistance and mechanical strength. Specific examples of materials usable for the light transparent base material formation include thermoplastic resins, for example, polyesters (polyethylene terephthalate and polyethylene naphthalate), cellulose triacetate, cellulose diacetate, cellulose acetatebutyrate, polyamide, polyimide, polyethersulfone, polysulfone, polypropylene, polymethylpentene, polyvinyl chloride, polyvinylacetal, polyetherketone, polymethyl methacrylate, polycarbonate, and polyurethane. Preferred are polyesters (polyethylene terephthalate and polyethylene naphthalate) and cellulose triacetate.

Films of amorphous olefin polymers (cycloolefin polymers: COPs) having an alicyclic structure may also be mentioned as other examples of the light transparent base material. These films are base materials using norbornene polymers, monocyclic olefinic polymers, cyclic conjugated diene polymers, vinyl alicyclic hydrocarbon polymer resins and the like, and examples thereof include Zeonex and ZEONOR, manufactured by Zeon Corporation (norbornene resins), Sumilight FS-1700 manufactured by Sumitomo Bakelite Co., Ltd., ARTON (modified norbornene resin) manufactured by JSR Corporation, APL (cyclic olefin copolymer) manufactured by Mitsui Chemicals Inc., Topas (cyclic olefin copolymer) manufactured by Ticona, and Optlet OZ-1000 series (alicyclic acrylic resins) manufactured by Hitachi Chemical Co., Ltd. Further, FV series (low birefringent index and low photoelastic films) manufactured by Asahi Kasei Chemicals Corporation are also preferred as base materials alternative to triacetylcellulose.

In the present invention, preferably, these thermoplastic resins are used as a highly flexible thin film. Depending upon the form of use where curability are required, plate-like materials such as plates of these thermoplastic resins or glass plates are also usable.

The thickness of the light transparent base material is not less than 20 μm and not more than 300 μm. Preferably, the upper limit of the thickness is 200 μm, and the lower limit of the thickness is 30 μm. When the light transparent base material is a plate-like material, the thickness is above the upper limit of the above-defined thickness range. In forming an anti-dazzling layer on the light transparent base material, the base material may be previously subjected to physical treatment such as corona discharge treatment or oxidation treatment or may be previously coated with an anchoring agent or a coating material known as a primer from the viewpoint of improving the adhesion.

Second Aspect of the Present Invention

The second aspect of the present invention is the same as the first aspect of the present invention, except that a surface modifying layer is provided on the concavoconvex shape of the anti-dazzling layer in the first aspect of the present invention. Accordingly, the anti-dazzling layer, low-refractive index layer, optional layer(s), and light transparent base material in the second aspect of the present invention may be the same as those in the first aspect of the present invention except for the following matter.

Optical Laminate and its Layer Construction

As with the first aspect of the present invention, the second aspect of the present invention may be described with reference to FIGS. 1 to 3. The construction and details of the second aspect of the present invention is the same as the construction of the first aspect of the present invention, except that the "slip layer 6" in the first aspect of the present invention has been replaced with "surface modifying layer 6." In the present invention, when the anti-dazzling layer is formed by applying a composition for an anti-dazzling layer, preferably, the composition for an anti-dazzling layer can be cured to a gel fraction of not less than 30% and not more than 80%. Preferably, the lower limit of the gel fraction is 35%, more preferably 40%. Preferably, the upper limit of the gel fraction is 70%, more preferably 60%.

2. Surface Modifying Layer

In the present invention, the surface modifying layer is provided to modify the concavoconvex surface of the anti-dazzling layer. In this case, the surface modifying layer is integrated with the anti-dazzling layer to exhibit an anti-dazzling function. Accordingly, optical property values such as Sm, θa, and Rz which are values regarding the concavoconvex shape on the surface of the surface modifying layer fall within the respective ranges specified in the present invention. In addition, the concavoconvex shape of the surface of the surface modifying layer of course conforms to the optical property values of the concavoconvex shape of the surface of the anti-dazzling layer according to the present invention. The above matter can also be understood from the following description and working examples regarding the surface modifying layer.

In the present invention, the surface modifying layer is provided on the concavoconvex surface of the anti-dazzling layer. In the surface modifying layer, fine concavoconvexes present along the concavoconvex shape on the scale of one-tenth or less of the concavo-convex scale (profile peak height of concavoconvexes and spacing between profile peaks) in the surface roughness in the concavoconvex shape of the anti-dazzling layer can be sealed for smoothing to form smooth concavoconvexes, or the spacing between profile peaks of the concavoconvexes and peak profile height, and the frequency (number) of the profile peaks can be regulated. The surface modifying layer can be formed, for example, for imparting antistatic properties, refractive index regulation, hardness enhancement, and contamination preventive properties. Accordingly, in the (anti-dazzling) optical laminate, there is no need to provide a plurality of layers such as an antistatic layer, a low-refractive index layer, and a contamination preventive layer, and a single layer (a surface modifying layer) can attain the effect provided by a combination of the plurality of these layers. The thickness (on a cured state bases) of the surface modifying layer is not less than 0.5 μm (preferably not less than 1.0 μm) and not more than 20 μm (preferably not more than 12 μm). More preferably, the lower limit of the thickness of the surface modifying layer is 3 μm, and the upper limit of the thickness of the surface modifying layer is 8 μm.

Surface Modifying Agent

One material or a mixture of two or more materials selected from the group consisting of antistatic agents, refractive index regulating agents, contamination preventive agents, water repellants, oil repellents, fingerprint adhesion preventive agents, curability enhancing agents, and hardness regulating agents (cushioning property imparting agents) may be mentioned as the surface modifying agent.

Antistatic Agent (Electroconductive Agent)

When an antistatic agent is contained in the surface modifying layer, dust adhesion to the surface of the optical laminate can be effectively prevented. Specific examples of antistatic agents include cationic group-containing various cationic compounds such as quaternary ammonium salts, pyridinium salts, primary, secondary and tertiary amino groups, anionic group-containing anionic compounds such as sulfonic acid bases, sulfuric ester bases, phosphoric ester bases, and phosphonic acid bases, amphoteric compounds such as amino acid and aminosulfuric ester compounds, nonionic compounds such as amino alcohol, glycerin and polyethylene glycol compounds, organometallic compounds such as alkoxides of tin and titanium, and metal chelate compounds such as their acetylacetonate salts. Further, compounds produced by increasing the molecular weight of the above compounds may also be mentioned. Further, polymerizable compounds, for example, monomers or oligomers, which contain a tertiary amino group, a quaternary ammonium group, or a metallic chelate moiety and are polymerizable upon exposure to ionizing radiations, or organometal compounds such as functional group-containing coupling agents may also be used as the antistatic agent.

Further, electroconductive ultrafine particles may be mentioned as the antistatic agent. Specific examples of electroconductive ultrafine particles include ultrafine particles of metal oxides. Such metal oxides include ZnO (refractive index 1.90; the numerical values within the parentheses being refractive index), $CeO_2$ (1.95), $Sb_2O_2$ (1.71), $SnO_2$ (1.997), indium tin oxide often abbreviated to "ITO" (1.95), $In_2O_3$ (2.00), $Al_2O_3$ (1.63), antimony-doped tin oxide (abbreviated to "ATO," 2.0), and aluminum-doped zinc oxide (abbreviated to "AZO," 2.0). The term "fine particles" refers to fine particles having a size of not more than 1 micrometer, that is, fine particles of submicron size, preferably fine particles having an average particle diameter of 0.1 nm to 0.1 μm.

Electroconductive polymers may be mentioned as the antistatic agent, and specific examples thereof include aliphatic conjugated polyacetylenes, aromatic conjugated poly(paraphenylenes), heterocyclic conjugated polypyrroles, polythiophenes, heteroatom-containing conjugated polyanilines, and mixture-type conjugated poly(phenylenevinylenes). Additional examples of electroconductive polymers include double-chain conjugated systems which are conjugated systems having a plurality of conjugated chains in the molecule thereof, and electroconductive composites which are polymers prepared by grafting or block-copolymerizing the above conjugated polymer chain onto a saturated polymer.

In a preferred embodiment of the present invention, the addition amount ratio between the resin and antistatic agent contained in the surface modifying layer is not less than 5 and not more than 25. Preferably, the upper limit of the addition amount ratio is 20, and the lower limit of the addition amount ratio is 5.

Refractive Index Regulating Agent

The refractive index regulating agent may be added to the surface modifying layer to regulate the optical properties of the optical laminate. Examples of such refractive index regulating agents include low-refractive index agents, medium-refractive index agents, and high-refractive index agents.

1) Low-refractive Index Agent

The low-refractive index agent has a lower refractive index than the anti-dazzling layer. In a preferred embodiment of the present invention, the anti-dazzling layer has a refractive index of not less than 1.5, and the low-refractive index agent has a refractive index of less than 1.5, preferably not more than 1.45.

Specific examples of low-refractive index agents include silicone-containing vinylidene fluoride copolymers, and an example thereof is a composition comprising 100 parts by weight of a fluorine-containing copolymer and 80 to 150 parts by weight of an ethylenically unsaturated group-containing polymerizable compound. The fluorine-containing copolymer has a fluorine content of 60 to 70% by weight and is produced by copolymerizing a monomer composition comprising 30 to 90% by weight of vinylidene fluoride and 5 to 50% by weight of hexafluoropropylene.

A copolymer produced by copolymerizing a monomer composition containing vinylidene fluoride and hexafluoropropylene may be mentioned as the fluorine-containing copolymer. Regarding the proportion of each component in the monomer composition, the content of vinylidene fluoride is 30 to 90% by weight, preferably 40 to 80% by weight, particularly preferably 40 to 70% by weight, and the content of hexafluoropropylene is 5 to 50% by weight, preferably 10 to 50% by weight, particularly preferably 15 to 45% by weight. The monomer composition may further comprise 0 to 40% by weight, preferably 0 to 35% by weight, particularly preferably 10 to 30% by weight, of tetrafluoroethylene.

The monomer composition for producing the fluorine-containing copolymer may if necessary contain other comonomer component(s), for example, in an amount of not more than 20% by weight, preferably not more than 10% by weight. Specific examples of such comonomer components include fluorine atom-containing polymerizable monomers such as fluoroethylene, trifluoroethylene, chlorotrifluoroethylene, 1,2-dichloro-1,2-difluoroethylene, 2-bromo-3,3,3-trifluoroethylene, 3-bromo-3,3-difluoropropylene, 3,3,3-trifluoropropylene, 1,1,2-trichloro-3,3,3-trifluoropropylene, and α-trifluoromethacrylic acid.

The content of fluorine in the fluorine-containing copolymer produced from the monomer composition is preferably 60 to 70% by weight, more preferably 62 to 70% by weight, particularly preferably 64 to 68% by weight. When the fluorine content is in the above-defined range, the fluorine-containing copolymer has good solubility in solvents which will be described later. The incorporation of the fluorine-containing copolymer as a component can realize the formation of a optical laminate having excellent adhesion, a high level of transparency, a low refractive index, and excellent mechanical strength.

The molecular weight of the fluorine-containing copolymer is preferably 5,000 to 200,000, particularly preferably 10,000 to 100,000, in terms of number average molecular weight as determined using polystyrene as a standard. When the fluorine-containing copolymer having this molecular weight is used, the fluororesin composition has suitable viscosity and thus reliably has suitable coatability.

The refractive index of the fluorine-containing copolymer per se is preferably not more than 1.45, more preferably not more than 1.42, still more preferably not more than 1.40. When the refractive index is in the above defined range, the formed optical laminate has good antireflection effect.

The addition amount of the resin is 30 to 150 parts by weight, preferably 35 to 100 parts by weight, particularly preferably 40 to 70 parts by weight, based on 100 parts by weight of the fluorine-containing copolymer. The content of fluorine based on the total amount of the polymer forming component comprising the fluorine-containing copolymer and the resin is 30 to 55% by weight, preferably 35 to 50% by weight.

When the addition amount or the fluorine content is in the above-defined range, the surface modifying layer has good adhesion to the base material and has a low refractive index, whereby good antireflection effect can be attained.

In a preferred embodiment of the present invention, the utilization of "void-containing fine particles" as a low-refractive index agent is preferred. "Void-containing fine particles" can lower the refractive index while maintaining the layer strength of the surface modifying layer. In the present invention, the term "void-containing fine particle" refers to a fine particle which has a structure comprising air filled into the inside of the fine particle and/or an air-containing porous structure and has such a property that the refractive index is lowered in reverse proportion to the proportion of air which occupies the fine particle as compared with the refractive index of the original fine particle. Further, such a fine particle which can form a nanoporous structure in at least a part of the inside and/or surface of the coating film by utilizing the form, structure, aggregated state, and dispersed state of the fine particle within the coating film, is also embraced in the present invention.

Specific examples of preferred void-containing inorganic fine particles are silica fine particles prepared by a technique disclosed in Japanese Patent Laid-Open No. 233611/2001. The void-containing silica fine particles can easily produced. Further, the hardness of the void-containing fine particles is high. Therefore, when a surface modifying layer is formed by using a mixture of the void-containing silica fine particles with a binder, the layer has improved strength and, at the same time, the refractive index can be regulated to a range of approximately 1.20 to 1.45. Hollow polymer fine particles produced by using a technique disclosed in Japanese Patent Laid-Open No. 80503/2002 are a specific example of preferred void-containing organic fine particles.

Fine particles which can form a nanoporous structure in at least a part of the inside and/or surface of the coating film include, in addition to the above silica fine particles, sustained release materials, which have been produced for increasing the specific surface area and adsorb various chemical substances on a packing column and the porous part of the surface, porous fine particles used for catalyst fixation purposes, or dispersions or aggregates of hollow fine particles to be incorporated in heat insulating materials or low-dielectric materials. Specific examples of such fine particles include commercially available products, for example, aggregates of porous silica fine particles selected from tradename Nipsil and tradename Nipgel manufactured by Nippon Silica Industrial Co., Ltd. and colloidal silica UP series (tradename), manufactured by Nissan Chemical Industries Ltd., having such a structure that silica fine particles have been connected to one another in a chain form, and fine particles in a preferred particle diameter range specified in the present invention may be selected from the above fine particles.

The average particle diameter of the "void-containing fine particles" is not less than 5 nm and not more than 300 nm. Preferably, the lower limit of the average particle diameter is 8 nm, and the upper limit of the average particle diameter is 100 nm. More preferably, the lower limit of the average particle diameter is 10 nm, and the upper limit of the average particle diameter is 80 nm. When the average diameter of the fine particles is in the above-defined range, excellent transparency can be imparted to the surface modifying layer.

2) High-refractive Index Agent/Medium-refractive Index Agent

The high-refractive index agent and the medium-refractive index agent may be added to the surface modifying layer to further improve antireflective properties. The refractive index of the high-refractive index agent and medium-refractive index agent may be set in a range of 1.46 to 2.00. The medium-refractive index agent has a refractive index in the range of 1.46 to 1.80, and the refractive index of the high-refractive index agent is in the range of 1.65 to 2.00.

These refractive index agents include fine particles, and specific examples thereof (the numerical value within the parentheses being a refractive index) include zinc oxide (1.90), titania (2.3 to 2.7), ceria (1.95), tin-doped indium oxide (1.95), antimony-doped tin oxide (1.80), yttria (1.87), and zirconia (2.0).

Leveling Agent

A leveling agent may be added to the surface modifying layer. Preferred leveling agents include fluorine-type or silicone-type leveling agents. The surface modifying layer to which the leveling agent has been added can realize a good coated face, can effectively prevent the inhibition of curing of the coating film surface by oxygen in coating or drying, and can impart a scratch resistance.

Contamination Preventive Agent

A contamination preventive agent may be added to the surface modifying layer. The contamination preventive agent is mainly used to prevent the contamination of the outermost surface of the optical laminate and can impart scratch resistance to the optical laminate. Specific examples of effective contamination preventive agents include additives which can develop water repellency, oil repellency, and fingerprint wiping-off properties. More specific examples of contamination preventive agents include fluorocompounds and silicon compounds or mixtures of these compounds. More specific examples thereof include fluoroalkyl group-containing silane coupling agents such as 2-perfluorooctylethyltriaminosilane. Among them, amino group-containing compounds are particularly preferred.

Resin

The surface modifying layer may comprises at least a surface modifying agent and a resin (including a resin component such as a monomer and an oligomer). When the surface modifying layer does not contain a surface modifying agent, the resin functions as a curability enhancing agent or functions to render the concavoconvexes of the anti-dazzling layer smooth.

The resin is preferably transparent, and specific examples thereof are classified into ionizing radiation curing resins which are curable upon exposure to ultraviolet light or electron beams, mixtures of ionizing radiation curing resins with solvent drying resins, or heat curing resins. Preferred are ionizing radiation curing resins.

Specific examples of ionizing radiation curing resins include those containing an acrylate-type functional group, for example, oligomers or prepolymers and reactive diluents, for example, relatively low-molecular weight polyester resins, polyether resins, acrylic resins, epoxy resins, urethane resins, alkyd resins, spiroacetal resins, polybutadiene resins, and polythiol polyene resins and (meth)acrylates of polyfunctional compounds such as polyhydric alcohols. Specific examples thereof include monofunctional monomers such as ethyl(meth)acrylate, ethylhexyl(meth)acrylate, styrene, methyl styrene, and N-vinylpyrrolidone, and polyfunctional monomers, for example, polymethylolpropane tri(meth) acrylate, hexanediol (meth)acrylate, tripropylene glycol di(meth)acrylate, diethylene glycol di(meth)acrylate, pentaerythritol tri(meth)acrylate, dipentaerythritol hexa(meth) acrylate, 1,6-hexanediol di(meth)acrylate, and neopentyl glycol di(meth)acrylate.

When the ionizing radiation curing resin is an ultraviolet curing resin, a photopolymerization initiator is preferably used. Specific examples of photopolymerization initiators include acetophenones, benzophenones, Michler's benzoyl benzoate, α-amyloxime ester, and thioxanthones. Preferably, photosensitizers are mixed in the system. Specific examples of photosensitizers include n-butylamine, triethylamine, and poly-n-butylphosphine.

When ionizing radiation curing resins are used as an ultraviolet curing resin, a photopolymerization initiator or a photopolymerization accelerator may be added. In the case of a radical polymerizable unsaturated group-containing resin system, acetophenones, benzophenones, thioxanthones, benzoins, benzoin methyl ether and the like are used as a photopolymerization initiator either solely or as a mixture of two or more. On the other hand, in the case of a cation polymerizable functional group-containing resin system, aromatic diazonium salts, aromatic sulfonium salts, aromatic iodonium salts, metallocene compounds, benzoinsulfonic esters and the like may be used as a photopolymerization initiator either solely or as a mixture of two or more. The amount of the photopolymerization initiator added is 0.1 to 10 parts by weight based on 100 parts by weight of the ionizing radiation curing composition.

The solvent drying-type resin used as a mixture with the ionizing radiation curing resin is mainly a thermoplastic resin. Coating defects of the coated face can be effectively prevented by adding the solvent drying-type resin. Commonly exemplified thermoplastic resins are usable. Specific examples of preferred thermoplastic resins include styrenic resins, (meth)acrylic resins, vinyl acetate resins, vinyl ether resins, halogen-containing resins, alicyclic olefin resins, polycarbonate resins, polyester resins, polyamide resins, cellulose derivatives, silicone resins, and rubbers or elastomers. The resin is generally noncrystalline and, at the same time, is soluble in an organic solvent (particularly a common solvent which can dissolve a plurality of polymers and curable compounds). Particularly preferred are resins having good moldability or film forming properties, transparency, and weathering resistance, for example, styrenic resins, (meth)acrylic resins, alicyclic olefin resins, polyester resins, cellulose derivatives (for example, cellulose esters).

In a preferred embodiment of the present invention, when the light transparent base material is formed of a cellulosic resin such as triacetylcellulose "TAC," examples of preferred thermoplastic resins include cellulosic resins, for example, nitrocellulose, acetylcellulose, cellulose acetate propionate, and ethylhydroxyethylcellulose.

Specific examples of heat curing resin include phenolic resins, urea resins, diallyl phthalate resins, melamine resins, guanamine resins, unsaturated polyester resins, polyurethane resins, epoxy resins, aminoalkyd resins, melamine-urea cocondensed resins, silicone resins, and polysiloxane resins. When the heat curing resin is used, if necessary, for example, curing agents such as crosslinking agents and polymerization initiators, polymerization accelerators, solvents, and viscosity modifiers may be further added.

Polymerization Initiator

In the formation of a surface modifying layer, photopolymerization initiators may be used. Specific examples thereof include 1-hydroxy-cyclohexyl-phenyl-ketone. This compound is commercially available, and examples of commercially available products include Irgacure 184 (tradename, manufactured by Ciba Specialty Chemicals, K.K.).

Solvent

A composition for a surface modifying layer comprising the above components mixed with the solvent is utilized for surface modifying layer formation. Specific examples of solvents usable herein include alcohols such as isopropyl alcohol, methanol, and ethanol; ketones such as methyl ethyl ketone, methyl isobutyl ketone, and cyclohexanone; esters such as methyl acetate, ethyl acetate, and butyl acetate; halogenated hydrocarbons; aromatic hydrocarbons such as toluene and xylene; or mixture thereof. Preferred are ketones and esters.

Method for Surface Modifying Layer Formation

The surface modifying layer may be formed by applying a composition for a surface modifying layer onto the anti-dazzling layer. The composition for a surface modifying layer may be formed by coating methods such as roll coating, Mayer bar coating, or gravure coating. After coating of the composition for a surface modifying layer, the coating is dried and cured by ultraviolet light irradiation. Specific examples of ultraviolet light sources include ultra-high-pressure mercury lamps, high-pressure mercury lamps, low-pressure mercury lamps, carbon arc lamps, black light fluorescent lamps, and metal halide lamps. Regarding the wavelength of the ultraviolet light, a wavelength range of 190 to 380 nm may be used. Specific examples of electron beam sources include various electron beam accelerators, for example, Cockcroft-Walton accelerators, van de Graaff accelerators, resonance transformer accelerators, insulated core transformer accelerators, linear accelerators, Dynamitron accelerators, and high-frequency accelerators.

Optional Layers

The optical laminate according to the present invention comprises a light transparent base material, an anti-dazzling layer, and a surface modifying layer. Optional layers such as an antistatic layer, a low-refractive index layer, and a contamination preventive layer may be further provided. As described above, the concavoconvex shape of the outermost surface of the optical laminate according to the present invention of course conforms to the optical property values of the concavoconvex shape of the surface of the anti-dazzling layer in the present invention. The low-refractive index layer preferably has a lower refractive index than the refractive index of the anti-dazzling layer or surface modifying layer. The antistatic layer, low-refractive index layer, and contamination preventive layer may be formed by using a composition prepared by mixing a resin and the like with an antistatic agent, a low-refractive index agent, a contamination preventive agent or the like as described above in connection with the surface modifying layer. Accordingly, the antistatic agent, low-refractive index agent, contamination preventive agent, resin and the like may be the same as those used in the formation of the surface modifying layer.

Third Aspect of Present Invention

Optical Laminate

The (anti-dazzling) optical laminate according to the present invention comprises a light transparent base material and a light diffusion layer provided on the light transparent base material. In the anti-dazzling optical laminate, it is common practice to form an anti-dazzling layer on the light transparent base material. In the optical laminate according to the third aspect of the present invention, a light diffusion layer is provided instead of the anti-dazzling layer. The term "light diffusion layer" as used herein is a light diffusion layer which is used in light diffusion plates or light diffusion films and is different from those used in the anti-dazzling optical laminate (antireflection laminate). The light diffusion plate or light diffusion film is generally used for evenly spreading light from a light source to enhance visibility in various displays or lighting equipment. These light diffusion plates or light diffusion films are generally provided between a light source and a display and is used for converting a point light source or a line light source to an even surface light source. Light diffusion plates or light diffusion films for backlight for liquid crystal displays include plates for films comprising a light transparent resin such as a polymethyl methacrylate resin or a polycarbonate resin having a concavoconvex shape on its surface. The light diffusion plate or film may also be formed by coating a composition, prepared by dispersing a light diffusing agent in a light transparent resin such as a polymethyl methacrylate resin or a polycarbonate resin or by incorporating and dispersing a light diffusing agent in a light transparent resin, onto a film base. Accordingly, in the present invention, the light diffusion layer may be in the form of a light diffusion plate or film provided with a light diffusion layer.

The light diffusion layer in the third aspect of the present invention functions as the anti-dazzling layer used on the unit side of an image display device. In another embodiment of the present invention, the optical laminate provided with the light diffusion layer according to the third aspect of the present invention may be used as a light diffusion plate (diffusion film) which is generally used on the backlight side of an image display device.

Optical Properties and Layer Construction

In the optical laminate according to the present invention, a light diffusion layer is provided instead of the anti-dazzling layer, and the optical laminate according to the present invention is utilized as simultaneously satisfying anti-dazzling properties and excellent contrast. Accordingly, as with the first aspect of the present invention, the optical properties and layer construction in the third aspect of the present invention may be described with reference to FIGS. 1 to 3. In this case, the construction and details of the optical laminate in the third aspect of the present invention is the same as those in the optical laminate in the first aspect of the present invention, except that the "anti-dazzling layer 4" and the "slip layer 6" described in the first aspect of the present invention are replaced with "light diffusion layer 4" and "surface modifying layer 6," respectively.

Further, in the third aspect of the present invention, the details of the surface modifying layer, low-refractive index layer, optional layers, and light transparent base material are the same as those in the first or second aspect of the present invention except for the following matter.

1. Light Diffusion Layer

Light Diffusing Agent

Light diffusing agents include calcium carbonate and acrylic particles. Specific examples of acrylic particles used in the light diffusing agent include particles of methacrylate polymers such as polymers of methyl methacrylate, ethyl methacrylate, propyl methacrylate, and butyl methacrylate; acrylate polymers such as polymers of methyl acrylate, ethyl acrylate, n-propyl acrylate, isopropyl acrylate, and butyl acrylate; and polymers produced by polymerizing aromatic vinyl monomers such as styrene, vinyltoluene, α-methylstyrene, and styrene halide, and crosslinkable monomers such as allylmethacrylate and triallyl cyanurate. Acrylic particles may be of a single type or a combination of two or more types. The average particle diameter of the acrylic particles is not less than 1 μm and not more than 50 μm. Preferably, the lower limit of the average particle diameter is 6 μm, and the upper limit is 20 μm.

Resin

Specific examples of resins usable in the formation of the light diffusion layer include polyester resins, acrylic resins, polystyrenic resins, polyvinyl chloride resins, polyvinylidene chloride resins, polyethylene resins, polypropylene resins, polyurethane resins, polyamide resins, polyvinyl acetate resins, polyvinyl alcohol resins, epoxy resins, cellulose resins, organosiloxane resins, polyimide resins, polysulfone resins, and polyarylate resins. Among them, polyester resins are preferred, for example, from the viewpoints of controllability of the difference in refractive index from the light diffusing agent, wetting properties, adhesion to the transparent base material, or the scratch resistance, light resistance, and transparency of the resin per se.

Optional Additives

Photostabilizers, heat stabilizers, antistatic agents, leveling agents, and other additive may be further added. Leveling agents include fluorine-type or silicone-type leveling agents. The composition for a light diffusion layer, to which the leveling agent has been added, can effectively prevent the inhibition of curing of the coating film surface by oxygen in coating or drying and can impart scratch resistance effect. The leveling agent can be advantageously utilized in film-shaped light transparent base materials, for example, formed of triacetylcellulose where heat resistance is required.

Light Diffusion Layer (Plate or Film Form)

The "light diffusion layer" according to the present invention may be used in a plate or film form provided on the light transparent base material. In this case, specific examples of such light transparent base materials include those commonly used in the art. Preferably, however, the light transparent base material is formed of polycarbonate or polyethylene terephthalate, for example, from the viewpoint of transparency, light resistance, and coatability. The thickness of the light transparent base material is approximately not less than 50 µm and not more than 200 µm.

Preferred Light Diffusion Layer

In the present invention, when the light diffusion layer is formed using a composition for a light diffusion layer, containing a solvent which can be penetrated into the light transparent base material, the formed assembly has no interface between the light transparent base material and the light diffusion layer. Alternatively, an assembly having no interface between the light transparent base material and the light diffusion layer can also be formed by providing a thin layer between the light transparent base material and the light diffusion layer. This is true of the interface between the light transparent base material and the anti-dazzling layer, in the first and second aspect of the present invention.

Substantial Absence of Interface

In a preferred embodiment of the present invention, there is provided an optical laminate free from an interface between a light transparent base material and a light diffusion layer. In the optical laminate according to the present invention, the interface is substantially absent between the light transparent base material and the light diffusion layer. In the present invention, the expression "interface is (substantially) absent" means that there is no interface although two layer faces are superimposed on top of each other, and further connotes that, based on the refractive index value, the interface is judged to be absent between both the layer faces. A specific example of a criterion based on which the "interface is (substantially) absent" is that, when visual observation of the cross section of the optical laminate under a laser microscope shows the presence of interference fringes, the interface is judged to be present, while, when visual observation of the cross section of the optical laminate under a laser microscope shows the absence of interference fringes, the interface is judged to be absent. The laser microscope can observe the cross section of materials different in refractive index in a nondestructive manner. Accordingly, in the case of materials having no significant difference in refractive index therebetween, the results of the measurement show that there is no interface between these materials. Therefore, it can also be judged based on the refractive index that there is no interface between the base material and the light diffusion layer.

Penetrating Solvent

In a preferred embodiment of the present invention, in order to render the interface between the light transparent base material and the light diffusion layer absent, preferably, the light diffusion layer is formed using a composition for a light diffusion layer, which is penetrable into the light transparent base material. The penetrating solvent used for imparting penetrability to the composition for a light diffusion layer is penetrable into the light transparent base material. Accordingly, in the present invention, the term "penetrability" in the penetrating solvent embraces all concepts of penetrating, swelling, wetting and other properties in relation to the light transparent base material. Specific examples of penetrating solvents include alcohols such as isopropyl alcohol, methanol, and ethanol; ketones such as methyl ethyl ketone, methyl isobutyl ketone, and cyclohexanone; esters such as methyl acetate, ethyl acetate, and butyl acetate; halogenated hydrocarbons such as chloroform, methylene chloride, and tetrachloroethane; or their mixtures. Preferred are esters.

Specific examples of penetrating solvents include acetone, methyl acetate, ethyl acetate, butyl acetate, chloroform, methylene chloride, trichloroethane, tetrahydrofuran, methyl ethyl ketone, methyl isobutyl ketone, cyclohexanone, nitromethane, 1,4-dioxane, dioxolane, N-methylpyrrolidone, N,N-dimethylformamide, methanol, ethanol, isopropyl alcohol, butanol, isobutyl alcohol, diisopropyl ether, methylcellosolve, ethylcellosolve, and butylcellosolve. Preferred are methyl acetate, ethyl acetate, butyl acetate, methyl ethyl ketone and the like.

Thin Layer

In a preferred embodiment of the present invention, there is provided an optical laminate comprising a thin layer provided between a light transparent base material and a light diffusion layer, the interface between the light transparent base material and the light diffusion layer having been rendered absent by the presence of the thin layer. This thin layer has been formed using a composition comprising a resin having a weight average molecular weight of not less than 200 and not more than 1000 and containing one or two functional groups, and a penetrating solvent. In the present invention, the "thin layer" embraces concepts of thin films, thin coating films and the like. In a preferred embodiment of the present invention, the thickness of the thin layer is not less than 0.001 µm and not more than 50 µm. Preferably, the lower limit of the layer thickness is 0.01 µm, and the upper limit of the layer thickness is 20 µm.

1) Resin

The resin (including resin components such as monomers and oligomers) for use in the thin layer formation has a weight average molecular weight of not less than 200 and not more than 1000. Preferably, the lower limit of the weight average molecular weight is 220, and the upper limit of the weight average molecular weight is 900. Specific examples of such resins include acrylic resins, polyester resins, polyolefin resins, polycarbonate resins, polyamide resins, polyether resins, epoxy resins, urethane resins, alkyd resins, spiroacetal resins, polybutadiene resins, polythiol polyether resins, polyhydric alcohols, and (meth)acrylate resins such as ethylene glycol (meth)acrylate and pentaerythritol (meth)acrylate monostearate. These resins may be used either solely or as a mixture of two or more. Preferred are urethane resins.

Specific examples of such resins include ethylene glycol diacrylate, triethylene glycol diacrylate, propylene glycol diacrylate, neopentyl glycol diacrylate, 1,6-hexanediol diacrylate, triethylene glycol diacrylate or other compounds, acrylic esters such as dipropylene glycol diacrylate, tripropylene glycol diacrylate, 1,4-butanediol diacrylate, isocyanuric acid EO-modified diacrylate, bisphenol FEO-modified diacrylate, bisphenol AEO-modified diacrylate, 3-methylpentanediol di(meth)acrylate, poly-1,2-butadiene di(meth)acrylate, 3-methylpentanediol diacrylate, diethylene glycol bis-β-acryloyloxy propionate, hydroxypivalic ester neopentyl glycol diacrylate, bisphenol A diglycidyl ether acrylate, N-vinylpyrrolidone, ethylacrylate, and propylacrylate, methacrylic esters such as ethyl methacrylate, propyl methacrylate, isopropyl methacrylate, butyl methacrylate, hexyl methacrylate, isooctyl methacrylate, 2-hydroxyethyl methacrylate, cyclohexyl methacrylate, and nonylphenyl methacrylate, tetrafurfuryl methacrylate and its derivatives such as caprolactone-modified products thereof, styrene, α-methylstyrene, acrylic acid, and their mixtures.

The resin contains one or two functional groups, and examples of such "functional groups" include (meth)acrylate-type functional groups and hydroxyl, carboxyl, epoxy, amino, vinyl, and alkoxy groups, and their mixtures. Preferred are (meth)acrylate-type functional groups.

2) Penetrating Solvents

In forming the thin layer, the resin may be used as a mixture with a penetrating agent. In the present invention, the penetrating agent mainly refers to a solvent which is penetrable into the light transparent base material. Further, the penetrating solvent may be a solvent which is penetrable into a hard coat layer. The penetrating solvent can effectively prevent interference fringes of the optical laminate.

Specific examples of penetrating solvents include alcohols such as methanol, ethanol, isopropyl alcohol, butanol, isobutyl alcohol, methyl glycol, methyl glycol acetate, methylcellosolve, ethylcellosolve, and butylcellosolve; ketones such as acetone, methyl ethyl ketone, methyl isobutyl ketone, cyclohexanone, and diacetone alcohol; esters such as methyl formate, methyl acetate, ethyl acetate, ethyl lactate, and butyl acetate; nitrogen compounds such as nitromethane, N-methylpyrrolidone, and N,N-dimethylformamide; ethers such as diisopropyl ether, tetrahydrofuran, dioxane, and dioxolane; halogenated hydrocarbons such as methylene chloride, chloroform, trichloroethane, and tetrachloroethane; other compounds such as dimethylsulfoxide or propylene carbonate; or their mixtures. More preferred penetrating solvents include methyl acetate, ethyl acetate, butyl acetate, and methyl ethyl ketone.

2. Optical Property Layers

The optical laminate according to the present invention comprises a light transparent base material, a light diffusion layer, and optionally a thin layer. The optical laminate may further comprise the following layers provided for improving the optical properties of the optical laminate.

1) Surface Modifying Layer

In the present invention, a surface modifying layer may be provided for modifying the concavoconvex surface of the optical diffusion layer. For the surface modifying layer, the construction, effect and the like may be the same as those described above in connection with the second aspect of the present invention.

2) Optional Layers

In the optical laminate according to the present invention comprising a light transparent base material, a light diffusion layer, and optionally a surface modifying layer, for example, an antistatic layer, a low-refractive index layer, and a contamination preventive layer may be further provided as further optional layers. In the optional layer, as described above, the concavoconvex shape of the outermost surface of the optical laminate provided with these layers according to the present invention of course conforms to the optical property values of the surface concavoconvex shape of the light diffusion layer in the present invention. The low-refractive index layer preferably has a lower refractive index than the light diffusion layer or the surface modifying layer. The antistatic layer, low-refractive index layer, and contamination preventive layer may be formed using a composition prepared by mixing antistatic agents, low-refractive index agents, contamination preventive agents and the like described above in connection with the surface modifying layer, with a resin and the like. Accordingly, the details of the antistatic agent, low-refractive index agent, contamination preventive agent, resin and the like may be the same as described above in connection with the surface modifying layer (second aspect of the present invention).

Utilization of Optical Laminate

The optical laminates in the first to third aspects of the present invention may be utilized in the following applications.

Polarizing Plate

In another embodiment of the present invention, there is provided a polarizing plate comprising a polarizing element and the optical laminate according to the present invention. More specifically, there is provided a polarizing plate comprising a polarizing element and the optical laminate according to the present invention provided on the surface of the polarizing element, the optical laminate being provided so that the surface of the optical laminate remote from the antidazzling layer (or the light diffusion layer) faces the surface of the polarizing element.

The polarizing element may comprise, for example, polyvinyl alcohol films, polyvinylformal films, polyvinylacetal films, and ethylene-vinyl acetate copolymer-type saponified films, which have been dyed with iodine or a dye and stretched. In the lamination treatment, preferably, the light transparent base material (preferably a triacetylcellulose film) is saponified from the viewpoint of increasing the adhesion or antistatic purposes.

Image Display Device

In a further embodiment of the present invention, there is provided an image display device. The image display device comprises a transmission display and a light source device for applying light to the transmission display from its back side. The optical laminate according to the present invention or the polarizing plate according to the present invention is provided on the surface of the transmission display. The image display device according to the present invention may basically comprise a light source device (backlight), a display element, and the optical laminate according to the present invention. The image display, device is utilized in transmission display devices, particularly in displays of televisions, computers, word processors and the like. Among others, the image display device is used on the surface of displays for high-definition images such as CRTs and liquid crystal panels.

When the image display device according to the present invention is a liquid crystal display device, light emitted from the light source device is applied through the lower side of the optical laminate according to the present invention. In STN-type liquid crystal display devices, a phase difference plate may be inserted into between the liquid crystal display element and the polarizing plate. If necessary, an adhesive layer may be provided between individual layers in the liquid crystal display device.

EXAMPLES

The following embodiments further illustrate the present invention. However, it should be noted that the contents of the present invention are not limited by these embodiments. The "parts" and "%" are by mass unless otherwise specified.

First Aspect of the Present Invention

Compositions for respective layers constituting an optical laminate were prepared according to the following formulations.

Preparation of Composition A for Anti-dazzling Layer

Composition A1 for Anti-dazzling Layer

Pentaerythritol triacrylate (PETA) (manufactured by Nippon Kayaku Co., Ltd., refractive index 1.51) (20.28 parts by mass) as an ultraviolet curing resin, 8.62 parts by mass of DPHA (manufactured by Nippon Kayaku Co., Ltd., refractive index 1.51) as an ultraviolet curing resin, 3.03 parts by mass of an acrylic polymer (manufactured by Mitsubishi Rayon Co., Ltd., molecular weight 75,000) as an ultraviolet curing resin, 1.86 parts by mass of Irgacure 184 (manufactured by Ciba-Geigy Limited) as a photocuring initiator, 0.31 part by mass of Irgacure 907 (manufactured by Ciba-Geigy Limited) as a photocuring initiator, 6.39 parts by mass of monodisperse acrylic beads (manufactured by Nippon Shokubai Kagaku Kogyo Co., Ltd., particle diameter 5.0 μm, refractive index 1.53) as light transparent fine particles, 0.013 part by mass of a silicone leveling agent 10-28 (manufactured by The Inctec Inc.), 47.60 parts by mass of toluene, and 11.90 parts by mass of cyclohexanone were thoroughly mixed together to prepare a composition. This composition was filtered through a polypropylene filter having a pore diameter of 30 μm to prepare composition A1 for an anti-dazzling layer.

Composition A2 for Anti-dazzling Layer

Composition A2 for an anti-dazzling layer was prepared in the same manner as in the composition A1 for an anti-dazzling layer, except that the light transparent fine particles were changed to monodisperse acrylic beads having a particle diameter of 9.5 μm (manufactured by Nippon Shokubai Kagaku Kogyo Co., Ltd., refractive index 1.53).

Composition A3 for Anti-dazzling Layer

Composition A3 for an anti-dazzling layer was prepared in the same manner as in the composition A1 for an anti-dazzling layer, except that the light transparent fine particles were changed to monodisperse acrylic beads having a particle diameter of 13.5 μm (manufactured by Nippon Shokubai Kagaku Kogyo Co., Ltd., refractive index 1.53).

Composition A4 for Anti-dazzling Layer

Pentaerythritol triacrylate (PETA) (manufactured by Nippon Kayaku Co., Ltd., refractive index 1.51) (21.08 parts by mass) as an ultraviolet curing resin, 10.33 parts by mass of DPHA (manufactured by Nippon Kayaku Co., Ltd., refractive index 1.51) as an ultraviolet curing resin, 3.24 parts by mass of an acrylic polymer (manufactured by Mitsubishi Rayon Co., Ltd., molecular weight 75,000) as an ultraviolet curing resin, 2.02 parts by mass of Irgacure 184 (manufactured by Ciba-Geigy Limited) as a photocuring initiator, 0.34 part by mass of Irgacure 907 (manufactured by Ciba-Geigy Limited) as a photocuring initiator, 3.47 parts by mass of monodisperse acrylic beads (manufactured by Nippon Shokubai Kagaku Kogyo Co., Ltd., particle diameter 13.5 μm, refractive index 1.53) as light transparent fine particles, 0.014 part by mass of a silicone leveling agent 10-28 (manufactured by The Inctec Inc.), 47.60 parts by mass of toluene, and 11.90 parts by mass of cyclohexanone were thoroughly mixed together to prepare a composition. This composition was filtered through a polypropylene filter having a pore diameter of 30 μm to prepare composition A4 for an anti-dazzling layer.

Composition A5 for Anti-dazzling Layer

Pentaerythritol triacrylate (PETA) (manufactured by Nippon Kayaku Co., Ltd., refractive index 1.51) (21.88 parts by mass) as an ultraviolet curing resin, 12.03 parts by mass of DPHA (manufactured by Nippon Kayaku Co., Ltd., refractive index 1.51) as an ultraviolet curing resin, 3.46 parts by mass of an acrylic polymer (manufactured by Mitsubishi Rayon Co., Ltd., molecular weight 75,000) as an ultraviolet curing resin, 2.19 parts by mass of Irgacure 184 (manufactured by Ciba-Geigy Limited) as a photocuring initiator, 0.37 part by mass of Irgacure 907 (manufactured by Ciba-Geigy Limited) as a photocuring initiator, 6.39 parts by mass of monodisperse acrylic beads (manufactured by Nippon Shokubai Kagaku Kogyo Co., Ltd., particle diameter 9.5 μm, refractive index 1.53) as light transparent fine particles, 0.015 part by mass of a silicone leveling agent 10-28 (manufactured by The Inctec Inc.), 47.60 parts by mass of toluene, and 11.90 parts by mass of cyclohexanone were thoroughly mixed together to prepare a composition. This composition was filtered through a polypropylene filter, having a pore diameter of 30 μm to prepare composition A5 for an anti-dazzling layer.

Composition A6 for Anti-dazzling Layer

Composition A6 for an anti-dazzling layer was prepared in the same manner as in the composition A1 for an anti-dazzling layer, except that the light transparent fine particles were changed to acrylic beads having a particle size distribution of 5.0 μm in terms of particle diameter (manufactured by Nippon Shokubai Kagaku Kogyo Co., Ltd., refractive index 1.53).

Composition A7 for Anti-dazzling Layer

Pentaerythritol triacrylate (PETA) (manufactured by Nippon Kayaku Co., Ltd., refractive index 1.51) (20.28 parts by mass) as an ultraviolet curing resin, 8.62 parts by mass of DPHA (manufactured by Nippon Kayaku Co., Ltd., refractive index 1.51) as an ultraviolet curing resin, 3.03 parts by mass of an acrylic polymer (manufactured by Mitsubishi Rayon Co., Ltd., molecular weight 75,000) as an ultraviolet curing resin, 1.86 parts by mass of Irgacure 184 (manufactured by Ciba-Geigy Limited) as a photocuring initiator, 0.31 part by mass of Irgacure 907 (manufactured by Ciba-Geigy Limited) as a photocuring initiator, 4.80 parts by mass of monodisperse acrylic beads (manufactured by Nippon Shokubai Kagaku Kogyo Co., Ltd., particle diameter 9.5 μm, refractive index 1.53) as first light transparent fine particles, 1.59 parts by mass of monodisperse acrylic beads (manufactured by Nippon Shokubai Kagaku Kogyo Co., Ltd., particle diameter 9.5 μm, refractive index 1.53) as second light transparent fine particles, 0.013 part by mass of a silicone leveling agent 10-28 (manufactured by The Inctec Inc.), 47.60 parts by mass of toluene, and 11.90 parts by mass of cyclohexanone were thoroughly mixed together to prepare a composition. This composition was filtered through a polypropylene filter having a pore diameter of 30 μm to prepare composition A7 for an anti-dazzling layer.

Composition A8 for Anti-dazzling Layer

Pentaerythritol triacrylate (PETA) (manufactured by Nippon Kayaku Co., Ltd., refractive index 1.51) (21.28 parts by mass) as an ultraviolet curing resin, 8.63 parts by mass of DPHA (manufactured by Nippon Kayaku Co., Ltd., refractive index 1.51) as an ultraviolet curing resin, 3.18 parts by mass of an acrylic polymer (manufactured by Mitsubishi Rayon Co., Ltd., molecular weight 75,000) as an ultraviolet curing resin, 1.96 parts by mass of Irgacure 184 (manufactured by Ciba-Geigy Limited) as a photocuring initiator, 0.33 part by mass of Irgacure 907 (manufactured by Ciba-Geigy Limited) as a photocuring initiator, 4.96 parts by mass of acrylic beads (manufactured by Nippon Shokubai Kagaku Kogyo Co., Ltd., particle diameter 4.6 μm, refractive index 1.53) as first light transparent fine particles, 1.65 parts by mass of acrylic beads (manufactured by Nippon Shokubai Kagaku Kogyo Co., Ltd., particle diameter 3.5 μm, refractive index 1.53) as second light transparent fine particles, 0.013 part by mass of a silicone leveling agent 10-28 (manufactured by The Inctec Inc.), 46.40 parts by mass of toluene, and 11.60 parts by mass of cyclohexanone were thoroughly mixed together to prepare a composition. This composition was filtered through a polypropylene filter having a pore diameter of 30 μm to prepare composition A8 for an anti-dazzling layer.

Composition A9 for Anti-dazzling Layer

EXG40-77 (V-15M) (amorphous silica ink, average particle diameter of silica 2.5 μm, solid content 60%, manufactured by Dainichiseika Color & Chemicals Manufacturing Co., Ltd.) (1.77 g) as an amorphous silica matting agent ink for an anti-dazzling layer, pentaerythritol triacrylate (PETA) (manufactured by Nippon Kayaku Co., Ltd., refractive index 1.51) (2.93 g) as an ultraviolet curing resin, 0.37 g of an acrylic polymer (manufactured by Mitsubishi Rayon Co., Ltd., molecular weight 40,000) as an ultraviolet curing resin, 0.17 g of Irgacure 184 (manufactured by Ciba-Geigy Limited) as a photocuring initiator, 0.6 g of Irgacure 907 (manufactured by Ciba-Geigy Limited) as a photocuring initiator, 0.043 g of a silicone leveling agent 10-28 (manufactured by The Inctec Inc.), 7.8 g of toluene, and 1.0 g of MIBK (methyl isobutyl ketone) were thoroughly mixed together to prepare a composition. This composition was filtered through a polypropylene filter having a pore diameter of 80 μm to prepare composition A9 for an anti-dazzling layer.

Preparation of Composition A for Slip Layer

Composition A1 for Slip Layer

DPHA (manufactured by Nippon Kayaku Co., Ltd., refractive index 1.51) (39.30 parts by mass) as an ultraviolet curing resin, 3.13 parts by mass of an acrylic polymer (manufactured by Mitsubishi Rayon Co., Ltd., molecular weight 40,000) as an ultraviolet curing resin, 2.12 parts by mass of Irgacure 184 (manufactured by Ciba-Geigy Limited) as a photocuring initiator, 0.43 parts by mass of Irgacure 907 (manufactured by Ciba-Geigy Limited) as a photocuring initiator, 0.19 part by mass of a silicone leveling agent 10-28 (manufactured by The Inctec Inc.), 49.35 parts by mass of toluene, and 5.48 parts by mass of cyclohexanone were thoroughly mixed together to prepare a composition. This composition was filtered through a polypropylene filter having a pore diameter of 10 μm to prepare composition A1 for a slip layer.

Composition A2 for Slip Layer

C-4456 S-7 (an ATO-containing electroconductive ink, average particle diameter of ATO 300 to 400 nm, solid content 45%, manufactured by NIPPON PELNOX CORP.) (21.6 g) as a material for an antistatic layer, 28.69 g of DPI-IA (manufactured by Nippon Kayaku Co., Ltd., refractive index 1.51) as an ultraviolet curing resin, 1.56 g of Irgacure 184 (manufactured by Ciba-Geigy Limited) as a photocuring initiator, 33.7 g of MIBK (methyl isobutyl ketone), and 14.4 g of cyclohexanone were thoroughly mixed together to prepare a composition. This composition was filtered through a polypropylene filter having a pore diameter of 30 μm to prepare composition A2 for a slip layer.

Composition A3 for Slip Layer

Composition A3 for a slip layer having the following formulation was prepared using zirconia-containing coating composition A (tradename; "KZ7973", a resin matrix having a refractive index of 1.69, solid content 50%, manufactured by JSR) so that the resin matrix had a refractive index of 1.60.

Pentaerythritol triacrylate (PETA) (manufactured by Nippon Kayaku Co., Ltd., refractive index 1.51) (18.59 parts by mass) as an ultraviolet curing resin, 17.18 parts by mass of zirconia (zirconia contained in "KZ 7973" (tradename), average particle diameter 40 to 60 nm, refractive index 2.0, manufactured by JSR) for incorporation in an ultraviolet curing resin to develop a resin matrix, 1.22 parts by mass of a zirconia dispersant (a zirconia dispersion stabilizer contained in "KZ 7973" (tradename), manufactured by JSR), 0.94 part by mass of an acrylic polymer (manufactured by Mitsubishi Rayon Co., Ltd., molecular weight 40,000) as an ultraviolet curing resin, 1.56 parts by mass of Irgacure 184 (manufactured by Ciba-Geigy Limited) as a photocuring initiator, 0.26 parts by mass of Irgacure 907 (manufactured by Ciba-Geigy Limited) as a photocuring initiator, 0.039 part by mass of a silicone leveling agent 10-28 (manufactured by The Inctec Inc.), 14.34 parts by mass of toluene, 15.76 parts by mass of cyclohexanone, and 2.80 parts by mass of MEK were thoroughly mixed together to prepare a composition. This composition was filtered through a polypropylene filter having a pore diameter of 30 μm to prepare composition A3 for a slip layer.

Preparation of Composition A for Low-refractive Index Layer

Composition A1 for Low-refractive Index Layer

A photopolymerization initiator (tradename; "JUA701," manufactured by JSR) (0.85 g) and 65 g of MIBK were added to 34.14 g of fluororesin-type coating composition A for low-reflective layer formation (tradename; "TM086", manufactured by JSR), and the mixture was stirred and was filtered through a polypropylene filter having a pore diameter of 10 μm to prepare composition A1 for a low-refractive index layer.

Composition A2 for Low-refractive Index Layer

The following components were stirred according to the following formulation, and the mixture was filtered through a polypropylene filter having a pore diameter of 10 μm to prepare composition A2 for a low-refractive index layer.

| | |
|---|---|
| Surface treated silica sol (void-containing fine particles) (as 20% methyl isobutyl ketone solution) | 14.3 pts. wt. |
| Pentaerythritol triacrylate (PETA, refractive index 1.51, manufactured by Nippon Kayaku Co., Ltd.) | 1.95 pts. wt. |
| Irgacure 907 (manufactured by Ciba Specialty Chemicals, K.K.) | 0.1 pt. wt. |
| Polyether-modified silicone oil TSF4460 (tradename, manufactured by GE Toshiba Silicone Co., Ltd.) | 0.15 pt. wt. |
| Methyl isobutyl ketone | 83.5 pts. wt. |

Preparation of Composition A for Antistatic Layer

C-4456 S-7 (an ATO-containing electroconductive ink, average particle diameter of ATO 300 to 400 nm, solid content 45%, manufactured by NIPPON PELNOX CORP.) (2.0 g) was provided as a material for an antistatic layer. Methyl isobutyl ketone (2.84 g) and 1.22 g of cyclohexanone were added to the material, and the mixture was stirred and was filtered through a polypropylene filter having a pore diameter of 30 μm to prepare composition A for an antistatic layer.

Example A1

An optical laminate according to the present invention was produced as follows to produce an HG1 optical laminate.

Formation of Anti-dazzling Layer

An 80 μm-thick triacetylcellulose film (TD80U, manufactured by Fuji Photo Film Co., Ltd.) was provided as a transparent base material. Composition A1 for an anti-dazzling layer was coated onto the transparent base material with a wire-wound rod for coating (Mayer's bar), and the coated transparent base material was heat dried in an oven of 70° C. for one min to evaporate the solvent component. Thereafter, under nitrogen purge (oxygen concentration: not more than 200 ppm), ultraviolet light was applied at an exposure of 30 mJ for half curing to cure the coating film. Thus, a 5 μm-thick anti-dazzling hardcoat layer was formed. The light transparent fine particles were monodisperse acrylic beads having a particle diameter of 5.0 μm.

Formation of Slip Layer

The anti-dazzling layer thus formed was provided as a transparent base material. Composition A1 for a slip layer was coated onto the transparent base material with a wire-wound rod for coating (Mayer's bar), and the coated transparent base material was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film. Thus, a 3 μm-thick slip layer was formed to produce an optical laminate (HG1).

Example A2

An anti-dazzling layer was formed by coating in the same manner as in Example A1, except that composition A2 for an anti-dazzling layer was used. Further, in the same manner as in Example A1, a slip layer was formed by coating to produce an optical laminate (HG2). The light transparent fine particles in the coating composition A for anti-dazzling layer formation were monodisperse acrylic beads having a particle diameter of 9.5 μm, and the slip layer had a thickness of 4.0 μm.

Example A3

An anti-dazzling layer was formed by coating in the same manner as in Example A1, except that composition A3 for an anti-dazzling layer was used. Further, in the same manner as in Example A1, a slip layer was formed by coating to produce an optical laminate (HG3). The light transparent fine particles in the coating composition A for anti-dazzling layer formation were monodisperse acrylic beads having a particle diameter of 13.5 μm.

Example A4

An anti-dazzling layer was formed by coating in the same manner as in Example A1, except that composition A4 for an anti-dazzling layer was used. Further, in the same manner as in Example A1, a slip layer was formed by coating to produce an optical laminate. The light transparent fine particles in the coating composition A for anti-dazzling layer formation were monodisperse acrylic beads having a particle diameter of 13.5 μm, and the proportion of the light transparent fine particles to the total weight of the solid content was 1/2 in the case of Example A3.

Example A5

An anti-dazzling layer was formed by coating in the same manner as in Example A1, except that composition A5 for an anti-dazzling layer was used. Further, in the same manner as in Example A1, a slip layer was formed by coating to produce an optical laminate. The light transparent fine particles in the coating composition A for anti-dazzling layer formation were monodisperse acrylic beads having a particle diameter of 9.5 μm, and the proportion of the light transparent fine particles to the total weight of the solid content was 75/1000 in the case of Example A2.

Example A6

An anti-dazzling layer was formed by coating in the same manner as in Example A1, except that composition A6 for an anti-dazzling layer was used. Further, in the same manner as in Example A1, a slip layer was formed by coating to produce an optical laminate. The light transparent fine particles in the coating composition A for anti-dazzling layer formation were acrylic beads having a particle size distribution of 5.0 μm.

Example A7

An anti-dazzling layer was formed by coating in the same manner as in Example A1, except that composition A7 for an anti-dazzling layer was used. Further, in the same manner as in Example A1, a slip layer was formed by coating to produce an optical laminate. The first light transparent fine particles in the coating composition A for anti-dazzling layer formation were monodisperse acrylic beads having a particle diameter of 9.5 μm, and the second light transparent fine particle were monodisperse acrylic beads having a particle diameter of 5.0 μm.

Example A8

An anti-dazzling layer was formed by coating in the same manner as in Example A1, except that composition A4 for an anti-dazzling layer was used for anti-dazzling layer formation and composition A2 for a slip layer was used for slip layer formation. Further, in the same manner as in Example A1, the slip layer was formed by coating to produce an optical laminate. In order to form an electroconductive slip layer, ATO-containing composition A was used as the coating material for slip layer formation.

Example A9

An optical laminate according to the present invention was produced as follows to produce an optical laminate.

Formation of Antistatic Layer

An 80 μm-thick triacetylcellulose film (TD80U, manufactured by Fuji Photo Film Co., Ltd.) was provided as a transparent base material. Composition A for an antistatic layer was coated onto the transparent base material with a wire-wound rod for coating (Mayer's bar), and the coated transparent base material was heat dried in an oven of 50° C. for one min to evaporate the solvent component. Thereafter, under nitrogen purge (oxygen concentration: not more than 200 ppm), ultraviolet light was applied at an exposure of 30 mJ for half curing to cure the coating film. Thus, a 1 μm-thick anti-antistatic layer was formed.

Formation of Anti-dazzling Layer

The antistatic layer thus formed was provided as a transparent base material. Composition A4 for an anti-dazzling layer was coated onto the transparent base material with a wire-wound rod for coating (Mayer's bar), and the coated transparent base material was heat dried in an oven of 70° C. for one min to evaporate the solvent component. Thereafter, under nitrogen purge (oxygen concentration: not more than 200 ppm), ultraviolet light was applied at an exposure of 30 mJ for half curing to cure the coating film. Thus, a 3 μm-thick anti-dazzling layer was formed.

Formation of Slip Layer

The anti-dazzling layer thus formed was provided as a transparent base material. Composition A1 for a slip layer was coated onto the transparent base material with a wire-wound rod for coating (Mayer's bar), and the coated transparent base material was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film. Thus, a 3 μm-thick slip layer was formed. Thus, an optical laminate was produced.

Example A10

An anti-dazzling layer was formed in the same manner as in Example A1, except that composition A4 for an anti-dazzling layer was used. Further, the slip layer was formed in the same manner as in Example A1, except that ultraviolet light was applied at an exposure of 30 mJ for half curing to cure the coating film.

Formation of Low-refractive Index Layer

The anti-dazzling layer thus formed was provided as a transparent base material. Composition A for a low-refractive index layer was coated onto the transparent base material with a wire-wound rod for coating (Mayer's bar), and the coated transparent base material was heat dried in an oven of 50° C. for one min to evaporate the solvent component. Thereafter, under nitrogen purge (oxygen concentration: not more than 200 ppm), ultraviolet light was applied at an exposure of 150 mJ to cure the coating film. Thus, a 98 μm-thick low-refractive index layer was formed to produce an optical laminate. Composition A2 for a low-refractive index layer may be used instead of composition A1 for a low-refractive index layer. In this case, the reflection Y value is 1.8%.

Example A11

An HG11 optical laminate was produced in the same manner as in Example A10, except that composition A3 for a slip layer was used for slip layer formation. In Example A11, a zirconia-containing resin matrix was used for the slip layer. In this case, the composition was regulated so that the slip layer had a refractive index of 1.60.

Comparative Example A1

A conventional anti-dazzling optical laminate (AG) was prepared as follows to produce an optical laminate AG1. Specifically, an 80 μm-thick triacetylcellulose film (TD80U, manufactured by Fuji Photo Film Co., Ltd.) was provided as a transparent base material. Composition A8 for an anti-dazzling layer was coated onto the transparent base material with a wire-wound rod for coating (Mayer's bar), and the coated transparent base material was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film. Thus, a 6 μm-thick anti-dazzling hardcoat layer was formed. AG1 is an anti-dazzling optical laminate (AG) of a mixed particle system using 4.96 parts by mass of acrylic beads (manufactured by Nippon Shokubai Kagaku Kogyo Co., Ltd., particle diameter 4.6 μm, refractive index 1.53) as first light transparent fine particles and 1.65 parts by mass of acrylic beads (manufactured by Nippon Shokubai Kagaku Kogyo Co., Ltd., particle diameter 3.5 refractive index 1.53) as second light transparent fine particles.

Comparative Example A2

A conventional anti-dazzling optical laminate (AG) was produced as follows to produce an AG2 optical laminate. Specifically, the procedure of Comparative Example A1 was repeated, except that composition A9 for an anti-dazzling layer was used and the thickness of the anti-dazzling layer was 3 μm. The optical laminate of Comparative Example A2 is an anti-dazzling optical laminate (AG) using amorphous silica.

Evaluation Test A

The following evaluation tests were carried out, and the results were described in Table 1.

Evaluation 1: Planar Shape Evaluation Test

Figure 4:
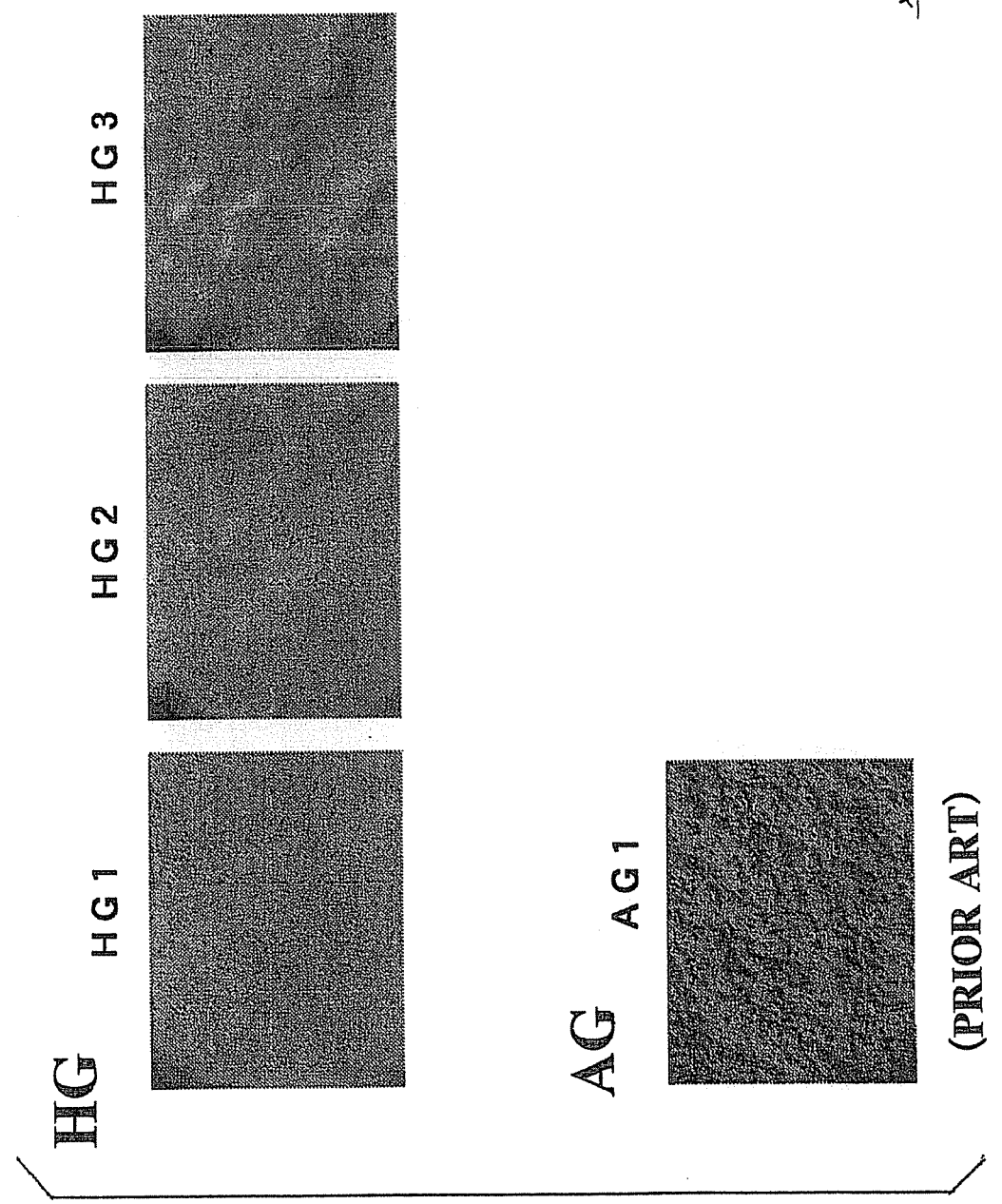
FIG. 4 is a photograph taken on a surface shape of an optical laminate according to the present invention and a conventional anti-dazzling optical laminate under an optical microscope.

Each of the optical laminates of Example A and Comparative Example A was mounted on a panel of an image display device, and the surface shape was photographed with an optical microscope (tradename; BX60-F3, manufactured by OLYMPUS; 200 times). The results were as shown in FIG. 4. As can be seen from FIG. 4, for HG1 to HG3 which are optical laminates according to the present invention, the waviness of the concavoconvex shape was smooth, the concavoconvex shape is not sharp, and the whole surface is in the form of a plurality of very gently sloping hills. On the other hand, for AG1 which is a conventional anti-dazzling optical laminate, the surface is rough like an enlarged photograph of the human skin, and the concavoconvex shape is sharp.

Evaluation 2: Three-dimensionality Evaluation Test for Concavoconvex Shape

Figure 5:
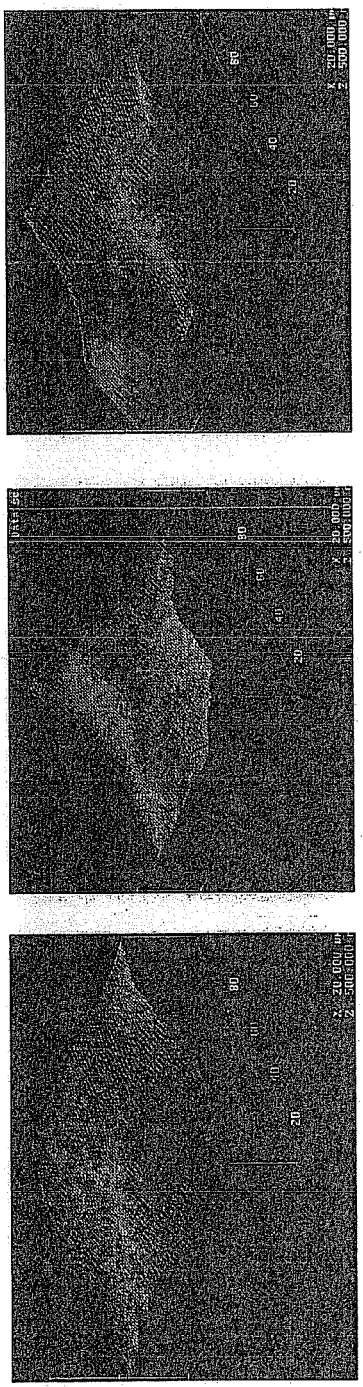
FIG. 5 is a photograph taken on an optical laminate according to the present invention in a three-dimensional measurement manner with AFM.
Figure 5:
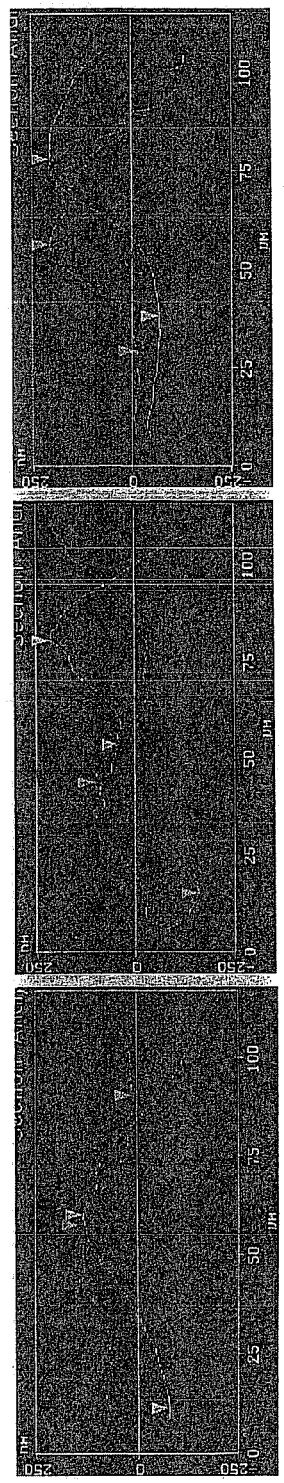
Figure 6:
FIG. 6 is a photograph taken on a conventional optical laminate in a three-dimensional measurement manner with AFM.

Each of the optical laminates of Example A and Comparative Example A was mounted on a panel of an image display device, and the surface shape was photographed with AFM (tradename: a scanning probe microscope). The results were as shown in FIGS. 5 and 6. As can be seen from FIG. 5, for HG1 to HG3 which are optical laminates according to the present invention, the waviness of the concavoconvex shape was very smooth, the concavoconvex shape is not sharp, and the whole surface is in the form of a plurality of very gently sloping hills. On the other hand, as can be seen from FIG. 6, for AG1 which is a conventional anti-dazzling optical laminate, the surface is in the form of a number of sharp concavoconvex shapes.

Evaluation 3: Optical Characteristics Test

For the optical laminates of Example A and Comparative Example A, the haze value (%), 60-degree gloss, Sm, θa, Rz, reflection Y value (5-degree reflection), and surface resistance were measured according to the definition described in the present specification. The results were as shown in Table 1.

Evaluation 4: Glossy Black Feeling Test

A crossed Nicol polarizing plate was applied onto each of the optical laminates of Example A and Comparative Example A on its side remote from the film. Sensory evaluation was carried out under three-wavelength fluorescence, and glossy black feeling was evaluated in detail according to the following criteria.

Evaluation Criteria

◯: Glossy black could be reproduced.

Δ: Glossy black could be somewhat reproduced but was unsatisfactory as a product.

x: Glossy back could not be reproduced.

Evaluation 5: Glare Test

A black matrix pattern plate (105 ppi) formed on a 0.7 mm-thick glass was placed on a viewer manufactured by HAKUBA (light viewer 7000PRO) so that the pattern surface faced downward. The optical laminate film prepared above was placed thereon so that the concavoconvex face was on the air side. Glare was visually observed in a dark room while lightly pressing with a finger the edge of the film to prevent the lift of the film, and the results were evaluated.

Evaluation Criteria

◯: No glare was observed at 105 ppi, and the antiglareness was good.

x: Glare was observed at 105 ppi, and the antiglareness was poor.

Results

For all of Examples A1 to A11 and Comparative Example A2, the antiglareness was ◯, while, for Comparative Example A1, glare was observed and the antiglareness was x.

Evaluation 6: Anti-dazzling Evaluation Test

A black acrylic plate was applied onto the backside of the optical laminate with the aid of an optical pressure-sensitive adhesive. The sample was placed on a horizontal desk. White fluorescent lamps (32 W×2 lamps) were disposed 2.5 m above the desk. Reflection of the edge part of the white fluorescent lamps was visually observed and was evaluated.

Evaluation Criteria

◯: The edge was not reflected, and the anti-dazzling property was good.

x: The edge was reflected, and the anti-dazzling property was poor.

Results

For all of Examples A1 to A11 and Comparative Example A1, the edge of the fluorescent lamps was not reflected at all, and the anti-dazzling property was good (◯), whereas, for Comparative Example A2, the edge of the fluorescent lamps was reflected, and the anti-dazzling property was poor (x).

TABLE 1

| | Coating liquid for anti-dazzling layer | | | | | | | |
|---|---|---|---|---|---|---|---|---|
| | Light transparent fine particles | | | Binder | | Solvent composition | | Coating liquid |
| | Particle diameter | Material | Weight ratio per unit area between resin and particle | Addition amount of polymer (based on binder) | Monomer ratio | (Ratio of toluene to coating composition component) | Coating liquid for slip layer | Coating liquid for low-refractive index layer |
| Ex. 1 | 5.0 μm | PMMA | 0.20 | PMMA polymer 10 wt % (mw 75000) | PETA: DPHA = 65:35 wt % | Toluene: cyclohexanone = 80:20 wt % (40.5 wet %) | I (Main component: DPHA) | — |
| Ex. 2 | 9.5 μm | ↓ | ↓ | ↓ | ↓ | ↓ | ↓ | — |
| Ex. 3 | 13.5 μm | ↓ | ↓ | ↓ | ↓ | ↓ | ↓ | — |
| Ex. 4 | 13.5 μm | ↓ | 0.10 | ↓ | ↓ | ↓ | ↓ | — |
| Ex. 5 | 9.5 μm | ↓ | 0.015 | ↓ | ↓ | ↓ | ↓ | — |
| Ex. 6 | 5.0 ± 2.0 (Particle size distribution) | ↓ | 0.20 | ↓ | ↓ | ↓ | ↓ | — |
| Ex. 7 | 9.5 μm 5.0 μm Mixed particle system | ↓ | 0.20 (9.5 μm ... 0.15 5.0 μm ... 0.05) | ↓ | ↓ | ↓ | ↓ | — |
| Ex. 8 | 13.5 μm | ↓ | 0.10 | ↓ | ↓ | ↓ | II (DPHA + ATO (Electro-conductive agent) incorporated) | — |
| Ex. 9 | ↓ | ↓ | ↓ | ↓ | ↓ | ↓ | I (Main component: DPHA) | — |
| Ex. 10 | ↓ | ↓ | ↓ | ↓ | ↓ | ↓ | ↓ | ◯ |
| Ex. 11 | ↓ | ↓ | ↓ | ↓ | ↓ | ↓ | III (Zr-containing resin matrix) n = 1.60 | ◯ |
| Comp. Ex. 1 | 4.6 μm 3.5 μm Mixed particle system | ↓ | 0.18 | ↓ | ↓ | ↓ | — | — |
| Comp. Ex. 2 | Average particle diameter 2.5 μm Amorphous silica | Silica | 0.12 | PMMA polymer 1.25 wt % (mw 45000) | PETA = 100 | Toluene:MIBK = 90:10 wt % (40.5 wet %) | — | — |

TABLE 1-continued

|  | Evaluation 3 | | | | | Evaluation 4 |
|---|---|---|---|---|---|---|
|  | Haze (%) | 60-degree gloss | Sm (μm) | θa (°) | Rz (μm) | Reflection Y value (5-degree reflection) |  |
| Ex. 1 | 0.3 | 98.7 | 233.1 | 0.384 | 0.606 | — (* No low-refractive index layer: 4%) | ○ |
| Ex. 2 | 0.4 | 94.6 | 170.2 | 0.504 | 0.663 | — | ○ |
| Ex. 3 | 0.6 | 90.3 | 362.5 | 0.539 | 1.040 | — | ○ |
| Ex. 4 | 0.5 | 92.3 | 354.1 | 0.478 | 0.833 | — | ○ |
| Ex. 5 | 0.4 | 94.8 | 375.1 | 0.422 | 0.482 | — | ○ |
| Ex. 6 | 0.4 | 93.2 | 192.3 | 0.621 | 0.834 | — | ○ |
| Ex. 7 | 0.5 | 94.9 | 201.3 | 0.532 | 0.743 | — | ○ |
| Ex. 8 | 1.4 | 93.2 | 323.1 | 0.912 | 0.893 | — | ○ |
| Ex. 9 | 1.8 | 93.1 | 367.3 | 0.623 | 0.982 | — | ○ |
| Ex. 10 | 0.5 | 65.3 | 392.3 | 0.432 | 0.732 | 2.0% | ○ |
| Ex. 11 | 1.3 | 56.2 | 245.3 | 0.392 | 0.652 | 1.4% | ○ |
| Comp. Ex. 1 | 4.7 | 48.2 | 93.2 | 1.892 | 1.439 | — | × |
| Comp. Ex. 2 | 3.8 | 65.0 | 267.2 | 1.857 | 1.932 | — | × |

Second Aspect of the Present Invention

Compositions for respective layers constituting an optical laminate were prepared according to the following formulations.

Preparation of Composition B for Anti-dazzling Layer

Composition B1 for Anti-dazzling Layer

Pentaerythritol triacrylate (PETA) (manufactured by Nippon Kayaku Co., Ltd., refractive index 1.51) (20.28 parts by mass) as an ultraviolet curing resin, 8.62 parts by mass of DPHA (manufactured by Nippon Kayaku Co., Ltd., refractive index 1.51) as an ultraviolet curing resin, 3.03 parts by mass of an acrylic polymer (manufactured by Mitsubishi Rayon Co., Ltd., molecular weight 75,000) as an ultraviolet curing resin, 1.86 parts by mass of Irgacure 184 (manufactured by Ciba-Geigy Limited) as a photocuring initiator, 0.31 part by mass of Irgacure 907 (manufactured by Ciba-Geigy Limited) as a photocuring initiator, 6.39 parts by mass of monodisperse acrylic beads (manufactured by Nippon Shokubai Kagaku Kogyo Co., Ltd., particle diameter 5.0 μm, refractive index 1.53) as light transparent fine particles, 0.013 part by mass of a silicone leveling agent 10-28 (manufactured by The Inctec Inc.), 47.60 parts by mass of toluene, and 11.90 parts by mass of cyclohexanone were thoroughly mixed together to prepare a composition B. This composition B was filtered through a polypropylene filter having a pore diameter of 30 μm to prepare composition B1 for an anti-dazzling layer.

Composition B2 for Anti-dazzling Layer

Composition B2 for an anti-dazzling layer was prepared in the same manner as in the composition B1 for an anti-dazzling layer, except that the light transparent fine particles were changed to monodisperse acrylic beads having a particle diameter of 9.5 μm (manufactured by Nippon Shokubai Kagaku Kogyo Co., Ltd., refractive index 1.53).

Composition B3 for Anti-dazzling Layer

Composition B3 for an anti-dazzling layer was prepared in the same manner as in the composition B1 for an anti-dazzling layer, except that the light transparent fine particles were changed to monodisperse acrylic beads having a particle diameter of 13.5 μm (manufactured by Nippon Shokubai Kagaku Kogyo Co., Ltd., refractive index 1.53).

Composition B4 for Anti-dazzling Layer

Pentaerythritol triacrylate (PETA) (manufactured by Nippon Kayaku Co., Ltd., refractive index 1.51) (21.08 parts by mass) as an ultraviolet curing resin, 10.33 parts by mass of DPHA (manufactured by Nippon Kayaku Co., Ltd., refractive index 1.51) as an ultraviolet curing resin, 3.24 parts by mass of an acrylic polymer (manufactured by Mitsubishi Rayon Co., Ltd., molecular weight 75,000) as an ultraviolet curing resin, 2.02 parts by mass of Irgacure 184 (manufactured by Ciba-Geigy Limited) as a photocuring initiator, 0.34 part by mass of Irgacure 907 (manufactured by Ciba-Geigy Limited) as a photocuring initiator, 3.47 parts by mass of monodisperse acrylic beads (manufactured by Nippon Shokubai Kagaku Kogyo Co., Ltd., particle diameter 13.5 μm, refractive index 1.53) as light transparent fine particles, 0.014 part by mass of a silicone leveling agent 10-28 (manufactured by The Inctec Inc.), 47.60 parts by mass of toluene, and 11.90 parts by mass of cyclohexanone were thoroughly mixed together to prepare a composition. This composition was filtered through a polypropylene filter having a pore diameter of 30 μm to prepare composition B4 for an anti-dazzling layer.

Composition B5 for Anti-dazzling Layer

Pentaerythritol triacrylate (PETA) (manufactured by Nippon Kayaku Co., Ltd., refractive index 1.51) (21.88 parts by mass) as an ultraviolet curing resin, 12.03 parts by mass of DPHA (manufactured by Nippon Kayaku Co., Ltd., refractive index 1.51) as an ultraviolet curing resin, 3.46 parts by mass of an acrylic polymer (manufactured by Mitsubishi Rayon Co., Ltd., molecular weight 75,000) as an ultraviolet curing resin, 2.19 parts by mass of Irgacure 184 (manufactured by Ciba-Geigy Limited) as a photocuring initiator, 0.37 part by mass of Irgacure 907 (manufactured by Ciba-Geigy Limited) as a photocuring initiator, 6.39 parts by mass of monodisperse acrylic beads (manufactured by Nippon Shokubai Kagaku Kogyo Co., Ltd., particle diameter 9.5 μm, refractive index 1.53) as light transparent fine particles, 0.015 part by mass of a silicone leveling agent 10-28 (manufactured by The Inctec Inc.), 47.60 parts by mass of toluene, and 11.90 parts by mass of cyclohexanone were thoroughly mixed together to prepare a composition. This composition was filtered through a polypropylene filter having a pore diameter of 30 μm to prepare composition B5 for an anti-dazzling layer.

Composition B6 for Anti-dazzling Layer

Composition B6 for an anti-dazzling layer was prepared in the same manner as in the composition B1 for an anti-dazzling layer, except that the light transparent fine particles were changed to acrylic beads having a particle size distribution of 5.0 μm in terms of particle diameter (manufactured by Nippon Shokubai Kagaku Kogyo Co., Ltd., refractive index 1.53).

Composition B7 for Anti-dazzling Layer

Pentaerythritol triacrylate (PETA) (manufactured by Nippon Kayaku Co., Ltd., refractive index 1.51) (20.28 parts by mass) as an ultraviolet curing resin, 8.62 parts by mass of DPHA (manufactured by Nippon Kayaku Co., Ltd., refractive index 1.51) as an ultraviolet curing resin, 3.03 parts by mass of an acrylic polymer (manufactured by Mitsubishi Rayon Co., Ltd., molecular weight 75,000) as an ultraviolet curing resin, 1.86 parts by mass of Irgacure 184 (manufactured by Ciba-Geigy Limited) as a photocuring initiator, 0.31 part by mass of Irgacure 907 (manufactured by Ciba-Geigy Limited) as a photocuring initiator, 4.80 parts by mass of monodisperse acrylic beads (manufactured by Nippon Shokubai Kagaku Kogyo Co., Ltd., particle diameter 9.5 μm, refractive index 1.53) as first light transparent fine particles, 1.59 parts by mass of monodisperse acrylic beads (manufactured by Nippon Shokubai Kagaku Kogyo Co., Ltd., particle diameter 9.5 μm, refractive index 1.53) as second light transparent fine particles, 0.013 part by mass of a silicone leveling agent 10-28 (manufactured by The Inctec Inc.), 47.60 parts by mass of toluene, and 11.90 parts by mass of cyclohexanone were thoroughly mixed together to prepare a composition. This composition was filtered through a polypropylene filter having a pore diameter of 30 μm to prepare composition B7 for an anti-dazzling layer.

Composition B8 for Anti-dazzling Layer

Pentaerythritol triacrylate (PETA) (manufactured by Nippon Kayaku Co., Ltd., refractive index 1.51) (21.28 parts by mass) as an ultraviolet curing resin, 8.63 parts by mass of DPHA (manufactured by Nippon Kayaku Co., Ltd., refractive index 1.51) as an ultraviolet curing resin, 3.18 parts by mass of an acrylic polymer (manufactured by Mitsubishi Rayon Co., Ltd., molecular weight 75,000) as an ultraviolet curing resin, 1.96 parts by mass of Irgacure 184 (manufactured by Ciba-Geigy Limited) as a photocuring initiator, 0.33 part by mass of Irgacure 907 (manufactured by Ciba-Geigy Limited) as a photocuring initiator, 4.96 parts by mass of acrylic beads (manufactured by Nippon Shokubai Kagaku Kogyo Co., Ltd., particle diameter 4.6 μm, refractive index 1.53) as first light transparent fine particles, 1.65 parts by mass of acrylic beads (manufactured by Nippon Shokubai Kagaku Kogyo Co., Ltd., particle diameter 3.5 μm, refractive index 1.53) as second light transparent fine particles, 0.013 part by mass of a silicone leveling agent 10-28 (manufactured by The Inctec Inc.), 46.40 parts by mass of toluene, and 11.60 parts by mass of cyclohexanone were thoroughly mixed together to prepare a composition. This composition was filtered through a polypropylene filter having a pore diameter of 30 μm to prepare composition B8 for an anti-dazzling layer.

Composition B9 for Anti-dazzling Layer

EXG40-77 (V-15M) (amorphous silica ink, average particle diameter of silica 2.5 μm, solid content 60%, manufactured by Dainichiseika Color & Chemicals Manufacturing Co., Ltd.) (1.77 g) as an amorphous silica matting agent ink for an anti-dazzling layer, pentaerythritol triacrylate (PETA) (manufactured by Nippon Kayaku Co., Ltd., refractive index 1.51) (2.93 g) as an ultraviolet curing resin, 0.37 g of an acrylic polymer (manufactured by Mitsubishi Rayon Co., Ltd., molecular weight 40,000) as an ultraviolet curing resin, 0.17 g of Irgacure 184 (manufactured by Ciba-Geigy Limited) as a photocuring initiator, 0.6 g of Irgacure 907 (manufactured by Ciba-Geigy Limited) as a photocuring initiator, 0.043 g of a silicone leveling agent 10-28 (manufactured by The Inctec Inc.), 7.8 g of toluene, and 1.0 g of MIBK (methyl isobutyl ketone) were thoroughly mixed together to prepare a composition. This composition was filtered through a polypropylene filter having a pore diameter of 80 μm to prepare composition B9 for an anti-dazzling layer.

Preparation of Composition B for Surface Modifying Layer

Composition B1 for Surface Modifying Layer

DPHA (manufactured by Nippon Kayaku Co., Ltd., refractive index 1.51) (39.30 parts by mass) as an ultraviolet curing resin, 3.13 parts by mass of an acrylic polymer (manufactured by Mitsubishi Rayon Co., Ltd., molecular weight 40,000) as an ultraviolet curing resin, 2.12 parts by mass of Irgacure 184 (manufactured by Ciba-Geigy Limited) as a photocuring initiator, 0.43 parts by mass of Irgacure 907 (manufactured by Ciba-Geigy Limited) as a photocuring initiator, 0.19 part by mass of a silicone leveling agent 10-28 (manufactured by The Inctec Inc.), 49.35 parts by mass of toluene, and 5.48 parts by mass of cyclohexanone were thoroughly mixed together to prepare a composition. This composition was filtered through a polypropylene filter having a pore diameter of 10 μm to prepare composition B1 for a surface modifying layer.

Composition B2 for Surface Modifying Layer

C-4456 S-7 (an ATO-containing electroconductive ink, average particle diameter of ATO 300 to 400 nm, solid content 45%, manufactured by NIPPON PELNOX CORP.) (21.6 g) as a material for an antistatic layer, 28.69 g of DPHA (manufactured by Nippon Kayaku Co., Ltd., refractive index 1.51) as an ultraviolet curing resin, 1.56 g of Irgacure 184 (manufactured by Ciba-Geigy Limited) as a photocuring initiator, 33.7 g of MIBK (methyl isobutyl ketone), and 14.4 g of cyclohexanone were thoroughly mixed together to prepare a composition. This composition was filtered through a polypropylene filter having a pore diameter of 30 μm to prepare composition B2 for a surface modifying layer.

Composition B3 for Surface Modifying Layer

Composition B3 for a surface modifying layer having the following formulation was prepared using zirconia-containing coating composition B (tradename; "KZ 7973", a resin matrix having a refractive index of 1.69, solid content 50%, manufactured by JSR) so that the resin matrix had a refractive index of 1.60.

Pentaerythritol triacrylate (PETA) (manufactured by Nippon Kayaku Co., Ltd., refractive index 1.51) (18.59 parts by mass) as an ultraviolet curing resin, 17.18 parts by mass of zirconia (zirconia contained in "KZ 7973" (tradename), average particle diameter 40 to 60 nm, refractive index 2.0, manufactured by JSR) for incorporation in an ultraviolet curing resin to develop a resin matrix, 1.22 parts by mass of a zirconia dispersant (a zirconia dispersion stabilizer contained in "KZ 7973" (tradename), manufactured by JSR), 0.94 part by mass of an acrylic polymer (manufactured by Mitsubishi Rayon Co., Ltd., molecular weight 40,000) as an ultraviolet curing resin, 1.56 parts by mass of Irgacure 184 (manufactured by Ciba-Geigy Limited) as a photocuring initiator, 0.26 parts by mass of Irgacure 907 (manufactured by Ciba-Geigy Limited) as a photocuring initiator, 0.039 part by mass of a silicone leveling agent 10-28 (manufactured by The Inctec Inc.), 14.34 parts by mass of toluene, 15.76 parts by mass of cyclohexanone, and 2.80 parts by mass of MEK were thoroughly mixed together to prepare a composition. This composition was filtered through a polypropylene filter having a pore diameter of 30 µm to prepare composition B3 for a surface modifying layer.

Composition B4 for Surface Modifying Layer

Shiko UV1700B (manufactured by Nippon Synthetic Chemical Industry Co., Ltd., refractive index 1.51) (27.51 parts by mass) as an ultraviolet curing resin, 11.79 parts by mass of Aronix M315 (manufactured by Toa Gosei Chemical Industry Co., Ltd., refractive index 1.51) as an ultraviolet curing resin, 3.13 parts by mass of an acrylic polymer (manufactured by Mitsubishi Rayon Co., Ltd., molecular weight 40,000) as an ultraviolet curing resin, 2.12 parts by mass of Irgacure 184 (manufactured by Ciba-Geigy Limited) as a photocuring initiator, 0.43 part by mass of Irgacure 907 (manufactured by Ciba-Geigy Limited) as a photocuring initiator, 0.19 part by mass of a silicone leveling agent 10-28 (manufactured by The Inctec Inc.), 49.35 parts by mass of toluene, and 5.48 parts by mass of cyclohexanone were thoroughly mixed together to prepare a composition. This composition was filtered through a polypropylene filter having a pore diameter of 10 µm to prepare composition B4 for a surface modifying layer.

Composition B5 for Surface Modifying Layer

Shiko UV1700B (manufactured by Nippon Synthetic Chemical Industry Co., Ltd., refractive index 1.51) (27.51 parts by mass) as an ultraviolet curing resin, 11.79 parts by mass of Aronix M315 (manufactured by Toa Gosei Chemical Industry Co., Ltd., refractive index 1.51) as an ultraviolet curing resin, 3.13 parts by mass of an acrylic polymer (manufactured by Mitsubishi Rayon Co., Ltd., molecular weight 40,000) as an ultraviolet curing resin, 2.12 parts by mass of Irgacure 184 (manufactured by Ciba-Geigy Limited) as a photocuring initiator, 0.43 part by mass of Irgacure 907 (manufactured by Ciba-Geigy Limited) as a photocuring initiator, 2.5 parts by mass of a fluorine reactive additive F3001 (manufactured by Dainippon Ink and Chemicals, Inc.), 49.35 parts by mass of toluene, and 5.48 parts by mass of cyclohexanone were thoroughly mixed together to prepare a composition. This composition was filtered through a polypropylene filter having a pore diameter of 10 µm to prepare composition B5 for a surface modifying layer.

Composition B6 for Surface Modifying Layer

Shiko UV1700B (manufactured by Nippon Synthetic Chemical Industry Co., Ltd., refractive index 1.51) (27.51 parts by mass) as an ultraviolet curing resin, 11.79 parts by mass of Aronix M315 (manufactured by Toa Gosei Chemical Industry Co., Ltd., refractive index 1.51) as an ultraviolet curing resin, 3.13 parts by mass of an acrylic polymer (manufactured by Mitsubishi Rayon Co., Ltd., molecular weight 40,000) as an ultraviolet curing resin, 2.12 parts by mass of Irgacure 184 (manufactured by Ciba-Geigy Limited) as a photocuring initiator, 0.43 part by mass of Irgacure 907 (manufactured by Ciba-Geigy Limited) as a photocuring initiator, 2.5 parts by mass of a fluorine reactive additive F3001 (manufactured by Dainippon Ink and Chemicals, Inc.), 0.8 part by mass of a fluorine-type leveling agent F445 (manufactured by Dainippon Ink and Chemicals, Inc.), 49.35 parts by mass of toluene, and 5.48 parts by mass of cyclohexanone were thoroughly mixed together to prepare a composition. This composition was filtered through a polypropylene filter having a pore diameter of 10 µm to prepare composition B6 for a surface modifying layer.

Preparation of Composition B for Low-refractive Index Layer

Composition B1 for Low-refractive Index Layer

A photopolymerization initiator (tradename; "JUA701," manufactured by JSR) (0.85 g) and 65 g of MIBK were added to 34.14 g of fluororesin-type coating composition B for low-reflective layer formation (tradename; "TM086", manufactured by JSR), and the mixture was stirred and was filtered through a polypropylene filter having a pore diameter of 10 µm to prepare composition B1 for a low-refractive index layer.

Preparation of Composition B2 for Low-refractive Index Layer

The following components were stirred according to the following formulation, and the mixture was filtered through a polypropylene filter having a pore diameter of 10 µm to prepare composition B2 for a low-refractive index layer.

| | |
|---|---|
| Surface treated silica sol (void-containing fine particles) (as 20% methyl isobutyl ketone solution) | 14.3 pts. wt. |
| Pentaerythritol triacrylate (PETA, refractive index 1.51, manufactured by Nippon Kayaku Co., Ltd.) | 1.95 pts. wt. |
| Irgacure 907 (manufactured by Ciba Specialty Chemicals, K.K.) | 0.1 pt. wt. |
| Polyether-modified silicone oil TSF4460 (tradename, manufactured by GE Toshiba Silicone Co., Ltd.) | 0.15 pt. wt. |
| Methyl isobutyl ketone | 83.5 pts. wt. |

Preparation of Composition B for Antistatic Layer

C-4456 S-7 (an ATO-containing electroconductive ink, average particle diameter of ATO 300 to 400 nm, solid content 45%, manufactured by NIPPON PELNOX CORP.) (2.0 g) was provided as a material for an antistatic layer. Methyl isobutyl ketone (2.84 g) and 1.22 g of cyclohexanone were added to the material, and the mixture was stirred and was filtered through a polypropylene filter having a pore diameter of 30 µm to prepare composition B for an antistatic layer.

Preparation of Optical Laminate

Optical laminates were prepared as follows.

Example B1

Formation of Anti-dazzling Layer

An 80 µm-thick triacetylcellulose film (TD80U, manufactured by Fuji Photo Film Co., Ltd.) was provided as a light transparent base material. Composition B1 for an anti-dazzling layer was coated onto the light transparent base material with a wire-wound rod for coating (Mayer's bar), and the coated light transparent base material was heat dried in an oven of 70° C. for one min to evaporate the solvent component. Thereafter, under nitrogen purge (oxygen concentration: not more than 200 ppm), ultraviolet light was applied at an exposure of 30 mJ for half curing to cure the coating film. Thus, a 5 µm-thick anti-dazzling layer was formed. The light transparent fine particles were monodisperse acrylic beads having a particle diameter of 5.0 µm.

Formation of Surface Modifying Layer

Composition B1 for a surface modifying layer was coated onto the anti-dazzling layer with a wire-wound rod for coating (Mayer's bar), and the coating was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film. Thus, a 3 μm-thick surface modifying layer was formed. Thus, an optical laminate (HG1) was produced.

Example B2

An optical laminate (HG2) was produced in the same manner as in Example B1, except that composition B2 for an anti-dazzling layer was used. The light transparent fine particles in the composition B2 for an anti-dazzling layer were monodisperse acrylic beads having a particle diameter of 9.5 μm, and the surface modifying layer had a thickness of 4.0 μm.

Example B3

An optical laminate (HG3) was produced in the same manner as in Example B1, except that composition B3 for an anti-dazzling layer was used. The light transparent fine particles in composition B3 for an anti-dazzling layer were monodisperse acrylic beads having a particle diameter of 13.5 μm.

Example B4

An optical laminate was produced in the same manner as in Example B1, except that composition B4 for an anti-dazzling layer was used. The light transparent fine particles in composition B4 for an anti-dazzling layer were monodisperse acrylic beads having a particle diameter of 13.5 μm, and the proportion of the light transparent fine particles to the total weight of the solid content was 1/2 in the case of Example B3.

Example B5

An optical laminate was produced in the same manner as in Example B1, except that composition B5 for an anti-dazzling layer was used. The light transparent fine particles in composition B5 for an anti-dazzling layer were monodisperse acrylic beads having a particle diameter of 9.5 μm, and the proportion of the light transparent fine particles to the total weight of the solid content was 75/1000 in the case of Example B2.

Example B6

An optical laminate was produced in the same manner as in Example B1, except that composition B6 for an anti-dazzling layer was used. The light transparent fine particles in composition B6 for an anti-dazzling layer were acrylic beads having a particle size distribution of 5.0 μm.

Example B7

An optical laminate was produced in the same manner as in Example B1, except that composition B7 for an anti-dazzling layer was used.

The first light transparent fine particles in composition B7 for an anti-dazzling layer were monodisperse acrylic beads having a particle diameter of 9.5 μm, and the second light transparent fine particle were monodisperse acrylic beads having a particle diameter of 5.0 μm.

Example B8

An optical laminate was produced in the same manner as in Example B1, except that composition B4 for an anti-dazzling layer and composition B2 for a surface modifying layer were used. In order to form an electroconductive surface modifying layer, ATO-containing composition B was used in composition B2 for a surface modifying layer.

Example B9

Formation of Antistatic Layer

An 80 μm-thick triacetylcellulose film (TD80U, manufactured by Fuji Photo Film Co., Ltd.) was provided as a light transparent base material. Composition B for an antistatic layer was coated onto the light transparent base material with a wire-wound rod for coating (Mayer's bar), and the coated light transparent base material was heat dried in an oven of 50° C. for one min to evaporate the solvent component. Thereafter, under nitrogen purge (oxygen concentration: not more than 200 ppm), ultraviolet light was applied at an exposure of 30 mJ for half curing to cure the coating film. Thus, a 1 μm-thick antistatic layer was formed.

Formation of Anti-dazzling Layer

Composition B4 for an anti-dazzling layer was coated onto the antistatic layer with a wire-wound rod for coating (Mayer's bar), and the coating was heat dried in an oven of 70° C. for one min to evaporate the solvent component. Thereafter, under nitrogen purge (oxygen concentration: not more than 200 ppm), ultraviolet light was applied at an exposure of 30 mJ for half curing to cure the coating film. Thus, a 3 μm-thick anti-dazzling layer was formed.

Formation of Surface Modifying Layer

Composition B1 for a surface modifying layer was coated onto the anti-dazzling layer with a wire-wound rod for coating (Mayer's bar), and the coating was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film. Thus, a 3 μm-thick surface modifying layer was formed. Thus, an optical laminate was produced.

Example B10

An anti-dazzling layer was formed in the same manner as in Example B1, except that composition B4 for an anti-dazzling layer was used. Further, the surface modifying layer was formed in the same manner as in Example B1, except that ultraviolet light was applied at an exposure of 30 mJ for half curing to cure the coating film. Thus, an optical laminate was produced.

Formation of Low-refractive Index Layer

Composition B1 for a low-refractive index layer was coated onto the surface modifying layer with a wire-wound rod for coating (Mayer's bar), and the coating was heat dried in an oven of 50° C. for one min to evaporate the solvent component. Thereafter, under nitrogen purge (oxygen concentration: not more than 200 ppm), ultraviolet light was applied at an exposure of 150 mJ to cure the coating film. Thus, a 98 nm-thick low-refractive index layer was formed to produce an optical laminate. Composition B2 for a low-refractive index layer may be used instead of composition B1 for a low-refractive index layer. In this case, the reflection Y value is 1.8%.

Example B11

An optical laminate was produced in the same manner as in Example B1, except that composition B3 for a surface modifying layer was used. In composition B3 for a surface modifying layer, a zirconia-containing resin matrix was used. In this case, the composition was regulated so that the surface modifying layer had a refractive index of 1.60.

Example B12

An optical laminate was produced in the same manner as in Example B1, except that composition B4 for a surface modifying layer was used. In composition B4 for a surface modifying layer, a mixed resin system composed of a polyfunctional urethane acrylate for realizing an enhanced hardness and a low-shrinkage resin for relaxing curling was added.

Example B13

An optical laminate was produced in the same manner as in Example B1, except that composition B5 for a surface modifying layer was used. In composition B5 for a surface modifying layer, a mixed resin system composed of a polyfunctional urethane acrylate for realizing an enhanced hardness and a low-shrinkage resin for relaxing curling was used. Further, 2.0% of a reactive fluorine-type additive was added to improve antifouling properties (marking ink wipe-out property and fingerprint adhesion preventive property).

Example B14

An optical laminate was produced in the same manner as in Example B1, except that composition B6 for a surface modifying layer was used. In composition B6 for a surface modifying layer, a mixed resin system composed of a polyfunctional urethane acrylate for realizing an enhanced hardness and a low-shrinkage resin for relaxing curling was added. Further, 2.0% of a reactive fluorine-type additive was added to improve antifouling properties. Further, 0.2% of a fluorine-type leveling agent was added to impart water repellency and surface slipperiness.

Comparative Example B1

An 80 μm-thick triacetylcellulose film (TD80U, manufactured by Fuji Photo Film Co., Ltd.) was provided as a transparent base material. Composition B8 for an anti-dazzling layer was coated onto the transparent base material with a wire-wound rod for coating (Mayer's bar), and the coated transparent base material was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film. Thus, a 6 μm-thick anti-dazzling optical laminate (AG1) was formed.

The anti-dazzling optical laminate was formed using a mixed particle system using 4.96 parts by mass of acrylic beads (manufactured by Nippon Shokubai Kagaku Kogyo Co., Ltd., particle diameter 4.6 μm, refractive index 1.53) as first light transparent fine particles and 1.65 parts by mass of acrylic beads (manufactured by Nippon Shokubai Kagaku Kogyo Co., Ltd., particle diameter 3.5 μm, refractive index 1.53) as second light transparent fine particles.

Comparative Example B2

A conventional anti-dazzling optical laminate was produced in the same manner as in Comparative Example B1, except that composition B9 for an anti-dazzling layer was used and the thickness of the anti-dazzling optical laminate was 3 μm. The anti-dazzling optical laminate (AG) of Comparative Example B2 was produced using amorphous silica.

Evaluation Test B

The following evaluation tests were carried out, and the results were described in Table 2.

Evaluation 1: Planar Shape Evaluation Test

Each of the optical laminates of Example B and Comparative Example B was mounted on a panel of an image display device, and the surface shape was photographed with an optical microscope (tradename; BX60-F3, manufactured by OLYMPUS; 200 times). The results were as shown in FIG. 4. As can be seen from FIG. 4, for HG1 to HG3 which are optical laminates according to the present invention, the waviness of the concavoconvex shape was smooth, the concavoconvex shape is not sharp, and the whole surface is in the form of a plurality of very gently sloping hills. On the other hand, for AG1 which is a conventional anti-dazzling optical laminate, the surface is rough like an enlarged photograph of the human skin, and the concavoconvex shape is sharp.

Evaluation 2: Three-dimensionality Evaluation Test for Concavoconvex Shape

Each of the optical laminates of Example B and Comparative Example B was mounted on a panel of an image display device, and the surface shape was photographed with AFM (tradename: a scanning probe microscope). The results were as shown in FIGS. 5 and 6. As can be seen from FIG. 5, for HG1 to HG3 which are optical laminates according to the present invention, the waviness of the concavoconvex shape was very smooth, the concavoconvex shape is not sharp, and the whole surface is in the form of a plurality of very gently sloping hills. On the other hand, as can be seen from FIG. 6, for AG1 which is a conventional anti-dazzling optical laminate, the surface is in the form of a number of sharp concavoconvex shapes.

Evaluation 3: Optical Characteristics Test

For the optical laminates of Example B and Comparative Example B, the haze value (%), 60-degree gloss, Sm, θa, Rz, reflection Y value (5-degree reflection), surface resistance, pencil hardness, and contact angle of water were measured according to the definition described in the present specification.

Evaluation 4: Glossy Black Feeling Test

A crossed Nicol polarizing plate was applied onto each of the optical laminates of Example B and Comparative Example B on its side remote from the film. Sensory evaluation was carried out under three-wavelength fluorescence, and glossy black feeling was evaluated according to the following criteria.

Evaluation Criteria

○: Glossy black could be reproduced.

Δ: Glossy black could be somewhat reproduced but was unsatisfactory as a product.

x: Glossy black could not be reproduced.

Evaluation 5: Antifouling Property Evaluation Test

Characters were written on the surface of the optical laminates of Example B and Comparative Example B with an oil-based marker (tradename: "McKee Care" manufactured by Zebra), and the characters were wiped out with a cloth. In this case, the repetition wiping-off property was evaluated according to the following criteria.

Evaluation Criteria

○: When wiping was repeated 10 times, the characters could be completely wiped out.

Δ: When wiping was repeated 10 times, a part of the characters remained unwiped out; and, when wiping was repeated 20 times, the characters could be completely wiped out.

x: Even when wiping was repeated 20 times, the characters could not be completely wiped out.

Evaluation 6: Surface Slipperiness Test

The film surface of the optical laminates of Example B and Comparative Example B was rubbed with a cloth. In this case, the slipperiness was evaluated according to the following criteria.

Evaluation Criteria

○: The cloth was smoothly slid freely.

Δ: The cloth was slid nearly smoothly with some resistance.

x: The cloth was not slid smoothly with strong resistance.

Evaluation 7: Glare Test

A black matrix pattern plate (105 ppi) formed on a 0.7 mm-thick glass was placed on a viewer manufactured by HAKUBA (light viewer 7000PRO) so that the pattern surface faced downward. The optical laminate film prepared above was placed thereon so that the concavoconvex face was on the air side. Glare was visually observed in a dark room while lightly pressing with a finger the edge of the film to prevent the lift of the film, and the results were evaluated.

Evaluation Criteria

○: No glare was observed at 105 ppi, and the antiglareness was good.

x: Glare was observed at 105 ppi, and the antiglareness was poor.

Results

For all of Examples B1 to B14 and Comparative Example B2, the antiglareness was ○, while, for Comparative Example B1, glare was observed and the antiglareness was x.

Evaluation 8: Anti-dazzling Property Evaluation Test

A black acrylic plate was applied onto the backside of the optical laminate with the aid of an optical pressure-sensitive adhesive. The assembly was placed on a horizontal desk. White fluorescent lamps (32 W×2 lamps) were disposed 2.5 m above the desk. Reflection of the edge part of the white fluorescent lamps was visually observed and was evaluated.

Evaluation Criteria

○: The edge was not reflected, and the anti-dazzling property was good.

x: The edge was reflected, and the anti-dazzling property was poor.

Results

For all of Examples B1 to B14 and Comparative Example B1, the edge of the fluorescent lamps was not reflected at all, and the anti-dazzling property was good (○), whereas, for Comparative Example B2, the edge of the fluorescent lamps was reflected, and the anti-dazzling property was poor (x).

Evaluation of Gel Fraction/Coating Film Adhesion and the Like Gel Fraction

In the present invention, the "gel fraction" can be determined as follows.

Sample: 50 μm-thick PET base material (because, in the case of TAC base material, the gel fraction cannot be directly determined). An ink in a binder part other than fine particles, such as monomers, oligomers, polymers, and other additives, in the composition for an anti-dazzling layer was prepared, and the ink was coated onto the base material to a thickness of 5 μm.

1) UV irradiation conditions: samples exposed to UV at exposures of 5, 10, 20, 30, 40, 50, 60, 70, and 80 mj were prepared.

2) The samples were cut into a size of 10 cm square with n number being three points.

3) Weight A was measured.

4) The samples were immersed in a solvent, which is considered to dissolve the monomer, for not less than 12 hr.

5) Each sample was taken out of the solvent and were thoroughly dried in an oven (60° C.×2 min).

6) Weight B of the dried samples was measured.

7) The difference between the weight A of the sample before the immersion in the solvent and the weight B of the dried sample was determined, and the difference value was designated as C.

8) Finally, the gel fraction was calculated: "gel fraction (%)=100−C/A."

As a result, the gel fractions under respective UV irradiation conditions were 5 mj=10%, 10 mj=21%, 20 mj=33%, 30 mj=47%, 40 mj=59%, 50 mj=65%, 60 mj=77%, 70 mj=88%, and 80 mj=96%.

Each composition for an anti-dazzling layer was cured under the above UV irradiation conditions. The pencil hardness and coating film adhesion in the case where a surface modifying layer was provided on the anti-dazzling layer, were then evaluated.

When the gel fraction was 10% and 21%, the adhesion was excellent and 100%, but on the other hand, the pencil hardness was not good and was 2H. When the gel fraction was 88% and 96%, the pencil hardness was good and was 3H to 4H, but on the other hand, the adhesion was lowered to 80 to 95%. Accordingly, the optimal gel fraction for curing the anti-dazzling layer in the case where the surface modifying layer was provided, was found to be 30 to 80%, and, in each Example, 30 mj which provides a gel fraction of about 50% was adopted.

TABLE 2

| | Composition for anti-dazzling layer | | | | |
|---|---|---|---|---|---|
| | Light transparent fine particles | | | Binder | |
| | | | Weight ratio | | |
| | Particle diameter | Material | per unit area between resin and particle | Addition amount of polymer (based on binder) | Monomer ratio |
| Ex. 1 | 5.0 μm | PMMA | 0.20 | PMMA polymer 10 wt % (mw 75000) | PETA: DPHA = 65:35 wt % |
| Ex. 2 | 9.5 μm | ↓ | ↓ | ↓ | ↓ |
| Ex. 3 | 13.5 μm | ↓ | ↓ | ↓ | ↓ |
| Ex. 4 | 13.5 μm | ↓ | 0.10 | ↓ | ↓ |
| Ex. 5 | 9.5 μm | ↓ | 0.015 | ↓ | ↓ |
| Ex. 6 | 5.0 ± 2.0 (Particle size distribution) | ↓ | 0.20 | ↓ | ↓ |

TABLE 2-continued

|  | | | | | |
|---|---|---|---|---|---|
| Ex. 7 | 9.5 μm<br>5.0 μm<br>Mixed particle system | ↓ | 0.20<br>(9.5 μm ... 0.15<br>5.0 μm ... 0.05) | ↓ | ↓ |
| Ex. 8 | 13.5 μm | ↓ | 0.10 | ↓ | ↓ |
| Ex. 9 | ↓ | ↓ | ↓ | ↓ | ↓ |
| Ex. 10 | ↓ | ↓ | ↓ | ↓ | ↓ |
| Ex. 11 | ↓ | ↓ | ↓ | ↓ | ↓ |
| Ex. 12 | ↓ | ↓ | ↓ | ↓ | ↓ |
| Ex. 13 | ↓ | ↓ | ↓ | ↓ | ↓ |
| Ex. 14 | ↓ | ↓ | ↓ | ↓ | ↓ |
| Comp. Ex. 1 | 4.6 μm<br>3.5 μm<br>Mixed particle system | ↓ | 0.18 | ↓ | ↓ |
| Comp. Ex. 2 | Average particle diameter 2.5 μm<br>Amorphous silica | Silica | 0.00 | PMMA polymer<br>1.25 wt % (mw 45000) | PETA = 100 |

|  | Composition for anti-dazzling layer Solvent composition (Ratio of toluene to coating composition component) | Composition for surface modifying layer | |
|---|---|---|---|
| Ex. 1 | Toluene:<br>cyclohexanone =<br>80:20 wt %<br>(40.5 wet %) | 2<br>(Main component:<br>DPHA) | Modification of roughness<br>(smoothing layer = fine concavo-convex filling effect) |
| Ex. 2 | ↓ | ↓ | ↓ |
| Ex. 3 | ↓ | ↓ | ↓ |
| Ex. 4 | ↓ | ↓ | ↓ |
| Ex. 5 | ↓ | ↓ | ↓ |
| Ex. 6 | ↓ | ↓ | ↓ |
| Ex. 7 | ↓ | ↓ | ↓ |
| Ex. 8 | ↓ | 2<br>(DPHA + ATO<br>(Electro-conductive agent) Incorporated) | (i) Modification of roughness<br>(ii) Antistatic property |
| Ex. 9 | ↓ | 1<br>(Main component:<br>DPHA) | Modification of roughness<br>(smoothing layer = fine concavo-convex filling effect) |
| Ex. 10 | ↓ | ↓ | ↓ |
| Ex. 11 | ↓ | 3<br>(Zr-containing resin matrix)<br>n = 1.60 | (i) Modification of roughness<br>(ii) Refractive index regulation |
| Ex. 12 | ↓ | 4<br>(Urethane acrylate + M315) | (i) Modification of roughness<br>(ii) High hardness |
| Ex. 13 | ↓ | 5<br>(Urethane acrylate + M315 + F-type reactive additive) | (i) Modification of roughness<br>(ii) High hardness<br>(iii) Antisoiling property |
| Ex. 14 | ↓ | 6<br>(Urethane acrylate + M315 + F-type reactive additive + F-type leveling agent) | (i) Modification of roughness<br>(ii) High hardness<br>(iii) Antisoiling property<br>(iv) Slipperiness |
| Comp. Ex. 1 | ↓ | — | |
| Comp. Ex. 2 | Toluene:MIBK =<br>90:10 wt %<br>(40.5 wet %) | — | |

| | Evaluation 3 | | | | |
|---|---|---|---|---|---|
| | Haze (%) | 60-degree gloss | Sm | θa | Rz | Reflection Y value (5-degree reflection) |
| Ex. 1 | 0.3 | 98.7 | 233.1 | 0.384 | 0.606 | —<br>(* No low-refractive index layer: 4%) |
| Ex. 2 | 0.4 | 94.6 | 170.2 | 0.504 | 0.663 | — |
| Ex. 3 | 0.6 | 90.3 | 362.5 | 0.539 | 1.040 | — |

TABLE 2-continued

| | | | | | | |
|---|---|---|---|---|---|---|
| Ex. 4 | 0.5 | 92.3 | 354.1 | 0.478 | 0.833 | — |
| Ex. 5 | 0.4 | 94.8 | 375.1 | 0.422 | 0.482 | — |
| Ex. 6 | 0.4 | 93.2 | 192.3 | 0.621 | 0.834 | — |
| Ex. 7 | 0.5 | 94.9 | 201.3 | 0.532 | 0.743 | — |
| Ex. 8 | 1.4 | 93.2 | 323.1 | 0.912 | 0.893 | — |
| Ex. 9 | 1.8 | 93.1 | 367.3 | 0.623 | 0.982 | — |
| Ex. 10 | 0.5 | 65.3 | 392.3 | 0.432 | 0.732 | 2.0% |
| Ex. 11 | 1.3 | 56.2 | 245.3 | 0.392 | 0.652 | 1.2% |
| Ex. 12 | 0.5 | 92.2 | 364.3 | 0.468 | 0.822 | — |
| Ex. 13 | 0.5 | 91.9 | 345.2 | 0.492 | 0.843 | — |
| Ex. 14 | 0.5 | 90.8 | 332.3 | 0.464 | 0.815 | — |
| Comp. Ex. 1 | 4.7 | 48.2 | 93.2 | 1.892 | 1.439 | — |
| Comp. Ex. 2 | 3.8 | 65.0 | 267.2 | 1.857 | 1.932 | — |

| | Evaluation 3 | | | | |
|---|---|---|---|---|---|
| | Electrical surface resistance ($\Omega/\square$) | Contact angle (pure water) | Evaluation 4 | Evaluation 5 | Evaluation 6 |
| Ex. 1 | — (*Antistatic layer; overrange for antistatic layer-free product) | 76° | ○ | Δ | Δ |
| Ex. 2 | — | 75° | ○ | Δ | Δ |
| Ex. 3 | — | 76° | ○ | Δ | Δ |
| Ex. 4 | — | 78° | ○ | Δ | Δ |
| Ex. 5 | — | 76° | ○ | Δ | Δ |
| Ex. 6 | — | 77° | ○ | Δ | Δ |
| Ex. 7 | — | 78° | ○ | Δ | Δ |
| Ex. 8 | $2.0 \times 10^{12}$ | 75° | ○ | Δ | Δ |
| Ex. 9 | $3.2 \times 10^{12}$ | 77° | ○ | Δ | Δ |
| Ex. 10 | — | 92° | ○ | Δ | Δ |
| Ex. 11 | — | 94° | ○ | Δ | Δ |
| Ex. 12 | — | 76° | ○ | Δ | Δ |
| Ex. 13 | — | 97° | ○ | ○ | Δ |
| Ex. 14 | — | 106° | ○ | ○ | ○ |
| Comp. Ex. 1 | — | 74° | × | × | × |
| Comp. Ex. 2 | — | 76° | × | × | × |

Third Aspect of Invention

Compositions for respective layers constituting an optical laminate were prepared according to the following formulations.

Example C1

Preparation of Composition C1 for Light Diffusion Layer

The following materials were mixed together according to the following formulations, and the viscosity was regulated to 20 sec with a Zahn cup #3 to prepare composition C1 for a light diffusion layer.

| | |
|---|---|
| Resin (Vylon 200 polyester, manufactured by Toyobo Co., Ltd.) | 100 pts. wt. |
| Light diffusing agent (MBX-8, average particle diameter 10 μm, manufactured by Sekisui Chemical Co., Ltd.) | 120 pts. wt. |
| Dilution solvent: toluene | 130 pts. wt. |
| Dilution solvent: methyl ethyl ketone (Solid content 50%) | 100 pts. wt. |

Preparation of Composition C1 for Surface Modifying Layer

DPHA (manufactured by Nippon Kayaku Co., Ltd., refractive index 1.51) (39.30 parts by mass) as an ultraviolet curing resin, 3.13 parts by mass of an acrylic polymer (manufactured by Mitsubishi Rayon Co., Ltd., molecular weight 40,000) as an ultraviolet curing resin, 2.12 parts by mass of Irgacure 184 (manufactured by Ciba-Geigy Limited) as a photocuring initiator, 0.43 part by mass of Irgacure 907 (manufactured by Ciba-Geigy Limited) as a photocuring initiator, 0.19 part by mass of a silicone leveling agent 10-28 (manufactured by The Inctec Inc.), 49.35 parts by mass of toluene, and 5.48 parts by mass of cyclohexanone were thoroughly mixed together to prepare a composition. This composition was filtered through a polypropylene filter having a pore diameter of 10 μm to prepare composition C1 for a surface modifying layer.

Production of Optical Laminate

Formation of Light Diffusion Layer

A 100 μm-thick HS-type polyethylene terephthalate film manufactured by Teijin Ltd. was provided as a base material. Composition C1 for a light diffusion layer was coated onto one side of the base material with a wire-wound rod for coating (Mayer's bar), and the coated base material was heat dried in an oven at 70° C. for one min. The solvent component was evaporated to heat cure the coating film. The coverage and thickness of the light diffusion layer on a dry basis were 11 g/m² and 20 μm, respectively.

Formation of Surface Modifying Layer

Composition C1 for a surface modifying layer was coated onto the light diffusion layer with a wire-wound rod for coating (Mayer's bar), and the coating was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film. Thus, a 4 μm-thick surface modifying layer was formed. Thus, an optical laminate was produced.

Example C2

Preparation of Composition C2 for Light Diffusion Layer

The following materials were mixed together according to the following formulations, and the viscosity was regulated to 20 sec with a Zahn cup #3 to prepare composition C2 for a light diffusion layer.

| | |
|---|---|
| Resin (Vylon 200 polyester, manufactured by Toyobo Co., Ltd.) | 100 pts. wt. |
| Light diffusing agent (MBX-8, manufactured by Sekisui Chemical Co., Ltd., average particle diameter 10 μm) | 240 pts. wt. |
| Dilution solvent: toluene | 130 pts. wt. |
| Dilution solvent: methyl ethyl ketone (Solid content 50%) | 100 pts. wt. |

Production of Optical Laminate

In the same manner as in Example C1, a 4 μm-thick surface modifying layer was formed and an optical laminate was produced, except that composition C2 for a light diffusion layer was used.

Example C3

Preparation of Composition C3 for Light Diffusion Layer

The following materials were mixed together according to the following formulations, and the viscosity was regulated with a Zahn cup #3 to prepare composition C3 for a light diffusion layer.

| | |
|---|---|
| Resin (Vylon 200 polyester, manufactured by Toyobo Co., Ltd.) | 100 pts. wt. |
| Light diffusing agent (MBX-12, manufactured by Sekisui Chemical Co., Ltd., average particle diameter 14 μm) | 240 pts. wt. |
| Dilution solvent: toluene | 130 pts. wt. |
| Dilution solvent: methyl ethyl ketone (Solid content 50%) | 100 pts. wt. |

Production of Optical Laminate

In the same manner as in Example C1, a 4 μm-thick surface modifying layer was formed and an optical laminate was produced, except that composition C3 for a light diffusion layer was used.

Example C4

Preparation of Composition C4 for Light Diffusion Layer

The following materials were mixed together according to the following formulations, and the viscosity was regulated with a Zahn cup #3 to prepare composition C4 for a light diffusion layer.

| | |
|---|---|
| Resin (Vylon 200 polyester, manufactured by Toyobo Co., Ltd.) | 100 pts. wt. |
| Light diffusing agent (MBX-8, manufactured by Sekisui Chemical Co., Ltd., average particle diameter 10 μm) | 120 pts. wt. |
| Antistatic agent (Elegan TOF-1100, manufactured by Nippon Oils & Fats Co., Ltd.) | 10 pts. wt. |
| Dilution solvent: toluene | 130 pts. wt. |
| Dilution solvent: methyl ethyl ketone (Solid content 50%) | 100 pts. wt. |

Production of Optical Laminate

In the same manner as in Example C1, a 4 μm-thick surface modifying layer was formed and an optical laminate was produced, except that composition C4 for a light diffusion layer was used. The electrical surface resistance was $10^{12} \Omega/\square$ (measurement conditions: 25° C., 55% RH).

Example C5

Preparation of Composition C5 for Light Diffusion Layer

The following materials were mixed together according to the following formulations, and the viscosity was regulated with a Zahn cup #3 to prepare composition C5 for a light diffusion layer.

| | |
|---|---|
| Resin (Vylon 200 polyester, manufactured by Toyobo Co., Ltd.) | 100 pts. wt. |
| Light diffusing agent (MR-7HG, manufactured by Soken Chemical Engineering Co., Ltd., average particle diameter 6.0 μm) | 120 pts. wt. |
| Dilution solvent: toluene | 130 pts. wt. |
| Dilution solvent: methyl ethyl ketone (Solid content 50%) | 100 pts. wt. |

Production of Optical Laminate

In the same manner as in Example C1, a 4 μm-thick surface modifying layer was formed and an optical laminate was produced, except that composition C5 for a light diffusion layer was used.

Example C6

Production of Optical Laminate

A 120 μm-thick light diffusing film ("tradename: D122," manufactured by TSUJIDEN Co., Ltd.) was provided as a light transparent base material. The light diffusing film was a polyethylene terephthalate film. Composition C1 for a surface modifying layer was coated onto the light diffusing film with a wire-wound rod for coating (Mayer's bar), and the coated light transparent base material was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film and thus to form a 3 μm-thick surface modifying layer. Thus, an optical laminate was produced.

Comparative Example C1

Composition C1 for Anti-dazzling Layer

An amorphous silica-containing coating composition (tradename; "EXG40-77 (Z-15M)" (average particle diameter of amorphous silica 2.5 μm, manufactured by Dainichiseika Color & Chemicals Manufacturing Co., Ltd.) (3.3 g), an ultraviolet curing resin composition (tradename; "EXG 40-77 (S-2)," manufactured by Dainichiseika Color & Chemicals Manufacturing Co., Ltd.) (1.5 g), 0.03 g of a silicone leveling agent 10-28 (manufactured by The Inctec Inc.), 3.3 g of toluene, and 1.1 g of MIBK were thoroughly mixed together to prepare a composition. This composition was filtered through a polypropylene filter having a pore diameter of 80 µm to prepare composition C1 for an anti-dazzling layer.

Production of Optical Laminate

An 80 µm-thick polyethylene terephthalate film (A4300, manufactured by Toyobo Co., Ltd.) as a transparent base material. Composition C1 for an anti-dazzling layer was coated onto the transparent base material with a wire-wound rod for coating (Mayer's bar), and the coated transparent base material was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film and thus to form a 3 µm-thick anti-dazzling hardcoat layer. Thus, an optical laminate was produced. This optical laminate is an anti-dazzling optical laminate (AG1) using amorphous silica having an average particle diameter of 2.5 µm as light transparent fine particles.

Comparative Example C2

Composition C2 for Anti-dazzling Layer

An amorphous silica-containing coating composition (tradename; "EXG40-77 (D-30M)" (average particle diameter of amorphous silica: 1.5 µm, manufactured by Dainichiseika Color & Chemicals Manufacturing Co., Ltd.) (3.5 g), 1.6 g of an ultraviolet curing resin composition (tradename; "EXG 40-77 (S-2)," manufactured by Dainichiseika Color & Chemicals Manufacturing Co., Ltd.), 0.03 g of a silicone leveling agent 10-28 (manufactured by The Inctec Inc.), 3.3 g of toluene, and 1.2 g of MIBK were thoroughly mixed together to prepare a composition. This composition was filtered through a polypropylene filter having a pore diameter of 80 µm to prepare composition C2 for an anti-dazzling layer.

Production of Optical Laminate

An anti-dazzling optical laminate (AG) was produced in the same manner as in Comparative Example C1, except that composition C2 for an anti-dazzling layer and amorphous silica having an average particle diameter of 1.5 µm were used. That is, also for the anti-dazzling optical laminate of Comparative Example C2, amorphous silica was used.

Evaluation Test C

The following evaluation tests were carried out, and the results were described in Table 3.

Evaluation 1: Planar Shape Evaluation Test

Each of the optical laminates of Example C and Comparative Example C was mounted on a panel of an image display device, and the surface shape was photographed with an optical microscope (tradename; BX60-F3, manufactured by OLYMPUS; 200 times). The results were as shown in FIG. 4. As can be seen from FIG. 4, for HG1 to HG3 which are optical laminates according to the present invention, the waviness of the concavoconvex shape was smooth, the concavoconvex shape is not sharp, and the whole surface is in the form of a plurality of very gently sloping hills. On the other hand, for AG1 which is a conventional anti-dazzling optical laminate, the surface is rough like an enlarged photograph of the human skin, and the concavoconvex shape is sharp.

Evaluation 2: Three-dimensionality Evaluation Test for Concavoconvex Shape

Each of the optical laminates of Example C and Comparative Example C was mounted on a panel of an image display device, and the surface shape was photographed with AFM (tradename: a scanning probe microscope). The results were as shown in FIGS. 5 and 6. As can be seen from FIG. 5, for HG1 to HG3 which are optical laminates according to the present invention, the waviness of the concavoconvex shape was very smooth, the concavoconvex shape is not sharp, and the whole surface is in the form of a plurality of very gently sloping hills. On the other hand, as can be seen from FIG. 6, for AG1 which is a conventional anti-dazzling optical laminate, the surface is in the form of a number of sharp concavoconvex shapes.

Evaluation 3: Optical Characteristics Test

For the optical laminates of Example C and Comparative Example C, the haze value (%), 60-degree gloss, Sm, θa, and Rz were measured according to the definition described in the present specification. The results were as shown in Table 1.

Evaluation 4: Glossy Black Feeling Test

A crossed Nicol polarizing plate was applied onto each of the optical laminates of Example C and Comparative Example C on its side remote from the film. Sensory evaluation was carried out under three-wavelength fluorescence, and glossy black feeling was evaluated in detail according to the following criteria.

Evaluation Criteria

○: Glossy black could be reproduced.

Δ: Glossy black could be somewhat reproduced but was unsatisfactory as a product.

x: Glossy back could not be reproduced.

Evaluation 5: Glare Test

A black matrix pattern plate (105 ppi) formed on a 0.7 mm-thick glass was placed on a viewer manufactured by HAKUBA (light viewer 7000PRO) so that the pattern surface faced downward. The optical laminate film prepared above was placed thereon so that the concavoconvex face was on the air side. Glare was visually observed in a dark room while lightly pressing with a finger the edge of the film to prevent the lift of the film, and the results were evaluated.

Evaluation Criteria

○: No glare was observed at 105 ppi, and the antiglareness was good.

x: Glare was observed at 105 ppi, and the antiglareness was poor.

Results

For all of Examples C1 to C6 and Comparative Example C1, the antiglareness was ○, while, for Comparative Example C2, glare was observed and the antiglareness was x.

Evaluation 6: Anti-dazzling Evaluation Test

A black acrylic plate was applied onto the backside of the optical laminate with the aid of an optical pressure-sensitive adhesive. The sample was placed on a horizontal desk. White fluorescent lamps (32 W×2 lamps) were disposed 2.5 m above the desk. Reflection of the edge part of the white fluorescent lamps was visually observed and was evaluated.

Evaluation Criteria

○: The edge was not reflected, and the anti-dazzling property was good.

x: The edge was reflected, and the anti-dazzling property was poor.

Results

For all of Examples C1 to C6 and Comparative Example C2, the edge of the fluorescent lamps was not reflected at all, and the anti-dazzling property was good (○), whereas, for Comparative Example C1, the edge of the fluorescent lamps was reflected, and the anti-dazzling property was poor (x).

TABLE 3

| | Composition for light diffusion layer | | | | |
|---|---|---|---|---|---|
| | Light transparent fine particles | | | Binder Addition amount of polymer (based on binder) | Solvent composition (Ratio of toluene to coating composition component) |
| | Particle diameter | Material | Weight ratio per unit area between resin and particle | | |
| Ex. 1 | 10 μm | PMMA | 1.20 | Vylon200 (polyester resin) heat curing | Toluene:MEK = 50:50 wt % (45.0 wet %) |
| Ex. 2 | ↓ | ↓ | 2.40 | ↓ | ↓ |
| Ex. 3 | 14.0 μm | ↓ | 0.70 | ↓ | ↓ |
| Ex. 4 | 10.0 μm | ↓ | 1.20 | Vylon200 (polyester resin) + antistatic agent Elegan TOF-1100TM | ↓ |
| Ex. 5 | 6.0 μm | ↓ | 1.20 | ↓ | ↓ |
| Ex. 6 | Light diffusion film manufactured by TSUJIDEN Co., Ltd. "tradename: D122" was used as base material with diffusion layer | | | | |
| Comp. Ex. 1 | Average particle diameter 2.5 μm Amorphous silica | Silica | 0.10 | PMMA polymer 1.25 wt % (mw 45000) | Toluene:MIBK = 90:10 wt % (40.5 wet %) |
| Comp. Ex. 2 | Average particle diameter 1.5 μm Amorphous silica | ↓ | 0.13 | ↓ | ↓ |

| | Composition for surface modifying layer | Evaluation 3 | | | | | |
|---|---|---|---|---|---|---|---|
| | | Haze (%) | 60-degree gloss | Sm | θa | Rz | Evaluation 4 |
| Ex. 1 | I (Ultraviolet curing) | 2.3 | 98.7 | 273.1 | 0.484 | 0.634 | ○ |
| Ex. 2 | ↓ | 3.4 | 94.6 | 170.2 | 0.604 | 0.793 | ○ |
| Ex. 3 | ↓ | 6.8 | 90.3 | 462.5 | 0.539 | 1.040 | ○ |
| Ex. 4 | ↓ | 5.9 | 92.3 | 327.1 | 0.578 | 0.733 | ○ |
| Ex. 5 | ↓ | 4.8 | 94.8 | 275.1 | 0.475 | 0.582 | ○ |
| Ex. 6 | ↓ | 4.6 | 93.2 | 182.5 | 0.539 | 0.734 | ○ |
| Comp. Ex. 1 | — | 3.8 | 65.0 | 267.2 | 1.857 | 1.932 | × |
| Comp. Ex. 2 | — | 12.8 | 48.9 | 65.3 | 1.932 | 1.653 | × |

The invention claimed is:

1. An optical laminate comprising:
   a light transparent base material; and
   an anti-dazzling layer provided on the light transparent base material;
   wherein an outermost surface of the anti-dazzling layer has a concavoconvex surface, and the anti-dazzling layer satisfies requirements that
   Sm is not less than 100 μm and not more than 600 μm,
   θa is not less than 0.1 degree and not more than 1.2 degrees, and
   Rz is more than 0.2 μm and not more than 1 μm,
   wherein Sm represents an average spacing of concavoconvexes in the anti-dazzling layer, θa represents an average inclination angle of the concavoconvexes, and Rz represents an average roughness of the concavoconvexes, and Sm, θa and Rz are measured at a reference length of 2.5 mm.

2. The optical laminate according to claim 1, wherein a low-refractive index layer having a lower refractive index than the anti-dazzling layer is further provided on the surface of the anti-dazzling layer.

3. A polarizing plate comprising:
   an optical laminate according to claim 1; and
   a polarizing element provided on the optical laminate opposite to the side where the anti-dazzling layer is provided.

4. An image display device comprising:
   a transmission display; and
   a light source device for applying light to the transmission display from its backside,
   wherein an optical laminate according to claim 1 is provided on the surface of the transmission display.

5. An optical laminate comprising:
   a light transparent base material; and
   an anti-dazzling layer and a surface modifying layer, provided in that order, on the light transparent base material;

wherein an outermost surface of the surface modifying layer has a concavoconvex surface, and the surface modifying layer satisfies requirements that Sm is not less than 100 μm and not more than 600 μm, θa is not less than 0.1 degree and not more than 1.2 degrees, and Rz is more than 0.2 μm and not more than 1 μm, wherein Sm represents an average spacing of concavoconvexes in the surface modifying layer, θa represents an average inclination angle of the concavoconvexes, and Rz represents an average roughness of the concavoconvexes, and Sm, θa and Rz are measured at a reference length of 2.5 mm.

6. The optical laminate according to claim 5, wherein a low-refractive index layer having a lower refractive index than the surface modifying layer is further provided on the surface of the surface modifying layer.

7. The optical laminate according to claim 5, wherein the surface modifying layer is formed of a composition comprising one material or a mixture of two or more materials selected from the group consisting of antistatic agents, refractive index regulators, contamination inhibitors, water repellents, oil repellents, fingerprint adhesion preventive agents, highly curing agent, and hardness regulators.

8. The optical laminate according to claim 5, wherein the anti-dazzling layer has been formed by curing a composition for an anti-dazzling layer at a gel fraction of 30 to 80%.

9. The optical laminate according to claim 5, wherein the anti-dazzling layer has a thickness of not less than 0.5 μm and not more than 12 μm.

10. A polarizing plate comprising:
an optical laminate according to claim 5; and
a polarizing element provided on the optical laminate opposite to the side where the surface modifying layer is provided.

11. An image display device comprising:
a transmission display; and
a light source device for applying light to the transmission display from its backside,
wherein an optical laminate according to claim 5 is provided on the surface of the transmission display.

12. An optical laminate comprising:
a light transparent base material; and
a light diffusion layer provided on the light transparent base material;
wherein an outermost surface of the light diffusion layer has a concavoconvex surface, and the light diffusion layer satisfies requirements that Sm is not less than 100 μm and not more than 600 μm, θa is not less than 0.1 degree and not more than 1.2 degrees, and Rz is more than 0.2 μm and not more than 1 μm, wherein Sm represents an average spacing of concavoconvexes in the light diffusion layer, θa represents an average inclination angle of the concavoconvexes, and Rz represents an average roughness of the concavoconvexes, and Sm, θa and Rz are measured at a reference length of 2.5 mm.

13. A polarizing plate comprising:
an optical laminate according to claim 12, and
a polarizing element provided on the optical laminate opposite to the side where the light diffusion layer is provided.

14. An image display device comprising:
a transmission display; and
a light source device for applying light to the transmission display from its backside,
wherein an optical laminate according to claim 12 is provided on the surface of the transmission display.

15. An optical laminate comprising:
a light transparent base material; and
a light diffusion layer and a surface modifying layer, provided in that order, on the light transparent base material;
wherein an outermost surface of the surface modifying layer has a concavoconvex surface, and the surface modifying layer satisfies requirements that Sm is not less than 100 μm and not more than 600 μm, θa is not less than 0.1 degree and not more than 1.2 degrees, and Rz is more than 0.2 μm and not more than 1 μm, wherein Sm represents an average spacing of concavoconvexes in the surface modifying layer, θa represents an average inclination angle of the concavoconvexes, and Rz represents an average roughness of the concavoconvexes, and Sm, θa and Rz are measured at a reference length of 2.5 mm.

16. A polarizing plate comprising:
an optical laminate according to claim 15; and
a polarizing element provided on the optical laminate opposite to the side where the surface modifying layer is provided.

17. An image display device comprising:
a transmission display; and
a light source device for applying light to the transmission display from its backside,
wherein an optical laminate according to claim 15 is provided on the surface of the transmission display.

* * * * *

UNITED STATES PATENT AND TRADEMARK OFFICE
CERTIFICATE OF CORRECTION

PATENT NO. : 8,241,737 B2
APPLICATION NO. : 13/230961
DATED : August 14, 2012
INVENTOR(S) : Yukimitsu Iwata et al.

It is certified that error appears in the above-identified patent and that said Letters Patent is hereby corrected as shown below:

Column 77, Line 4
(claim 5), line 8: please change "µand" to --µm and--.

Signed and Sealed this
Eighteenth Day of December, 2012

David J. Kappos
*Director of the United States Patent and Trademark Office*